United States Patent
Krekeler et al.

(10) Patent No.: US 7,663,014 B2
(45) Date of Patent: Feb. 16, 2010

(54) SECONDARY PROCESS FOR RADIOACTIVE CHLORIDE DEWEAPONIZATION AND STORAGE

(75) Inventors: Mark P. S. Krekeler, Centreville, VA (US); Stephen C. Elmore, Stafford, VA (US); Cynthia M. Tselepis, Arlington, VA (US); Danielle Stoll, Fairfax Station, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 189 days.

(21) Appl. No.: 11/531,542

(22) Filed: Sep. 13, 2006

(65) Prior Publication Data

US 2007/0112241 A1    May 17, 2007

Related U.S. Application Data

(60) Provisional application No. 60/716,515, filed on Sep. 14, 2005.

(51) Int. Cl.
*G21F 9/00* (2006.01)
*B09B 3/00* (2006.01)
*C02F 11/00* (2006.01)
*C03B 5/00* (2006.01)
*C03B 5/027* (2006.01)
*B01D 15/00* (2006.01)
*B01J 29/06* (2006.01)
*B01J 21/16* (2006.01)

(52) U.S. Cl. .................. 588/13; 588/2; 588/9; 588/14; 588/15; 588/252; 210/679; 210/682; 502/63; 502/80

(58) Field of Classification Search .................. 588/1, 588/2, 9, 13, 16, 20, 901
See application file for complete search history.

(56) References Cited

U.S. PATENT DOCUMENTS

| 3,959,172 | A |   | 5/1976 | Brownell et al. |
| 4,182,785 | A |   | 1/1980 | Price |
| 4,913,850 | A | * | 4/1990 | Puppe et al. .................. 588/13 |
| 5,502,267 | A | * | 3/1996 | Aubert ........................ 588/250 |
| 5,707,912 | A | * | 1/1998 | Lowe et al. .................. 501/147 |
| 6,372,333 | B1 | * | 4/2002 | Sugiyama et al. ....... 428/311.71 |
| 2007/0112241 | A1 | * | 5/2007 | Krekeler et al. .................. 588/9 |

OTHER PUBLICATIONS

Lacy, WJ, "Decontamination of radioactively contaminated water by slurryign with clay". Industrial & Engineering Chemistry, 1954.*

(Continued)

*Primary Examiner*—Jerry Lorengo
*Assistant Examiner*—Jennifer A Smith
(74) *Attorney, Agent, or Firm*—David Yee; David G. Grossman

(57) ABSTRACT

A radioactive containment composition may be created for containing radionuclides from a radioactive material by mixing a clay mineral with water. This mixture may form an aqueous clay suspension. The mixture can be refined by filtering to remove coarse material. The aqueous clay suspension may be applied to a radioactive material, allowing the radionuclides to be exchanged with cations in the aqueous clay suspension. The resulting aqueous slurry, a silver-based solution may be added to produce a suspension. The suspension may be collected, heated and analyzed.

1 Claim, 74 Drawing Sheets

OTHER PUBLICATIONS

Anderson, J.R.. "Laboratory 6, sand sieve analysis", Department of Geology. Georgia Perimeter College. Jun. 6, 2003.*

Schroder, Paul. "Lecture notes for clay mineralogy". University of Georgia. Nov. 20, 2004. Lectures 3-5 and 19.*

Choi et al. "Cesium and strontium uptake to clay minerals and their weathering products in a caustic waste" Department of Soil, Water, and Environmental Science. University of Arizona at Tuscon. Mar. 28, 2004.*

Gabor et al. "Effect of ambient atmosphere on solid state reaction of kaolin-salt mixtures". Clays and Clay Minerals, vol. 34. No. 5 pp. 529-533, 1986.*

Knight et al. "Geochemical Modeling: Mapping Soil Mineralogy by EDS methods". Apr. 15, 2005.*

Grim et al. "Bentonies: geology, minerology, properties and uses" Science. 1978. pp. 9-12.*

* cited by examiner

SECONDARY PROCESS FOR RADIOACTIVE CHLORIDE DEWEAPONIZATION AND STORAGE

CROSS REFERENCE TO RELATED APPLICATIONS

The present application claims the benefit of provisional patent application Ser. No. 60/716,515 to Krekeler et al., filed on Sep. 14, 2005, entitled "Secondary process for radioactive chloride deweaponization and storage," which is hereby incorporated by reference.

BRIEF DESCRIPTION OF THE DRAWINGS

FIG. 8 shows an example of a TEM image showing subhedral platelets surrounded by a lesser amount of subhedral lamellar aggregates and an SAED diffraction pattern of.

DETAILED DESCRIPTION OF THE INVENTION

Figure 1:
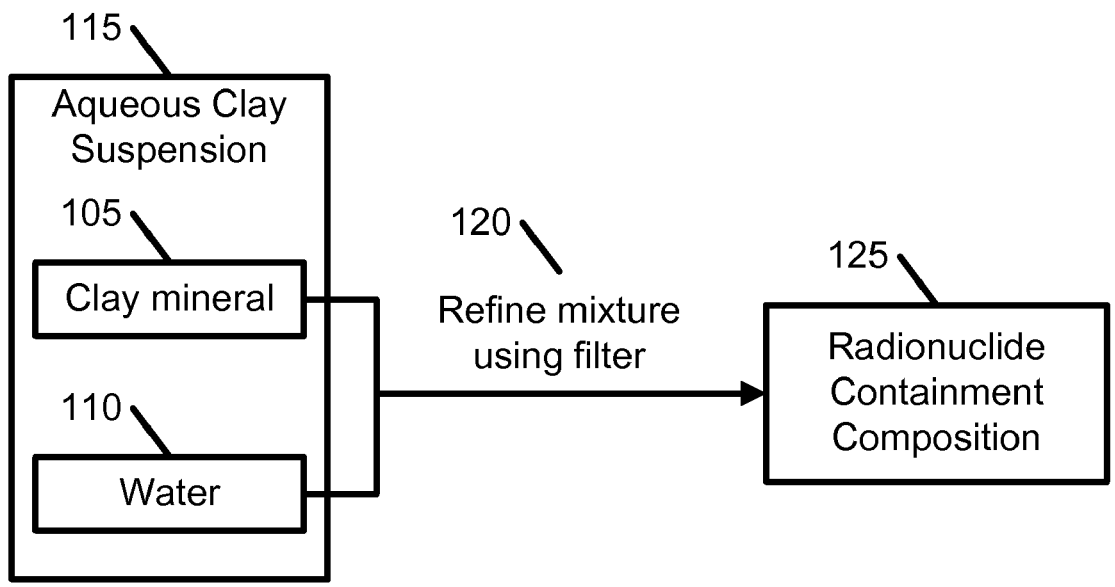
FIG. 1 shows an example of a block diagram for creating a radionuclide containment composition.

The claimed invention relates to a method for containing radioactive materials.

As an embodiment, a mixture of a clay mineral and water may be combined to create an aqueous clay suspension. The aqueous clay suspension may be refined into a uniform suspension by filtering the mixture to remove coarse material, exchange $Na^+$ ions, and improve sorption and rheological characteristics. Refining may generate a radionuclide containment composition. The radionuclide containment composition may be applied to a radioactive chloride substance to create an aqueous slurry. A silver-based solution may be added to the aqueous slurry to create a suspension.

As another embodiment, the clay mineral is montmorillonite.

As another embodiment, the weight ratio of the clay mineral to the water ranges from 1:99 to 99:1.

As another embodiment, the mixture of the clay mineral and water is refined by using sieves to filter and remove coarse material. The aperture size of the sieves can range from 300 μm to <38 μm.

As another embodiment, the silver-based solution is silver nitrate solution. Because there is a chance that adding the silver-based solution can create sodium nitrate, a further embodied step is removing the sodium nitrate.

Alternatively, the silver-based solution is silver hydroxide solution. Where silver hydroxide is used, the silver hydroxide may be heated prior its addition to the aqueous slurry.

As another embodiment, the ratio of the silver-based solution to the aqueous slurry may be at least 1:20.

As another embodiment, another step is heating the suspension to a temperature of at least about 250° C.

As another embodiment, the heated suspension may be analyzed. Analysis may be conducted using at least one of the following: x-ray diffraction, electron diffraction, selected area electron diffraction, Bragg diffraction and Electron backscatter diffraction.

As another embodiment, chlorine ions are sorbed to the surface of the clay mineral.

As another embodiment, after the silver-based solution has been added to the aqueous slurry, the silver ions are not likely to be exchanged or replaced by cesium ions. Similarly, silver ions are not likely to be exchanged or replaced by barium or by strontium ions.

As another embodiment, the clay mineral is pretreated with an aqueous salt solution. The aqueous salt solution may be any of the following embodied compounds: sodium chloride, sodium hydroxide and sodium perchlorate.

I. Introduction

Radioactive isotopes (also referred to herein as radionuclides) are naturally occurring in the environment or are created using nuclear technologies, such as nuclear reactors, etc. Human exposure to many types of radioactive isotopes may lead to several detrimental health effects, such as cancer, skin burn, organ malfunction, etc. Examples of radioactive isotopes, which are of concern to human health, include, but are not limited to, americium-241 ($^{241}Am$), cesium ($^{134}Cs$, $^{137}Cs$), cobalt-60 ($^{60}Co$), iodine-131 ($^{131}I$), iridium-192 ($^{192}Ir$), plutonium ($^{238}Pu$, $^{239}Pu$, $^{240}Pu$, and 242Pu), strontium-90 ($^{90}Sr$), uranium-235 ($^{235}U$), uranium-238 ($^{238}U$) and chlorine-36 ($^{36}Cl$).

Radiological materials can be weaponized in many forms by terrorists. For instance, materials can be packed in a traditional explosive device and detonated in a public area. Such deployment is commonly referred to as a radiological dirty bomb or a radiological dispersal device (RDD).

One radioactive material of current interest that may be used in RDD is radioactive chloride. While two stable isotopes of chlorine, $^{35}Cl$ and $^{37}Cl$, occur naturally, several radioactive isotopes of chlorine also exist, as indicated in TABLE 1.

TABLE 1

Radioactive Isotopes of Chlorine

| Isotope | Mass | Half-life | | Mode of decay | Nuclear spin | Nuclear magnetic moment |
|---|---|---|---|---|---|---|
| $^{36}Cl$ | 35.9683 | 301,000 | years | $\beta^-$ to $^{36}Ar$ | 0 | 1.28547 |
| $^{38}Cl$ | 37.968 | 37.2 | minutes | $\beta^-$ to $^{38}Ar$ | 2 | 2.05 |
| $^{39}Cl$ | 38.968 | 55.6 | minutes | $\beta^-$ to $^{39}Ar$ | 3\|2 | |
| $^{40}Cl$ | 39.9704 | 1.38 | minutes | $\beta^-$ to $^{40}Ar$ | 2 | |
| $^{41}Cl$ | 40.9707 | 34 | seconds | $\beta^-$ to $^{41}Ar$ | | |
| $^{42}Cl$ | 41.9732 | 6.8 | seconds | $\beta^-$ to $^{42}Ar$ | | |
| $^{43}Cl$ | 42.9742 | 3.3 | seconds | $\beta^-$ to $^{43}Ar$ | | |

Of particular concern is $^{36}Cl$, which, as shown in Table 1, has a half-life of approximately 301,000 years. Its specific activity is about 0.033 (Ci/g) and decays via beta particle emission (generally 98% of decay occurs through this mechanism) and electron capture. The radiation energy is about 0.027 MeV. Lifetime cancer mortality risk coefficient for inhalation is about $9.6\times10^{-11}$ pCi. Lifetime cancer mortality risk coefficient for ingestion is about $2.9\times10^{-12}$ pCi. The $^{36}$Cl isotope is typically found naturally in very minute quantities from cosmogenic radiation interactions with $^{36}$Ar in the atmosphere, and may be used as a geochronological tool. Additionally, this isotope may also be found in the nuclear water stream. Hence, this isotope can be a component in RDD. It may also become an environmental concern if released into the environment.

Previously, $^{36}$Cl has been produced in large quantities during nuclear weapons testing between 1952 and 1958. The mode of production was achieved by irradiation of seawater. For instance, at the U.S. Department of Energy, Hanford site, graphite neutron moderation material in plutonium production reactors was treated with $Cl_2$ gas at high temperatures. The $^{35}$Cl that remained in the reactors was converted to $^{36}$Cl. Currently, $^{36}$Cl may be found in these reactors, as well as similar reactors, and waste streams from them. The amount of $^{36}$Cl that has been generated by the former Soviet Union and other countries with nuclear capabilities or developing capabilities remain unclear.

Another radioactive material that may be used in RDD is cesium-137 ($^{137}$Cs). Cesium-137 commonly occurs as $^{137}$CsCl and as a major component of nuclear waste stream generated from nuclear technologies worldwide.

$^{137}$Cs decays by emission of beta particles and gamma rays to barium-137m ($^{137}$Ba), a short-lived decay product, which in turn decays to a nonradioactive form of barium ($^{134}$Ba). $^{137}$Cs has a half-life of approximately 30 years.

As one of the most common radioactive isotopes used in various industries, $^{137}$Cs can be implemented in numerous devices. Examples include, but are not limited to, moisture-density gauges in the construction industry; leveling gauges in the piping industry; thickness gauges in industries such as metal, paper and film; and well-logging devices in the drilling industry.

Another fairly common radioactive isotope is $^{134}$Cs. Having similar properties to $^{137}$Cs, $^{134}$Cs decays (e.g., beta decay) to $^{134}$Ba. The half life of $^{134}$Cs is approximately 2 years. $^{134}$Cs may be used in photoelectric cells in ion propulsion systems under development.

However, when comparing $^{137}$Cs with $^{134}$Cs, $^{137}$Cs tends to have more significant environment and health concerns than $^{134}$Cs. For instance, $^{137}$Cs is often a greater environmental contaminant than $^{134}$Cs. Moreover, although $^{137}$Cs is sometimes used in medical therapies to treat cancer, exposure to $^{137}$Cs (like other radionuclides) can also increase the risk of cancer and damage tissue because of its strong gamma ray source. Nonetheless, $^{134}$Cs can still be a concern for the environment.

Because of cesium's chemical nature, cesium can easily move through the environment, and thus making the cleanup of $^{137}$Cs releases difficult. For example in April 1986, large amounts of $^{137}$Cs were released during the Chernobyl incident. Significant amounts of $^{137}$Cs were deposited in Europe and Asia. Today, $^{137}$Cs can still be found in those areas. Healthwise, Great Britain's National Radiological Protection Board predicts that there will be up to 1,000 additional cancers over the next 70 years among the population of Western Europe exposed to fallout from the nuclear accident at Chernobyl, in part due to $^{137}$Cs. Yet, of course, the magnitude of the health risk depends on exposure conditions. These conditions include factors such as strength of the source, length of exposure, distance from the source, and whether there was shielding between the person and the source (such as metal plating).

Although several routes may exist in delivering $^{137}$Cs as a weapon, one expected route is dispersing $^{137}$Cs in the form of radioactive cesium chloride powder ($^{137}$CsCl) in populated areas (e.g., downtowns, malls, etc.). Another anticipated route of dispersing $^{137}$Cs is through water supplies. For example, if 5 kg of $^{137}$CsCl were deposited and dispersed (whether via a dirty bomb or other means) in a large city (e.g., Chicago) having 5 m.p.h. winds, a computer model generated by the Los Alamos National Labs predicts that approximately 300 city blocks would be affected one hour after detonation. The high solubility in water and the relatively low hardness of $^{137}$CsCl are both properties that are normally characteristic of an effective "radiological powder weapon."

In addition to $^{137}$Cs, it is well within the scope of the claimed invention that other radioactive isotopes may be used as the radioactive ingredient in a radioactive material for use in a dirty bomb or some form of weapon. Examples include all of the radioactive isotopes previously mentioned.

To contain dispersed radioactive material as a weapon (e.g., RDD) having a radioactive isotope or radionuclide, a radionuclide containment composition may be used. The radionuclide containment composition is defined as an aqueous clay suspension comprising a mixture of a clay mineral and water. This suspension may be filtered to remove residual coarse material to impart a processed uniform suspension.

II. Radioactive Chloride Substance Containment Process

Figure 2:
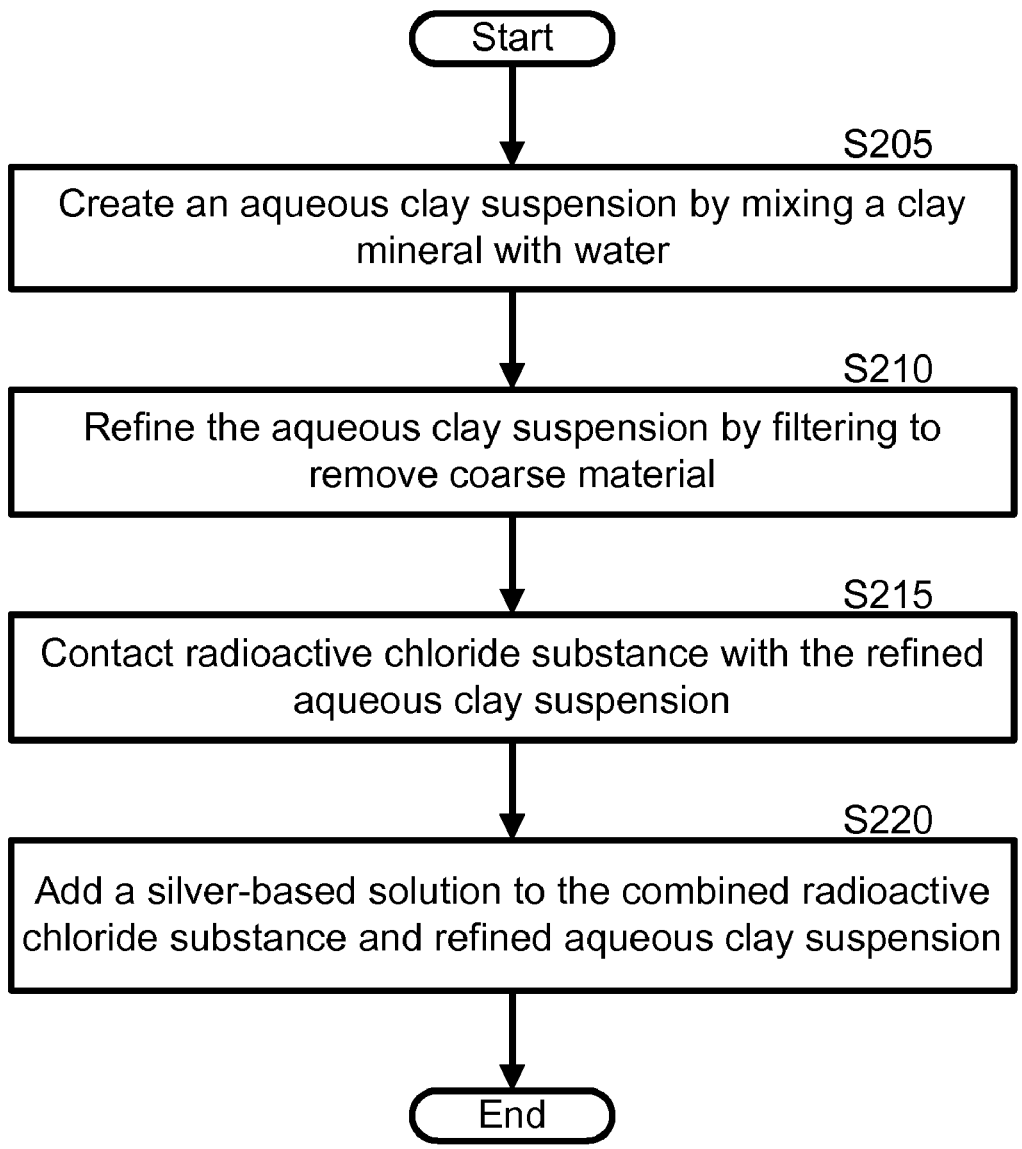
FIG. 2 shows an example of a flow diagram for containing radioactive chloride substances.

Referring to FIGS. 1 and 2, the overall radioactive chloride substance containment process may begin by mixing a clay mineral 105 with water 110 to form an aqueous clay suspension 115, S205. The aqueous clay suspension 115 can be refined by filtering 120 to remove residual coarse material S210. Filtering may be achieved by using sieves with aperture sizes ranging from 300 μm to <38 μm. The resulting refined aqueous clay suspension may be referred to hereinafter as radionuclide containment composition 125. The radionuclide containment composition 125 may be applied to a radioactive chloride substance S215. The application may form an aqueous slurry. A silver-based solution may be added to this aqueous slurry. Such addition may create a suspension S220.

A. Clay Mineral

Figure 3:
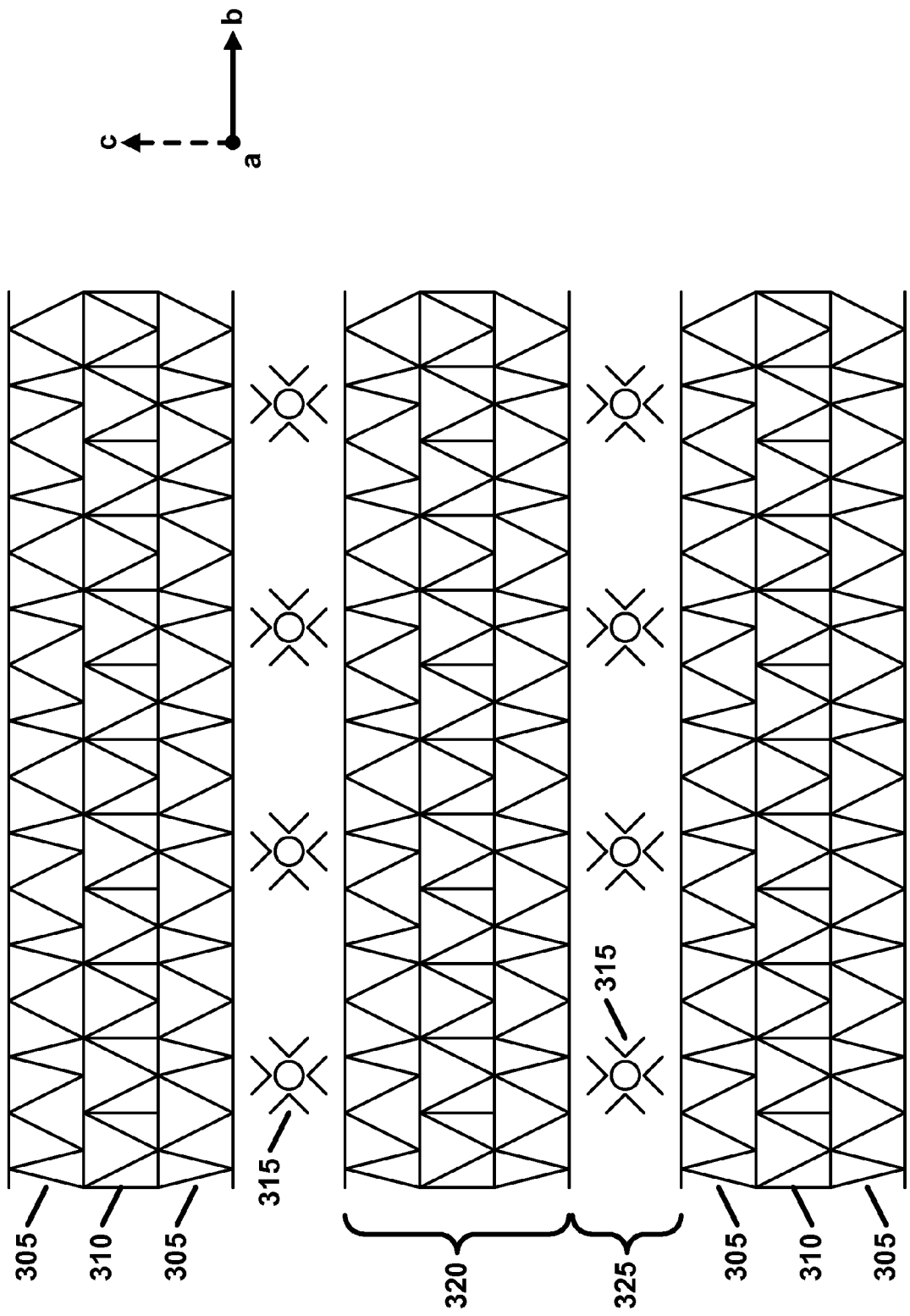
FIG. 3 shows the structure of a 2:1 clay mineral.

The clay mineral 105 is a layer silicate having at least one tetrahedral sheet 305 and an octahedral sheet 310, as shown in FIG. 3.

The tetrahedral sheet 305 is made up of a layer of horizontally linked, tetrahedral-shaped units coordinated to oxygen atoms and arranged in a hexagonal pattern. Each unit may include a central coordinated atom (e.g., $Si^{4+}$, $Al^{3+}$, $Fe^{3+}$, etc.) surrounded by (and maybe bonded to) oxygen atoms that, in turn, may be linked with other nearby atoms (e.g., $Si^{4+}$, $Al^{3+}$, $Fe^{3+}$, etc.).

The octahedral sheet 310 is made up of a layer of horizontally linked, octahedral-shaped units that may also serve as one of the basic structural components of silicate clay minerals. Arranged in an octahedral pattern, each unit may include a central coordinated metallic atom (e.g., $Al^{3+}$, $Mg^{2+}$, $Fe^{3+}$, $Zn^{2+}$, $Fe^{2+}$, etc.) surrounded by (and maybe bonded to) a oxygen atoms and/or hydroxyl groups. The oxygen atoms and/or hydroxyl groups may be linked with other nearby metal atoms (e.g., $Al^{3+}$, $Mg^{2+}$, $Fe^{3+}$, $Zn^{2+}$, $Fe^{2+}$, etc.). This combination may serve as inter-unit linkages that hold the sheet together.

Within both tetrahedral and octahedral layers, $O^{2-}$ and/or $OH^-$ ions may be present.

Where only one tetrahedral and one octahedral sheet are present for each layer, the clay is known as a 1:1 clay. Where, for each layer, there are two tetrahedral sheets with the unshared vertex of each sheet pointing towards each other and forming each side of the octahedral sheet 320, the clay is known as a 2:1 clay.

Of particular interest are 2:1 clays. Examples include, but are not limited to, those from the smectite group, such as montmorillonite, bentonite, beidellite, hectorite, nontronite, sauconite, saponite, etc. Montmorillonite may include, but is not limited to, montmorillonite, sodium-montmorillonite (Na-montmorillonite), cesium-montmorillonite (Cs-montmorillonite), etc. Another example is illite-smectites. The crystalline structure includes a stack of layers interspaced with at least one interlayer site 325. Each interlayer site may include cations (e.g., $Na^+$, $K^+$, etc.) 315 or a combination of cations and water.

Depending on the composition of the tetrahedral 305 and octahedral 310 sheets, the layers may either have no charge or will have a net negative charge. If the layers are neutral in charge, the tetrahedral 305 and octahedral 310 sheets are likely to be held by weak van der Waals forces. If the layers are charged, this charge may be balanced by interlayer cations.

In one embodiment, the clay mineral 105 is montmorillonite. Montmorillonite is a common smectite having one layer of aluminum atoms (i.e., middle layer) connected to two opposing layers of silicon atoms (i.e., outer layer) in a 2:1 layer structure. One version of the basic chemical formula, as a hydrous magnesium aluminum silicate, is $MgAl_2Si_5O_{14}.nH_2O$ or $MgO.Al_2O_3 5SiO_2.nH_2O$, where n for both may vary from 5 to 8. $H_2O$ may be approximately 20.0 to 25.0 percent, of which half of this volume may be found at a temperature of about 100° C. Some calcium may replace some of the magnesium. Alternatively, montmorillonte's chemical formula may also be written as:

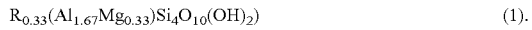

$$R_{0.33}(Al_{1.67}Mg_{0.33})Si_4O_{10}(OH)_2) \qquad (1).$$

VI (denoted as such because of the 6-fold coordination) indicates the octahedral sheet and its charge. IV (denoted as such because of the 4-fold coordination) indicates the tetrahedral sheet and its charge. R is the exchangeable cation in the interlayer space. Variations of this chemical formula are also well known in the art.

Montmorillonite is a chief constituent of bentonite, a clay-like material which may be formed by altering volcanic ash. Bentonite is the name of the rock which includes largely of the mineral montmorillonite. Besides bentonite, montmorillonite may also be found in granite pegmatites as an altered product of some silicate mineral.

In another embodiment, the clay mineral 105 is Na-montmorillonite. Na-montmorillonite is a 2:1 layer silicate which may be derived from bentonite. Two tetrahedral sheets, which may be composed predominantly of $Si^{4+}$ tetrahedrons, may be bonded to an octahedral sheet, which may be composed of $Mg^{2+}$, $Al^{3+}$ and $Fe^{3+}$ octahedrons. Each $Si^{4+}$ tetrahedron may be coordinated to oxygen atoms. Each octahedron may be coordinated to oxygen atoms and/or hydroxyl groups.

It should be noted that unless otherwise specified (e.g., distinguished separately), the description described herein with respect to montmorillonite also applies to M-montmorillonite, where M is an exchangeable cation.

Naturally, montmorillonite tends to have defects in its crystal structure. Most evident is the turbostratic stacking of the 2:1 layers. This defect structure is believed to be the cause of the small crystallite size commonly observed. Having a flake-like shape resembling a corn flake, crystallites commonly vary in diameter from approximately 10 micrometers to approximately 0.01 micrometers.

A distinguishing feature of montmorillonite is its ability to swell with water. After surpassing a certain swelling threshold, montmorillonite tends to slump and goes into pieces. Montmorillonite can expand from approximately 12 Å to approximately 140 Å in aqueous systems. Fundamentally, the reason for this expansion is that cation substitution (e.g., $Mg^{2+}$ for $Al^{3+}$) in the octahedral sheet combined with minimal cation substitution (e.g., $Al^{3+}$ for $Si^{4+}$) in the tetrahedral sheet may give rise to a low negative charge on the 2:1 layer. This result may cause the crystal structure to have weak bonding along [001]. In essence, this effect may give rise to exchange sites between the 2:1 layer that may take up $M^+$ or $M^{2+}$ cations from aqueous solutions.

The low negative charge on the 2:1 layer may enable cation exchange to take place. The charge deficiency in the 2:1 layer may need to be balanced by exchangeable cations. The quantity of cations required to create a net charge balance is called the cation exchange capacity.

Commonly, the cation exchange capacity of montmorillonite varies between about 80 and about 150 meq/100 g. The pH dependence on this physical property may be absent or negligible. The internal charge deficiency of the clay mineral 105 may result in a net negative charge of the particle. Examples of exchangeable cations include, but are not limited to, sodium, calcium, magnesium, and potassium.

Cation exchangeability tends to enable montmorillonite to remove heavy metals (e.g., Hg, Zn, Cd, Cu, Pb, As, etc.), alkaloids, alkalines, etc. from water. Removal of heavy metals is often associated with, inter alia, significant impacts, such as wastewater treatment. Additionally, ion exchange may also remove cationic and/or neutral organics, resulting in intercalate and/or polymer interaction.

The combination of ion exchange capacity and capacity to swell may allow the material to form flocculi with suspended solids that can be precipitated out. Removal of flocculi may be achieved via washing and/or centrifugation.

These features, along with its chemical composition, are key elements to montmorillonite's exchange behavior with cesium and other cations.

B. Liquids

The water 110 used to create the aqueous clay suspension 115 may be tap water, distilled water, de-ionized water, etc.

The silver-based solution may be silver nitrate solution (also referred to herein as one of the following: $AgNO_3$, $AgNO_3$ solution or $AgNO_3$ solution (aq)).

Alternatively, the silver-based solution may be silver hydroxide solution (also referred to herein as AgOH (aq)). Because AgOH (aq) has low solubility, it may be heated to allow for more silver ions in the solution. Heating may range, for example, from ~100° F. to ~180° F.

As one embodiment, silver nitrate solution may be added to the aqueous slurry after the radionuclide containment composition 125 has come in contact with a radioactive chloride substance S220. The resulting product may be referred to as a suspension.

In one embodiment, the aqueous clay suspension 115 may be mixed with a liquid mixture. The liquid mixture may include part water 110 and some other liquid, such as hydrogen peroxide. Hydrogen peroxide may be advantageous for decontaminating the clay mineral 105 from bacteria, viruses, other microparasites, parasites, etc. Where the liquid mixture is part hydrogen peroxide and part water 110, the weight ratio of hydrogen peroxide to water 110 may range from about 1:99 to about 1:2.

In another embodiment, the $AgNO_3$ solution may also be used as a pretreatment step before sequestration by the clay mineral 105 and water 110 mixture for discovering a stock of poisonous or radioactive chloride substances. In this instance, the $AgNO_3$ solution may be applied to the clay mineral 105. After this application, water 110 may then be added to this pretreated clay mineral 105 to form the aqueous clay suspension 115. The aqueous clay suspension 115 may be refined 120 by using sieves to filter coarse materials. After filtering, the resulting product (i.e., radionuclide containment composition 125) may be applied to a radioactive chloride substance. To the aqueous slurry that may be formed, a silver-based solution may be added.

The minimum ratio of silver-based solution to aqueous slurry is about 1:20. As one embodiment, the ratio of silver nitrate solution to aqueous slurry is 1:4.

Because silver nitrate has inherent antibacterial/antiseptic properties, it may serve as an antibacterial/antiseptic agent.

The addition of $AgNO_3$ solution may produce sodium nitrate as a byproduct. To remove the sodium nitrate, the suspension may be heated. Temperature may vary. For example, the temperature may be approximately 475° F. The length of heating may also vary. For example, heating may take 3 hours.

C. Filters

Once the mixture is created and allowed to sit, the aqueous clay suspension 115 may be refined by using a filter 120, S210, such as a sieve. Filtering may help remove coarse material. One or more containers (e.g., beaker, bucket, silo, etc.) may be used to receive the filtered aqueous clay suspension 115.

In general, where a sieve is exercised, smaller sieve apertures tend to result in a processed suspension that is more uniform with less residual coarse material. Hence, embodied sieve aperture sizes may range from 300 μm to <38 μm. Although some fragments of coarse material (or fractions) may penetrate through the filter, they contribute minimally to the aqueous clay suspension 115 being employed. Nevertheless, the penetrable fragments may be used for forensic purposes to identify original materials.

The makeup and grain size of the filtered coarse fractions may be analyzed to determine the composition of the clay mineral 105. Analysis may be achieved by, for instance, back scatter scanning electron microscopy. Having mineralogical data may provide some insight into the nature of the clay minerals used.

D. Radionuclide Containment

Radionuclides from radioactive chloride substances may be contained by contacting the radioactive chloride substance with a radionuclide containment composition form an aqueous slurry. It should be noted that it is also possible to contact the radioactive chloride substance with an aqueous clay suspension 115 to form the aqueous slurry.

Generally, this aqueous clay suspension 115 is a processed, uniform suspension (having a possible gel-like consistency) comprising a clay mineral 105 mixed with water 110. The aqueous clay suspension 115 may be refined 120 to filter and remove coarse materials S210. This filtering can generate a smoother consistency. If refined, the composition may be referred to as the radionuclide containment composition.

At the point of contact between the radioactive chloride substance and aqueous clay suspension (refined or unrefined) 115, S215, radionuclides may be absorbed by the aqueous clay suspension 115. The result may be an aqueous slurry. A silver-based solution (e.g., $AgNO_3$ solution, AgOH (aq), etc.) may then be added to the aqueous slurry to form a suspension S220. The suspension may be collected (such as by vacuuming, scooping, sweeping, etc.) for chemical analysis.

Figure 4:
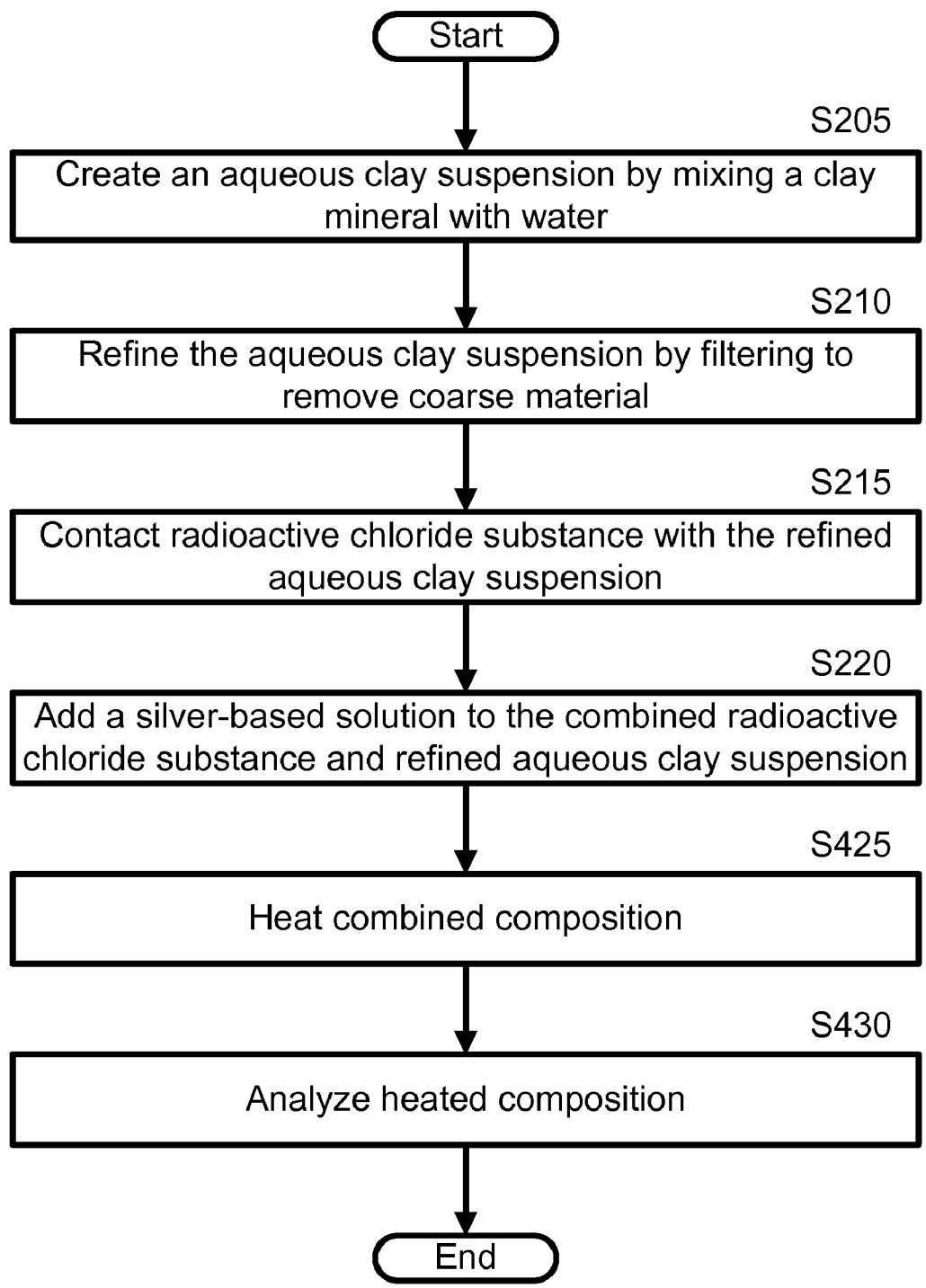
FIG. 4 shows another example of a flow diagram for containing radioactive chloride substances.

The collected suspension may be heated S425 and analyzed S430, as shown in FIG. 4. Heating S425 should transform and immobilize this substance into a hard, functionally insoluble material. The substance may be heated to a temperature of at least about 250° C. The temperature may range to a ceiling of about 1400° C. The solidified material may be reduced to particle sizes acceptable for analysis. Nonlimiting examples of analysis include x-ray diffraction, electron diffraction, selected area electron diffraction (SAED), Bragg diffraction, electron backscatter diffraction, etc. Analysis S430, such as x-ray diffraction, helps identify phases that are produced in the heated combined composition.

The radioactive chloride substance may include, but are not limited to, compounds having at least one of the following radionuclide: $^{241}Am$, $^{134}Cs$, $^{137}Cs$, $^{60}Co$, $^{131}I$, $^{192}Ir$, $^{238}Pu$, $^{239}Pu$, $^{240}Pu$, $^{242}Pu$, $^{90}Sr$, $^{235}U$ and $^{238}U$. The radioactive chloride substance may also include a radioactive chloride, as discussed earlier.

For example, as an embodiment, the radioactive chloride substance is $^{137}CsCl$. Cesium has an affinity to bond with chloride ions. When the two ions are combined, a crystallized powder is formed. Combining $^{137}Cs$ ions and chloride ions can produce $^{137}CsCl$.

As another embodiment, the radioactive chloride substance is CsCl, where the radionuclide is a radioactive chloride, such as $^{36}Cl$.

As another embodiment, other radioactive chloride substances may include, but are not limited to, CsCl, $RaCl_2$, $SrCl_2.6H_2O$, $BaCl_2$, HgCl, $HgCl_2$, $PbCl_2$, $CdCl_2$, $ZnCl_2$, $CoCl_2$, etc. Additionally, other nonlimiting examples of poisonous or radioactive chloride compounds include Uranium, actinide and lanthanide chlorides.

As another embodiment, the clay mineral 105 used to contain $^{137}CsCl$ may be a smectite mineral.

Using montmorillonite as an exemplified embodiment of smectite, this selection for containing $^{137}CsCl$ may be based on a variety of factors. One, montmorillonite is generally expandable. Two, because of montmorillonite has the ability to exchange alkali cations in aqueous systems, $Cs^+$ cations may be readily exchanged when these two are combined. Commonly, when Cs is exchanged, Cs is irreversibly sorbed on smectite minerals. This interaction can be exploited for transporting and storing $^{137}CsCl$ and could be used to respond to $^{137}CsCl$ release. Three, there are many sources of montmorillonite. Four, montmorillonite is comparatively low in cost.

The radionuclide containment composition 125 may be applied to powder or aqueous solutions of radioactive chloride substances using numerous techniques. Techniques include, but are not limited to, contacting, spraying (e.g., using a spray bottle, squirt gun, hose, etc.), pouring, covering, mixing, etc. Because of the rheological properties of the aqueous clay suspension 115, little to no agitation and/or dispersal of the radioactive chloride compound should occur. After the application, the $AgNO_3$ solution may be added to the aqueous slurry created by the combination of the radionuclide containment composition and radioactive chloride substance S220. The resulting material may be collected, heated and analyzed (e.g., via chemical mapping, etc.).

Optionally, montmorillonite may be pretreated with aqueous salt solution, such as NaCl, NaOH, and $NaClO_4$. Where NaCl is used for pretreatment, montmorillonite's sorption of $Na^+$ cations is expected to produce Na-montomorillonite. Having an aqueous or gel-like consistency, this exchanged composition may be washed to remove excess aqueous salt solution. Additionally, the exchanged composition may be tested for residual anions by using a precipitating agent (e.g., silver nitrate, etc.).

Made with montmorillonite, the radionuclide containment composition may be applied to powder or aqueous solutions of radioactive chloride substances using numerous techniques. Techniques include, but are not limited to, contacting, spraying (e.g., using a spray bottle, squirt gun, hose, etc.), pouring, covering, mixing, etc. Because of the rheological properties of the aqueous clay suspension 115, little to no agitation and/or dispersal of the radioactive chloride compound should occur. After the application, the material may be collected, heated and analyzed (e.g., via chemical mapping, etc.).

Using $^{137}$CsCl for demonstrative purposes, as a result of applying the aqueous clay suspension 115 onto $^{137}$CsCl, the aqueous clay suspension 115 may directly and irreversibly absorb $^{137}$Cs cations. It may be the case where exchange occurs spontaneously or essentially immediately. A dramatic change in the rheological properties should occur where the aqueous/gel-like consistency of the radionuclide containment composition 125 disappears and becomes a waxy paste in the Cs-montmorillonite form. This waxy paste may be collected, heated and chemically mapped.

III. Stability of the Aqueous Clay Suspension

To demonstrate the stability of aqueous clay suspension (both refined and unrefined) 115 when applied to a radioactive chloride material, such as $^{137}$CsCl, which is a typical substance encountered in a dirty bomb, the aqueous clay suspension 115 may be aged. There is no restrictive time limit in the aging process since the aging process may, depending on a user's desires, last from seconds to years. For instance, the aging process may last for 10 months.

The pH values for reacted aqueous clay suspension 115 may vary from approximately 3 to 4.65. Dissolution of the clay mineral 105, such as montmorillonite, is a possibility under these pH conditions.

A new rate law described by Keren Amram and Jiwchar Ganor may be applied under these pH conditions. Cf. Amram, K. and Ganor, J., 69 Geochimica et Cosmochimica Acta 2535-2546 (2005). Their rate law is:

$$\text{Rate}=220\cdot e^{-17460/RT}\cdot(3\times10^{-6}\cdot e^{10700/RT}\cdot a_{H+})/(1+3\times10^{-6}\cdot e^{10700/RT}\cdot a_{H+}) \quad (1)$$

Id. Their work may serve as a worst case scenario for dissolution for the claimed invention because their dissolution investigation is set up based on flow-through reactor experiments.

In a vast majority of applications, the claimed invention may be used in batch-mode, where the material will be placed in containers. Amram and Ganor's rate law tends to be appropriate for the claimed invention because, analogously, they used montmorillonite with a similar chemical composition similar to the claimed invention. Furthermore, Amram and Ganor found that dissolution rates were not affected by the addition of up to 0.3 M $NaNO_3$, a compound that is likely to be produced in the claimed invention from the exchange of $Na^+$ in the starting montmorillonite and the resulting $NO_3^-$.

Amram and Ganor performed experiments using flow-through reactors in thermostatic water at temperatures of 25° C., 50° C. and 70° C.±0.1° C. Cf. Amram, K. and Ganor, J., 69 Geochimica et Cosmochimica Acta 2535-2546 (2005). The dissolution rates obtained were based on the release of Si and Al at a steady state. Id. Their results indicate dissolution rate increases with temperature and decreases with increasing pH. Id. They developed a specific model to describe the effect of temperature and pH on the dissolution of smectite. Id. Their model is linearly proportional to concentrations of absorbed protons on the surface of the mineral. Id. They also described proton sorption using a Langmuir adsorption isotherm. Id.

The dissolution rates obtained by Amram and Ganor varied from $2.6\pm0.5\times10^{-12}$ mol $g^{-1}s^{-1}$ to $2.8\pm0.5\times10^{-12}$ mol $g^{-1}s^{-1}$. Cf. Amram, K. and Ganor, J., 69 Geochimica et Cosmochimica Acta 2535-2546 (2005). Therefore, the total range possible for the rate of dissolution of montmorillonite is approximately $2.1\times10^{-12}$ mol $g^{-1}s^{-1}$ to $3.3\times10^{12}$ mol $g^{-1}s^{-1}$.

These results equate to a range of mass loss (i.e., in mol g) between approximately 0.000066 and 0.00011 per year. A conservative estimation based on these numbers indicates that the montmorillonite will be stable for at least 100 years.

IV. Experiments

Volclay SPV 200, an American Colloid product, is placed in aqueous suspension using a ratio range of 20 oz to 60 oz volume Volclay 200 to 5 gallons of water 110.

Optionally, prior to saturation with water 110, Volclay SPV 200 may be pretreated with aqueous NaCl solution. Alternatively, the Volclay SPV 200 may be pretreated with either aqueous NaOH or $NaClO_4$. This process may create an exchanged composition wherein the ions in the interlayer of montmorillonite may be exchanged with $Na^+$ (aq) from the aqueous salt solution. Saturation was allowed to occur overnight. After saturation, the exchanged composition was washed. The process was repeated 5 times to allow for full exchange to take place. Afterwards, the exchanged composition can be washed and tested for residual anions from the aqueous salt solution.

The material is mixed mechanically for 5 minutes and is allowed to stand overnight. The suspension is then filtered through a 45 μm metal screen to remove coarse material. The filtration process breaks up the material and imparts a uniform suspension.

A. Properties of Starting Material

Grain size analysis was performed on the raw starting material (Volclay SPV 200, American Colloid) using standard mechanical sieves. Approximately 100 grams of raw material was analyzed using 8" sieves using fractions between 300 μm and 38 μm. The percentage that passed the 38 μm sieve was included in the analysis. Sieve stacks were shaken mechanically for 15 minutes. Fractions captured in each sieve were then weighed. Normalized percentages of each size fraction were calculated based on the total sum of mass retained in each sieve. Differences between total mass analyzed and total mass retained varied from 3% to 7%.

Grain size analysis indicates that for most analyses, a single normal distribution of particles does not exist in the starting material. The variability in the size distribution of particles is attributed to variation in processing, or natural variability of source material in the mine at the manufacturer's source. The modes at 180 μm, 106 μm, 75 μm, and <38 μm are common. Analyses of grain size distribution at various modes are shown in TABLE 2. These analyses have single and multiple modes.

TABLE 2

Grain Size Distribution by Normalized Percentages for Analyses 1-10

| | 1 | 2 | 3 | 4 | 5 | 6 | 7 | 8 | 9 | 10 |
|---|---|---|---|---|---|---|---|---|---|---|
| 300 μm | 0.11 | 0.14 | 0.06 | 0.22 | 1.62 | 0.67 | 0.37 | 0.07 | 0.070 | 0.051 |
| 250 μm | 0.22 | 0.36 | 0.40 | 0.78 | 0.30 | 0.21 | 0.52 | 0.43 | 0.087 | 0.174 |
| 212 μm | 11.84 | 7.53 | 0.43 | 14.79 | 0.36 | 0.32 | 1.73 | 7.66 | 0.210 | 0.245 |
| 180 μm | 7.68 | 30.14 | 0.58 | 26.61 | 0.73 | 0.53 | 3.76 | 23.54 | 0.576 | 0.562 |
| 150 μm | 3.30 | 19.44 | 0.89 | 16.88 | 1.35 | 1.21 | 9.61 | 17.20 | 0.960 | 1.094 |
| 125 μm | 13.18 | 13.01 | 1.62 | 13.16 | 2.21 | 2.23 | 16.79 | 16.30 | 2.113 | 1.809 |
| 106 μm | 14.10 | 0.78 | 2.50 | 8.09 | 3.24 | 3.02 | 24.71 | 14.00 | 2.235 | 3.741 |
| 90 μm | 0.75 | 5.31 | 8.01 | 1.26 | 5.58 | 6.95 | 0.66 | 0.47 | 20.080 | 13.493 |
| 75 μm | 2.76 | 11.77 | 12.60 | 2.84 | 29.92 | 30.70 | 4.51 | 0.09 | 13.236 | 13.544 |
| 63 μm | 5.13 | 1.71 | 26.66 | 3.89 | 21.48 | 23.87 | 7.44 | 2.03 | 4.226 | 6.930 |
| 53 μm | 14.22 | 6.88 | 24.95 | 7.60 | 13.39 | 18.74 | 14.53 | 9.21 | 11.053 | 15.476 |
| 43 μm | 11.67 | 2.17 | 14.94 | 3.54 | 10.29 | 6.60 | 8.23 | 3.50 | 12.135 | 12.144 |
| 38 μm | 9.88 | 0.77 | 5.96 | 0.30 | 6.80 | 3.07 | 7.13 | 5.51 | 15.872 | 14.535 |
| <38 μm | 5.16 | 0.00 | 0.40 | 0.02 | 2.72 | 1.90 | 0.00 | 0.00 | 17.147 | 16.202 |
| Sum | 100.00 | 100.00 | 100.00 | 100.00 | 100.00 | 100.00 | 100.00 | 100.00 | 100.00 | 100.00 |

The raw material used to make the aqueous clay suspension 115 (e.g., uniform aqueous Na-montmorillonite suspension) is a processed bentonite. The coarse fraction of the raw starting material used to make this technology was investigated using back scatter scanning electron microscopy as a means to characterize the raw material. The mineralogical characteristics of the coarse fraction provide some insight into the nature of the raw material. However, the coarse fraction has a very minimal role in contributing to the properties of the aqueous clay suspension 115. Because the raw material is processed, some small fragments of the coarse fraction minerals may enter the technology product. Therefore, the data on the coarse fraction is useful for forensic purposes once the aqueous clay suspension 115 is deployed. The coarse mineral data also serves as a characteristic of the original material.

Coarse fraction mineral grains varied between very angular to rounded shapes. However, most grains are very angular to angular. Minerals commonly observed are plagioclase, biotite, zircon, quartz, K-feldspar, calcite, and iron oxides. PbS (galena) was also observed. There are two general groups of minerals based on geologic processes. Plagioclase, biotite, zircon, and quartz are volcanic in origin while calcite, K-feldspar, iron oxides, and galena are authigenic in origin. K-feldspar (sanidine) can also be volcanic in origin. Aggregates of calcite and K-feldspar were observed, and galena was observed with these two minerals. Such authigenic mineral associations have been observed in Ordovician bentonites. Energy dispersive spectroscopy (EDS) spectra analyses indicate that the biotite is intermediate in composition with respect to Fe and Mg concentrations. There is also Ti and Cl in the biotite. EDS analyses indicate that the plagioclase is commonly labradoritic to albitic in composition. Zircon crystals are end member composition and no Hf was detected. The detection limit is approximately 1%.

B. Grain Size Analysis of the Aqueous Clay Suspension

For transmission electron microscopy investigation, grain mounts were prepared of the Na-montmorillointe using alcohol as a dispersing medium. Analyses were prepared on 300 mesh hole carbon Cu grids. Analyses were investigated using a 300 kV JEM 3010 transmission electron microscope (TEM) and a 200 kV 2010 scanning transmission electron microscope (SEM).

TEM investigations indicate that the montmorillonite phase used in the process appears dominantly composed of montmorillonite particles (~>95%) and with a lesser amount of silica particles. The morphology of the montmorillonite particles are generally described based on the classification outlined in Güven. See Güven, N. 19 Smectites 495-559 (1988). The montmorillonite from the suspension and process may comprise commonly of foliated lamellar aggregates. Such aggregates may compose about 40 to 75% of the montmorillonite particles. Subhedral platelets and compact subhedral lamellar aggregates may occur as well. Both may make up about 10 to 40% of the montmorillonite particles. Subhedral lamellar aggregates may also occur. These may make up about 5 to 10% of the montmorillonite particles.

Foliated lamellar aggregates may vary in diameter from ~0.2 to >5.0 μm. Subhedral lamellar aggregates may vary in diameter from ~0.1 to ~3.5 μm. Subhedral platelets may vary in diameter from ~0.5 to >5.0 μm.

SAED patterns taken along 00l on discrete particles show concentric rings. Discrete diffraction spots tend to occur, owing to localized regular stacking but are typically not abundant or well ordered. These patterns appear consistent with turbostratic stacking of the 2:1 layers in commonly observed montmorillonite. Diffraction patterns may range from nearly homogenous rings to rings with about 40% spots.

Energy dispersive spectroscopy (EDS) spectra were collected using the 300 kV JEM 3010 TEM. EDS spectra were collected using spot size 2-3. Spectra with Si peaks greater than 100 counters were deemed significant. Variation in intensity was related to apparent thickness. The higher contract particles appeared to produce more intense spectra. Analyses were performed on the center of particles.

Figure 11:
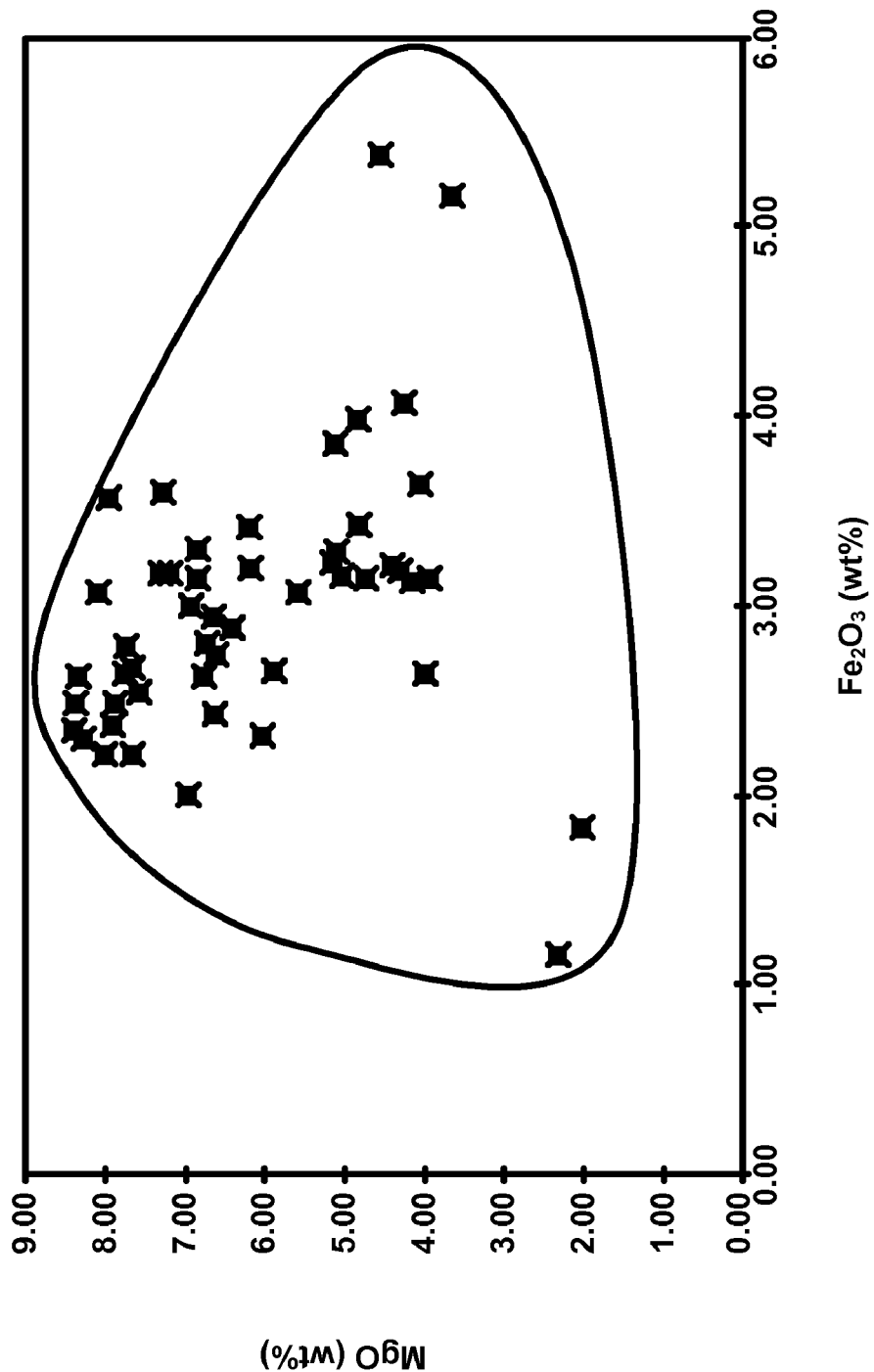
FIG. 11 shows an EDS compositions plot for MgO and $Fe_2O_3$ in wt %.
Figure 12:
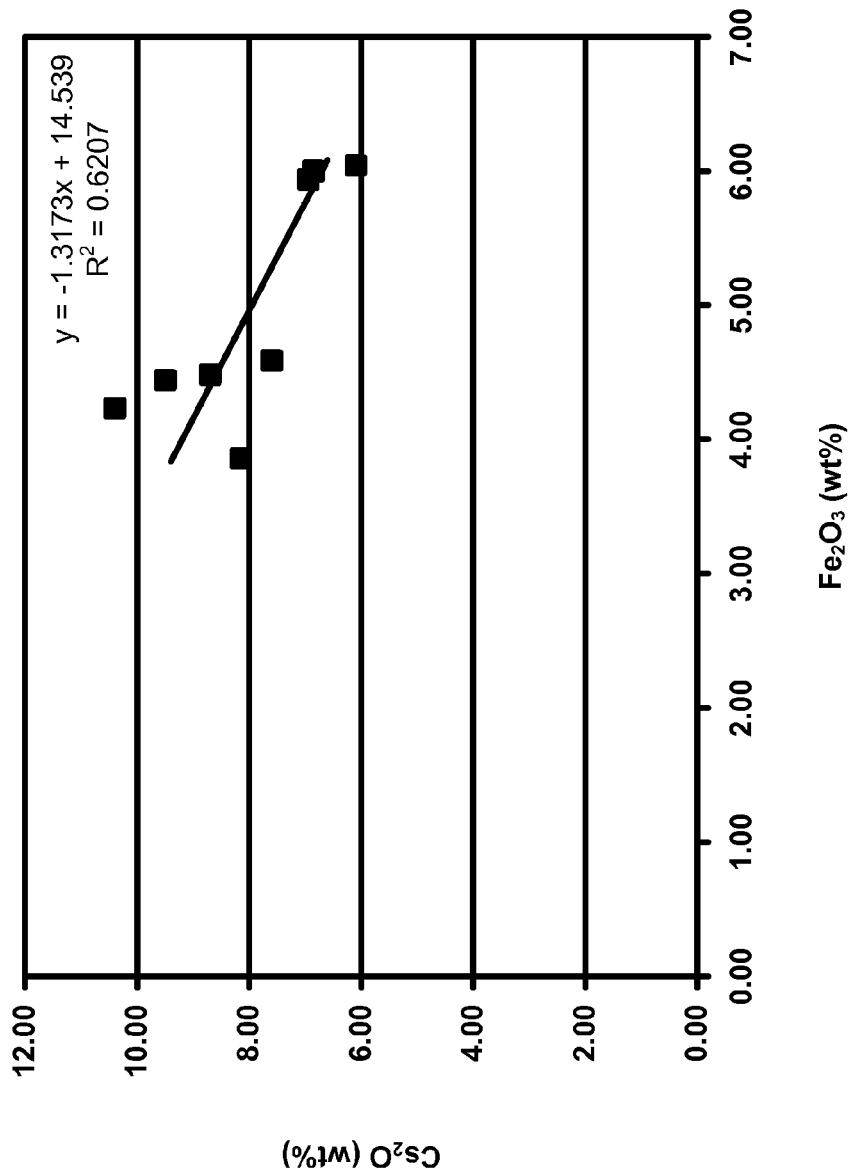
FIG. 12 shows an EDS compositions plot for $Cs_2O$ and $Fe_2O_3$ in wt %.
Figure 13:
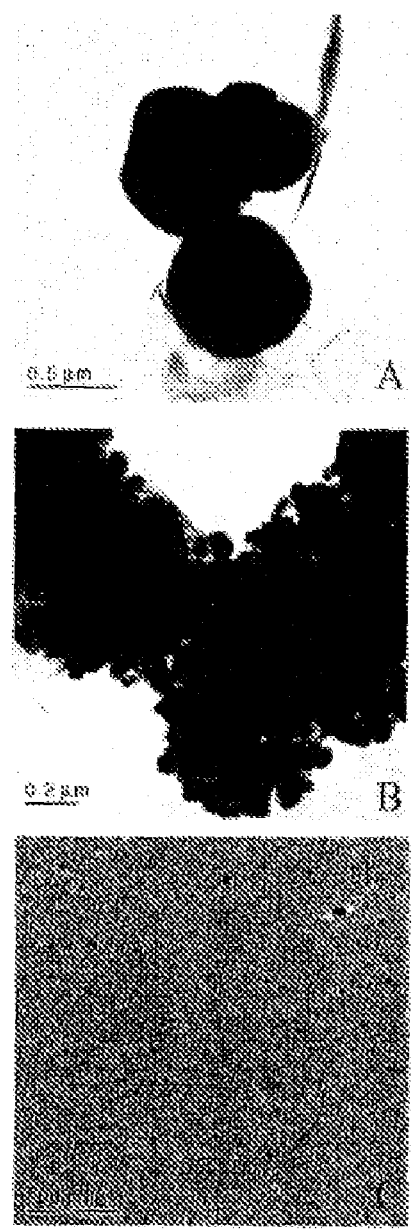
FIG. 13 shows an example of TEM imaging of AgCl crystals.
Figure 14:
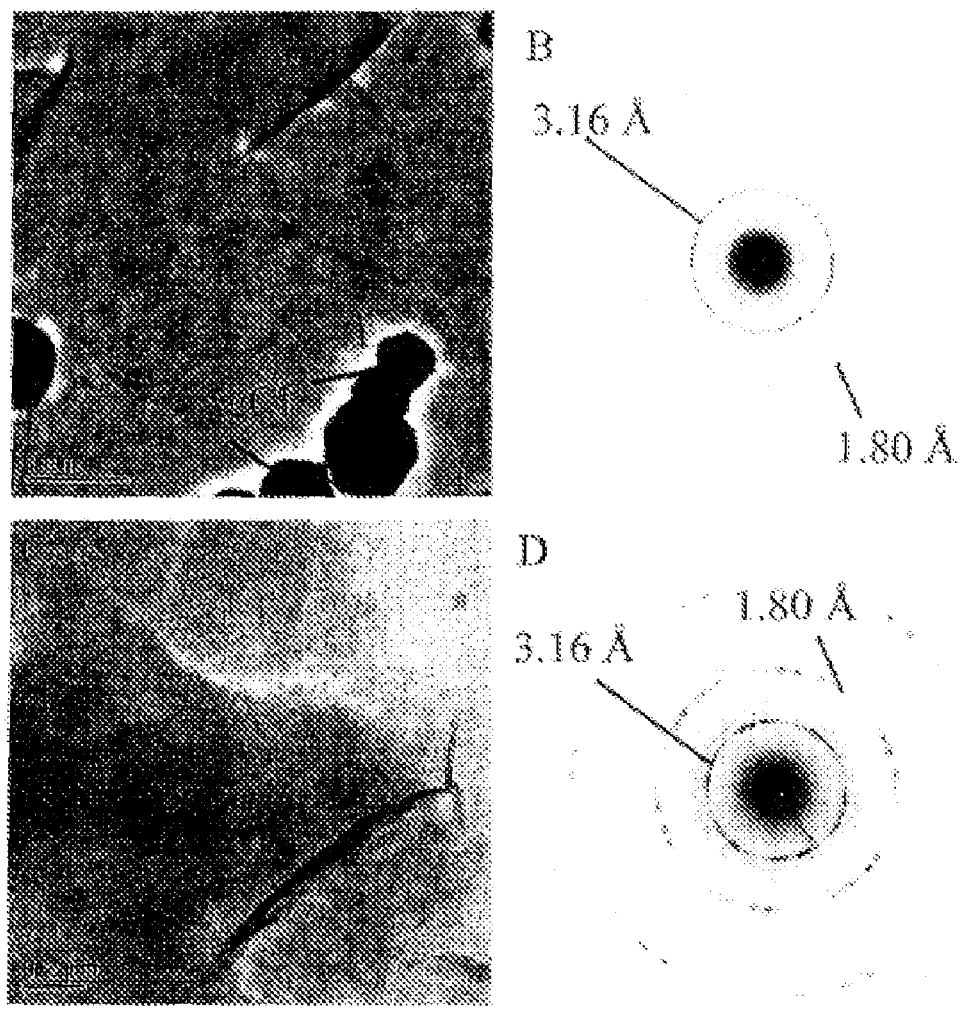
FIG. 14 shows TEM images and SAED of Cs-montmorillonite.
Figure 15:
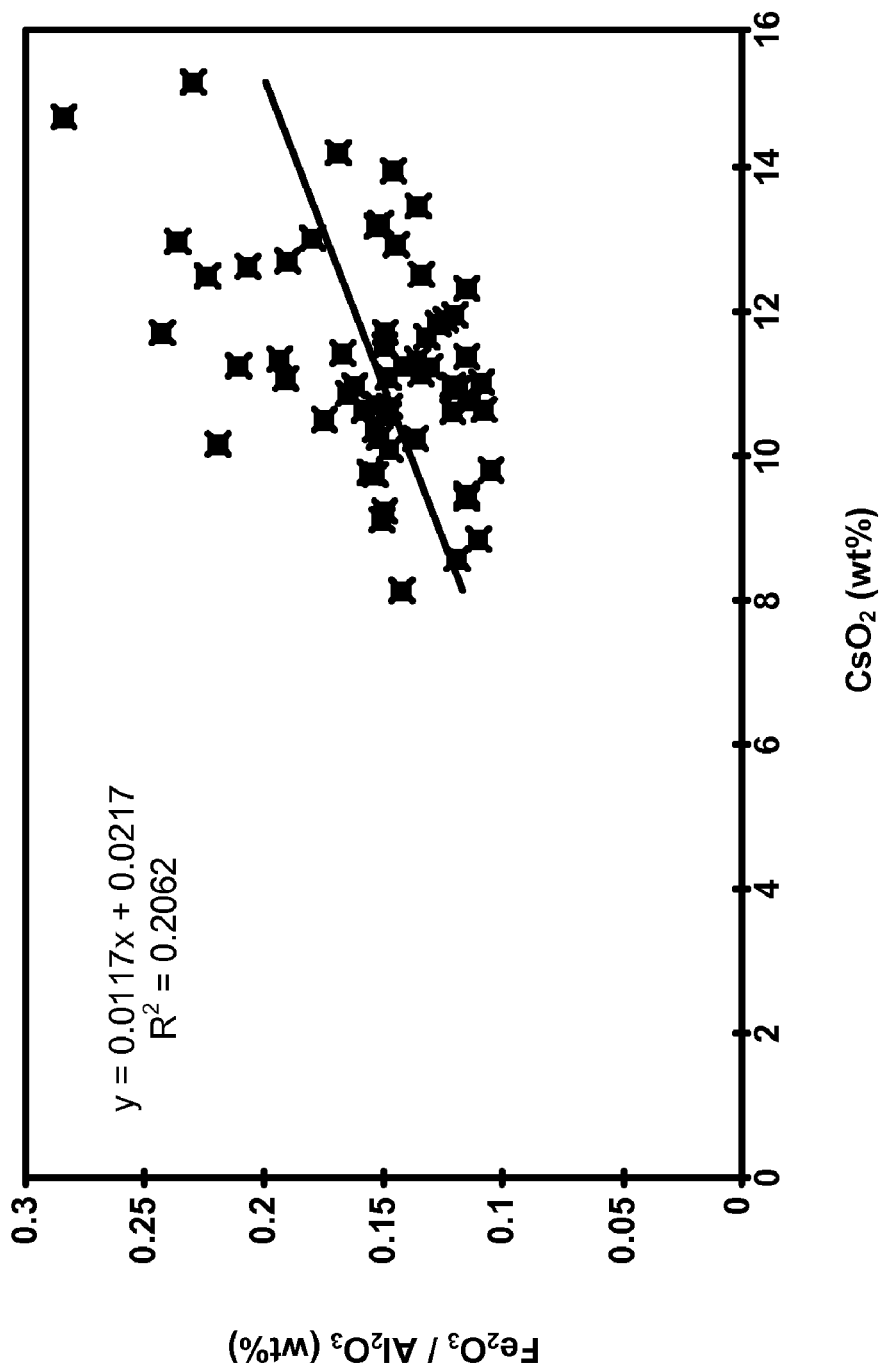
FIG. 15 shows plotted chemical compositions of individual montmorillonite particles from the 10 month stability experiment, where a very weak relationship between $Fe_2O_3/Al_2O_3$ and $Cs_2O$ exists.

The elements observed include Si, Al, Fe, Ca, K, Na and Mg. Systematic drift in EDS analyses occurred. $SiO_2$ concentrations tend to be elevated and $Na_2O$ concentrations may be lower than actual concentrations, owing to diffusion in either the solid state or release of hydrated interlayer sodium cations. EDS data (weight percent of oxides for each experimental run) are provided in TABLES 3-9. The minimum, maximum, median, variance and standard deviation of the elements are presented in TABLE 10. FIGS. 5-12 illustrate some TEM and SAED images of montmorillonite particles. FIGS. 13-15 illustrate plot concentrations of oxides from these tables.

TABLE 3

EDS Data on Montmorillonite - Analyses 1-8

|  | 1 | 2 | 3 | 4 | 5 | 6 | 7 | 8 |
|---|---|---|---|---|---|---|---|---|
| $SiO_2$ | 62.55 | 58.42 | 63.90 | 57.99 | 58.21 | 84.95 | 58.79 | 58.91 |
| $Al_2O_3$ | 25.61 | 26.91 | 23.74 | 27.63 | 29.30 | 10.02 | 27.80 | 27.82 |
| $Fe_2O_3$ | 3.29 | 2.22 | 3.22 | 3.15 | 2.66 | 1.16 | 3.42 | 2.63 |
| MgO | 5.10 | 7.65 | 4.40 | 6.84 | 5.88 | 2.32 | 6.19 | 6.76 |
| CaO | 0.80 | 1.01 | 1.26 | 0.70 | 0.69 | 0.50 | 0.67 | 0.67 |
| $Na_2O$ | 2.59 | 3.74 | 3.40 | 3.60 | 3.24 | 1.16 | 3.11 | 3.12 |
| $K_2O$ | 0.13 | 0.08 | 0.14 | 0.10 | 0.07 | 0.00 | 0.07 | 0.14 |
| SUM | 100.07 | 100.04 | 100.06 | 100.01 | 100.04 | 100.02 | 100.05 | 100.06 |

TABLE 4

EDS Data on Montmorillonite - Analyses 9-15

|  | 9 | 10 | 11 | 12 | 13 | 14 | 15 |
|---|---|---|---|---|---|---|---|
| $SiO_2$ | 54.40 | 63.34 | 62.21 | 57.93 | 59.24 | 62.30 | 62.34 |
| $Al_2O_3$ | 29.75 | 25.34 | 25.14 | 27.93 | 27.48 | 24.91 | 26.33 |
| $Fe_2O_3$ | 2.35 | 3.65 | 3.99 | 3.30 | 3.20 | 3.86 | 3.15 |
| MgO | 8.38 | 4.05 | 4.83 | 6.84 | 6.18 | 5.11 | 4.73 |
| CaO | 0.87 | 1.33 | 0.78 | 0.73 | 0.62 | 0.78 | 0.97 |
| $Na_2O$ | 4.14 | 2.21 | 2.97 | 3.15 | 3.24 | 2.84 | 2.44 |
| $K_2O$ | 0.13 | 0.12 | 0.11 | 0.14 | 0.08 | 0.24 | 0.10 |
| SUM | 100.02 | 100.05 | 100.03 | 100.02 | 100.03 | 100.04 | 100.05 |

TABLE 5

EDS Data on Montmorillonite - Analyses 16-22

|  | 16 | 17 | 18 | 19 | 20 | 21 | 22 |
|---|---|---|---|---|---|---|---|
| $SiO_2$ | 63.67 | 64.05 | 56.13 | 56.80 | 58.32 | 58.27 | 57.99 |
| $Al_2O_3$ | 24.82 | 22.83 | 28.67 | 27.41 | 28.82 | 28.01 | 28.54 |
| $Fe_2O_3$ | 3.19 | 2.00 | 2.79 | 2.63 | 2.32 | 2.95 | 2.80 |
| MgO | 4.30 | 6.96 | 7.74 | 8.33 | 6.03 | 6.64 | 6.72 |
| CaO | 0.99 | 0.70 | 0.71 | 0.77 | 0.66 | 0.74 | 0.69 |
| $Na_2O$ | 2.90 | 3.39 | 3.97 | 3.96 | 3.81 | 3.32 | 3.20 |
| $K_2O$ | 0.18 | 0.12 | 0.04 | 0.16 | 0.08 | 0.12 | 0.10 |
| SUM | 100.05 | 100.05 | 100.05 | 100.05 | 100.03 | 100.05 | 100.04 |

TABLE 6

EDS Data on Montmorillonite - Analyses 23-29

|  | 23 | 24 | 25 | 26 | 27 | 28 | 29 |
|---|---|---|---|---|---|---|---|
| $SiO_2$ | 56.41 | 57.89 | 62.79 | 55.98 | 62.74 | 56.26 | 57.95 |
| $Al_2O_3$ | 27.50 | 28.52 | 25.16 | 28.03 | 26.61 | 28.56 | 27.37 |
| $Fe_2O_3$ | 2.49 | 2.75 | 3.16 | 2.49 | 2.65 | 2.22 | 2.37 |
| MgO | 8.37 | 6.61 | 5.03 | 7.87 | 3.98 | 8.00 | 7.90 |
| CaO | 0.84 | 0.73 | 1.04 | 0.99 | 1.09 | 0.69 | 0.62 |
| $Na_2O$ | 4.35 | 3.50 | 2.75 | 4.56 | 2.88 | 4.19 | 3.74 |
| $K_2O$ | 0.07 | 0.06 | 0.12 | 0.12 | 0.07 | 0.12 | 0.08 |
| SUM | 100.02 | 100.04 | 100.04 | 100.04 | 100.03 | 100.03 | 100.03 |

TABLE 7

EDS Data on Montmorillonite - Analyses 30-36

|  | 30 | 31 | 32 | 33 | 34 | 35 | 36 |
|---|---|---|---|---|---|---|---|
| $SiO_2$ | 57.39 | 58.68 | 60.60 | 56.99 | 57.78 | 56.60 | 80.96 |
| $Al_2O_3$ | 27.50 | 28.18 | 26.25 | 27.82 | 27.67 | 27.52 | 12.74 |

TABLE 7-continued

EDS Data on Montmorillonite - Analyses 30-36

|  | 30 | 31 | 32 | 33 | 34 | 35 | 36 |
|---|---|---|---|---|---|---|---|
| $Fe_2O_3$ | 2.55 | 2.89 | 3.07 | 3.17 | 3.00 | 3.60 | 1.83 |
| MgO | 7.57 | 6.41 | 5.58 | 7.30 | 6.92 | 7.27 | 2.03 |
| CaO | 0.74 | 0.66 | 0.73 | 0.91 | 0.94 | 0.97 | 0.73 |
| $Na_2O$ | 4.25 | 3.12 | 3.67 | 3.74 | 3.55 | 3.92 | 1.61 |
| $K_2O$ | 0.04 | 0.13 | 0.12 | 0.10 | 0.17 | 0.16 | 0.14 |
| SUM | 100.04 | 100.06 | 100.03 | 100.03 | 100.03 | 100.03 | 100.03 |

TABLE 8

EDS Data on Montmorillonite - Analyses 37-43

|  | 37 | 38 | 39 | 40 | 41 | 42 | 43 |
|---|---|---|---|---|---|---|---|
| $SiO_2$ | 57.89 | 62.06 | 65.29 | 56.69 | 57.82 | 64.97 | 59.09 |
| $Al_2O_3$ | 26.89 | 23.74 | 22.55 | 27.30 | 27.18 | 23.74 | 27.90 |
| $Fe_2O_3$ | 3.17 | 5.39 | 4.08 | 3.07 | 2.65 | 3.15 | 2.43 |
| MgO | 7.19 | 4.55 | 4.25 | 8.08 | 7.75 | 3.93 | 6.62 |
| CaO | 0.87 | 0.81 | 1.18 | 0.59 | 0.80 | 1.22 | 0.70 |
| $Na_2O$ | 3.92 | 3.35 | 2.48 | 4.28 | 3.67 | 2.61 | 3.24 |
| $K_2O$ | 0.13 | 0.16 | 0.22 | 0.13 | 0.17 | 0.41 | 0.05 |
| SUM | 100.06 | 100.05 | 100.04 | 100.04 | 100.04 | 100.02 | 100.02 |

TABLE 9

EDS Data on Montmorillonite - Analyses 44-50

|  | 44 | 45 | 46 | 47 | 48 | 49 | 50 |
|---|---|---|---|---|---|---|---|
| $SiO_2$ | 63.47 | 54.83 | 56.50 | 62.66 | 55.88 | 62.87 | 62.79 |
| $Al_2O_3$ | 23.81 | 28.35 | 28.35 | 26.38 | 28.58 | 24.27 | 24.51 |
| $Fe_2O_3$ | 5.18 | 3.58 | 2.67 | 3.13 | 2.30 | 3.43 | 3.23 |
| MgO | 3.65 | 7.95 | 7.65 | 4.15 | 8.27 | 4.81 | 5.15 |
| CaO | 1.05 | 0.90 | 0.74 | 0.74 | 0.76 | 0.87 | 1.04 |
| $Na_2O$ | 2.71 | 4.32 | 4.09 | 2.89 | 4.19 | 3.56 | 3.19 |
| $K_2O$ | 0.17 | 0.13 | 0.04 | 0.08 | 0.08 | 0.22 | 0.13 |
| SUM | 100.05 | 100.05 | 100.04 | 100.04 | 100.05 | 100.03 | 100.03 |

TABLE 10

Summary of Weight % of Oxides in Montmorillonite

|  | $SiO_2$ | $Al_2O_3$ | $Fe_2O_3$ | MgO | CaO | $Na_2O$ | $K_2O$ |
|---|---|---|---|---|---|---|---|
| Minimum | 54.40 | 10.02 | 1.16 | 2.03 | 0.50 | 1.16 | 0.00 |
| Maximum | 84.85 | 29.75 | 5.39 | 8.38 | 1.33 | 4.56 | 0.41 |
| Median | 58.55 | 27.39 | 3.04 | 6.62 | 0.78 | 3.37 | 0.12 |
| Variance | 30.19 | 12.50 | 0.53 | 2.72 | 0.03 | 0.49 | 0.00 |
| Standard Deviation | 5.494548 | 3.536003 | 0.729237 | 1.650329 | 0.182751 | 0.700133 | 0.063435 |

Figure 5:
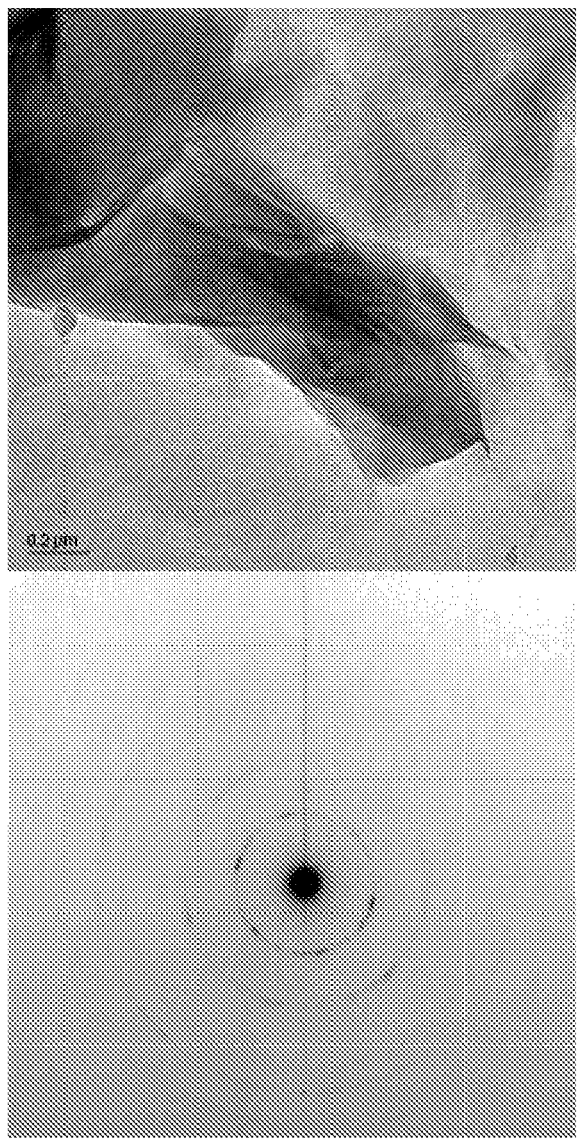
FIG. 5 shows an example of a TEM image depicting a foliated lamellar aggregate and an SAED diffraction pattern.

FIG. 5 shows a representative TEM image showing a foliated lamellar aggregate. The SAED diffraction pattern illustrates streaking, which is indicative of turbostratic stacking.

Figure 6:
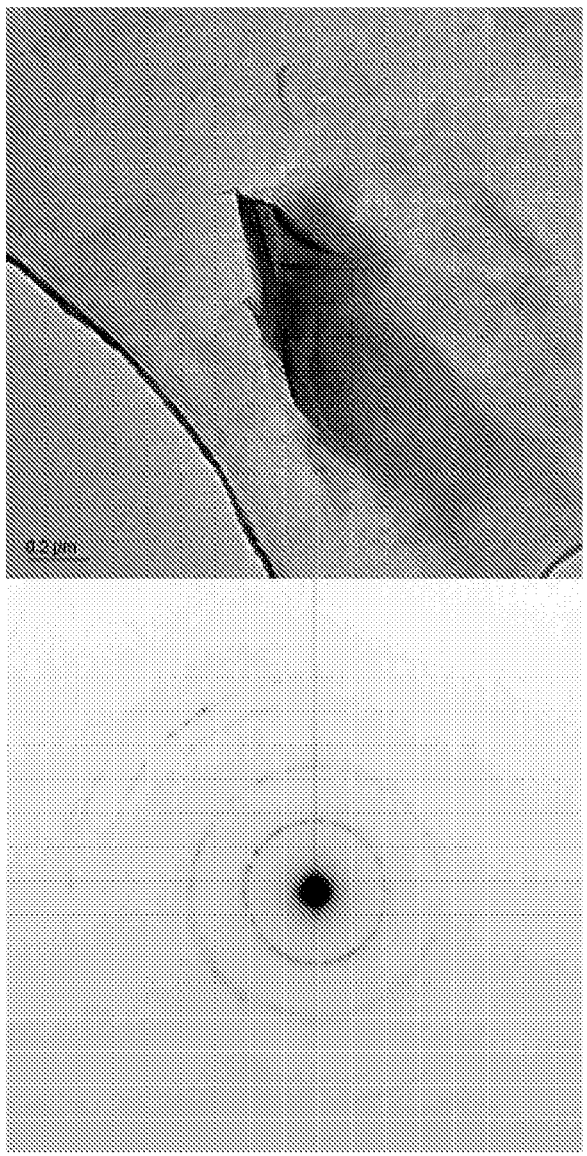
FIG. 6 shows another example of a TEM image depicting a foliated lamellar aggregate and an SAED diffraction pattern.

FIG. 6 shows another representative TEM image showing a foliated lamellar aggregate. The SAED diffraction pattern illustrates streaking, which is indicative of turbostratic stacking. Some spots are evident.

Figure 7:
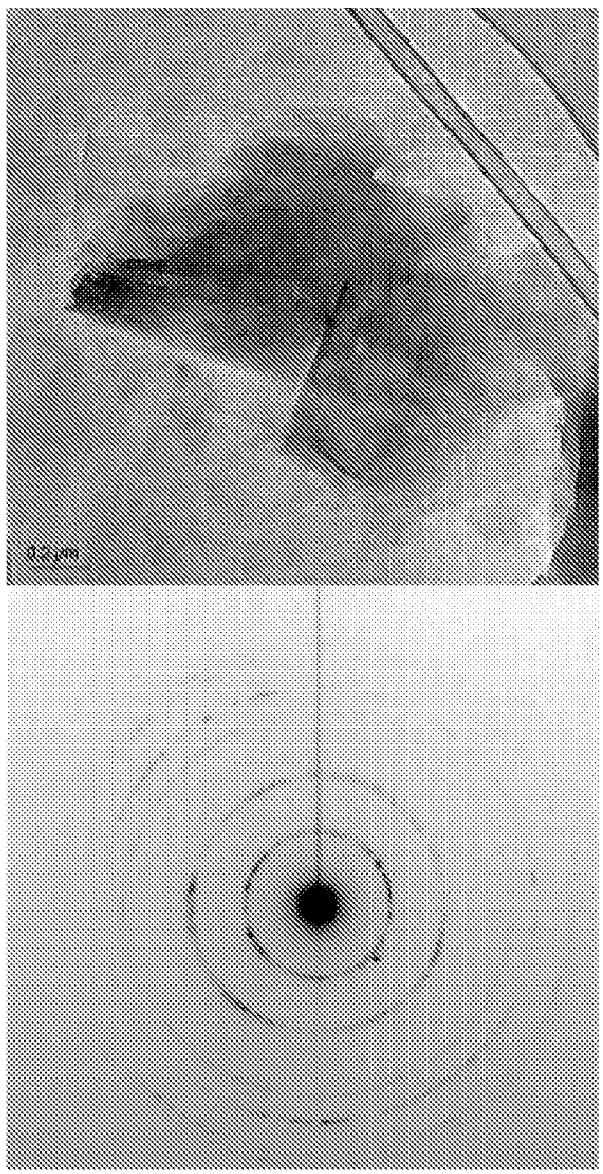
FIG. 7 shows an example of a TEM image depicting subhedral platelets surrounded by subhedral lamellar aggregates and an SAED diffraction pattern.

FIG. 7 shows a representative TEM image showing subhedral platelets surrounded by subhedral lamellar aggregates. The SAED diffraction pattern illustrates streaking, which is indicative of turbostratic stacking. Some well developed spots are evident and indicate a weak degree of stacking order over a limited range.

Figure 8:
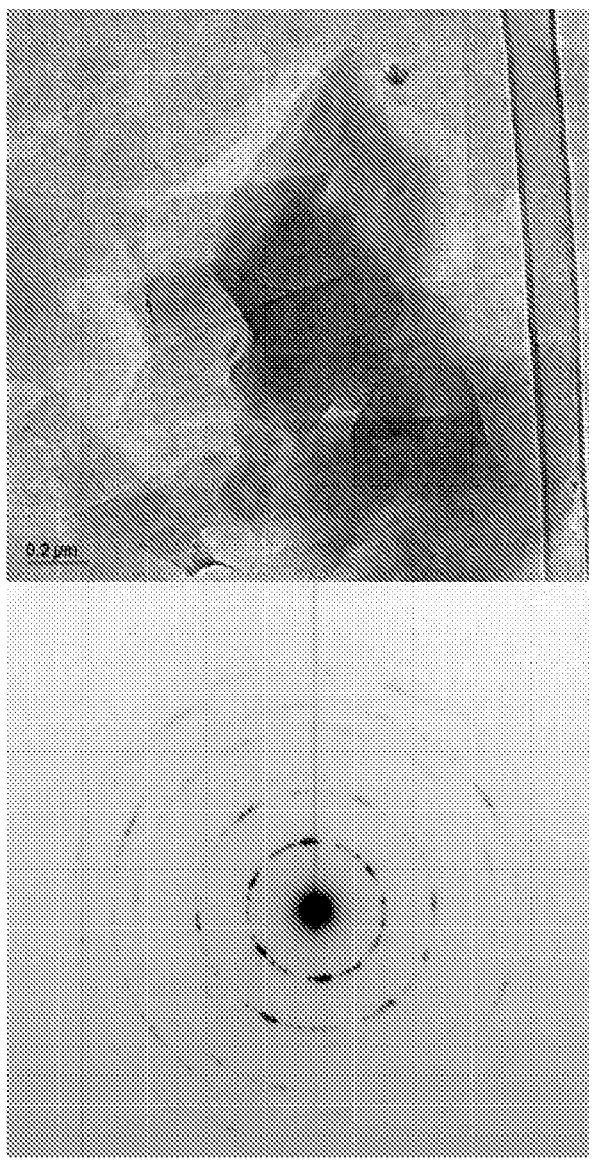

FIG. 8 shows a representative TEM image showing subhedral platelets surrounded by a lesser amount of subhedral lamellar aggregates. The SAED diffraction pattern illustrates streaking, which is indicative of turbostratic stacking. Some well developed spots are evident and show that there is a degree of stacking order in this grain.

Figure 9:
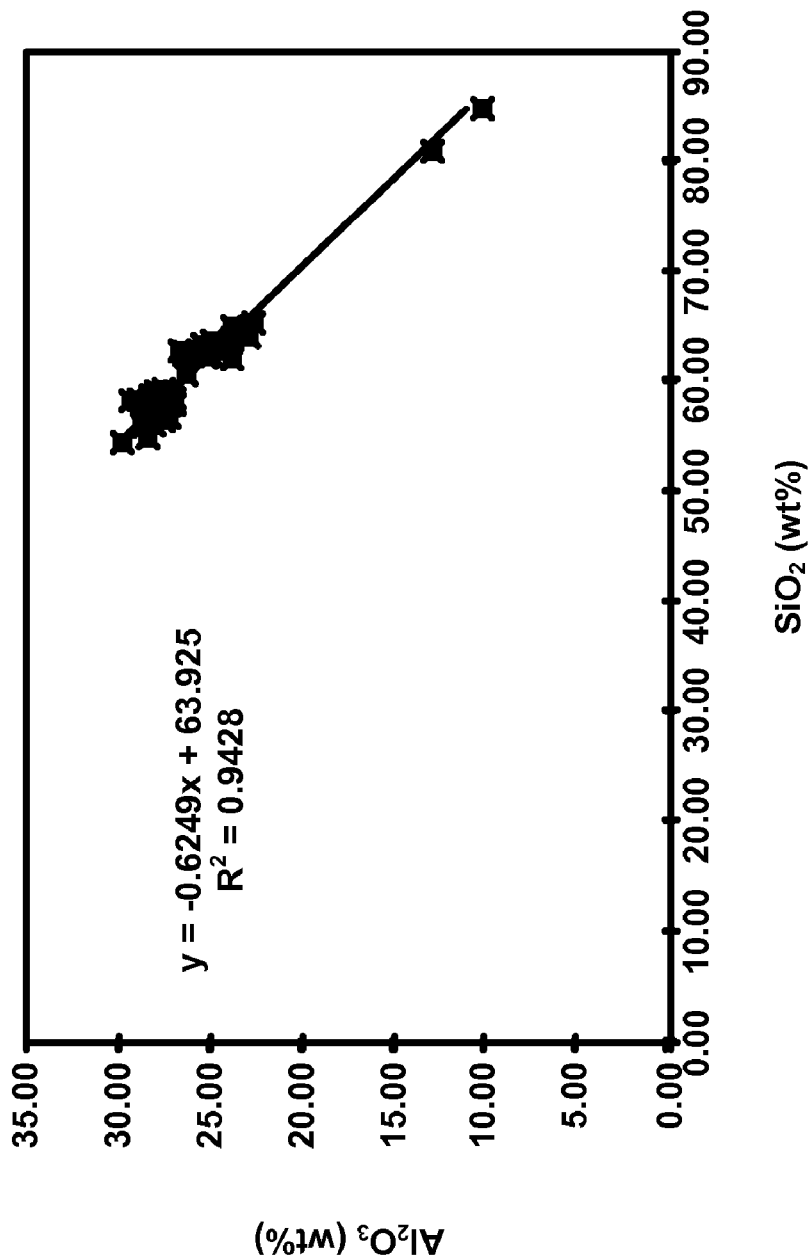
FIG. 9 shows an EDS compositions plot for $Al_2O_3$ and $SiO_2$ in wt %.

FIG. 9 shows an X-Y plot of EDS compositions for $Al_2O_3$ and $SiO_2$ in wt %. A linear trend occurs in the montmorillonite over a broad range of compositions. This trend indicates a fundamental composition intrinsic to the montmorillonite. Other similar trends may be observed in substitution montmorillonites.

Figure 10:
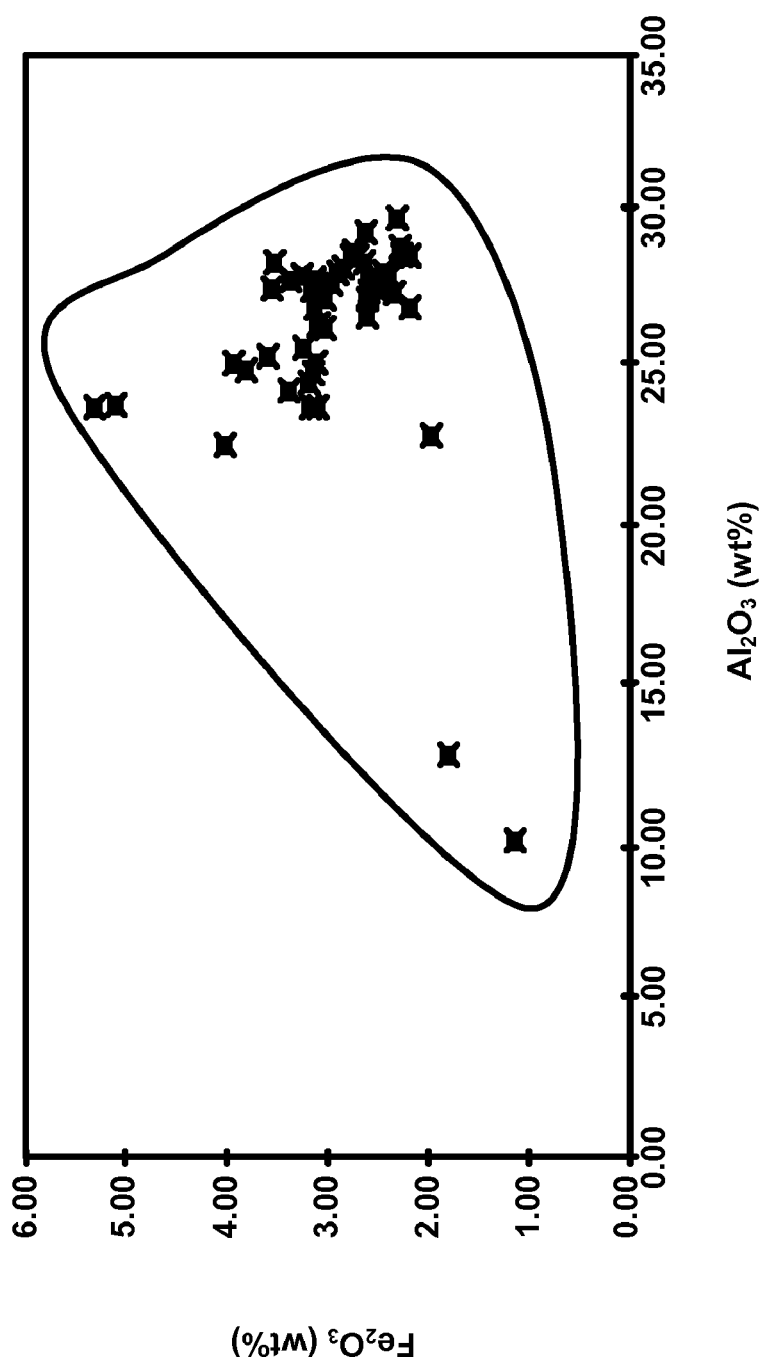
FIG. 10 shows an EDS compositions plot for $Al_2O_3$ and $Fe_2O_3$ in wt %.

FIG. 10 shows an X-Y plot of EDS compositions for $Al_2O_3$ and $Fe_2O_3$ in wt %. FIG. 11 shows an X-Y plot of EDS compositions for MgO and $Fe_2O_3$ in wt %. In each figure, a field occurs in the montmorillonite over a broad range of compositions. This field delineates a compositional space and indicates a fundamental chemical composition intrinsic to the montmorillonite.

C. Relevance of pH Values

The pH values of solutions and suspensions are critical data for understanding the mechanisms of the chemistry of the solutions and suspensions. The range of pH values observed in the reacted material serves as a function of the degree of reaction that has taken place. Below are described pH data from bulk experiments.

For example, $NO_3^-$ from a 0.05 N $AgNO_3$ solution is not precipitated in any phase and is ambient in the solution. Accordingly, $NO_3^-$ equilibrates to $HNO_3$, giving rise to more acid conditions in reacted supernatant fluids.

1. Montmorillonite Suspensions pH Analyses

As shown in TABLE 11, the following pH values were obtained for the montmorillonite used in the experiments. The montmorillonite here has not yet been applied to a chloride containing substance or treated with $AgNO_3$ (aq).

TABLE 11 pH Values of Montmorillonite Suspensions

| Analysis # | pH | mV | Temperature (° C.) |
|---|---|---|---|
| 1 | 9.15 | −141.8 | 18.6 |
| 2 | 9.13 | −140.1 | 18.1 |
| 3 | 9.19 | −143.9 | 18.7 |
| 4 | 8.59 | −108.5 | 18.6 |
| 5 | 9.10 | −139.4 | 18.5 |
| 6 | 9.25 | −147.6 | 18.4 |
| 7 | 9.26 | −148.3 | 18.7 |
| 8 | 9.29 | −150.4 | 18.5 |
| 9 | 9.30 | −151.9 | 18.6 |
| 10 | 9.33 | −152.7 | 18.5 |
| 11 | 9.21 | −145.9 | 18.4 |
| 12 | 9.30 | −150.7 | 18.8 |

2. pH of Na-montmorillonite

In addition to the data above, the pH of Na-montmorillonite was measured in forty other different analyses. The pH values of several preparations of the aqueous clay suspension 115 were measured directly using an accumet XL 15 pH meter. Each measurement took between 10 and 20 minutes to stabilize. The pH value gradually would climb from approximately 7 to final numbers obtained. A stable value was considered to be one that did not fluctuate for 3 minutes. Three measurements were made for each analysis. For each weight percent solid determination, the product was placed in aluminum dishes and heated at 120° C. for a minimum of 24 hours. The pH values varied from 8.60 to 9.42 with 9.21 being the average. The standard deviation is 0.19. Weight percent solids varied from 2.60 to 13.99 with 5.33 being the average. The standard deviation is 4.28. The data is shown in TABLES 12-13.

Although the pH is elevated with respect to environmental waters, it is still comparatively low compared to many bases, and therefore is safe for building materials to which it would be applied. The pH range is also acceptable for short term human exposure.

TABLE 12 pH and mV of Na-montmorillonite

| | pH | | | | mV | | |
|---|---|---|---|---|---|---|---|
| Analysis | Trial 1 | Trial 2 | Trial 3 | Average | Trial 1 | Trial 2 | Trial 3 |
| 1 | 9.24 | 9.35 | 9.34 | 9.31 | −146.1 | −151.3 | −151.3 |
| 2 | 9.31 | 9.25 | 9.29 | 9.28 | −149.3 | −146.4 | −148.6 |
| 3 | 9.31 | 9.34 | 9.34 | 9.33 | −150.0 | −151.2 | −151.1 |
| 4 | 9.35 | 9.33 | 9.33 | 9.34 | −151.4 | −150.1 | −150.5 |
| 5 | 9.40 | 9.39 | 9.39 | 9.39 | −154.9 | −154.2 | −153.6 |
| 6 | 9.42 | 9.36 | 9.36 | 9.38 | −156.5 | −152.5 | −152.9 |
| 7 | 9.37 | 9.34 | 9.34 | 9.35 | −152.7 | −151.6 | −150.8 |
| 8 | 9.32 | 9.29 | 9.28 | 9.30 | −149.9 | −148.5 | −147.9 |
| 9 | 9.38 | 9.35 | 9.31 | 9.35 | −154.0 | −152.2 | −149.9 |
| 10 | 9.35 | 9.34 | 9.29 | 9.33 | −151.8 | −151.7 | −148.5 |
| 11 | 9.31 | 9.26 | 9.28 | 9.28 | −149.4 | −146.5 | −147.9 |
| 12 | 8.69 | 8.77 | 8.81 | 8.76 | −113.5 | −118.1 | −120.1 |
| 13 | 9.04 | 9.05 | 9.07 | 9.05 | −133.8 | −134.3 | −135.6 |
| 14 | 9.20 | 9.15 | 9.15 | 9.17 | −143.3 | −140.4 | −140.4 |
| 15 | 9.17 | 9.12 | 9.12 | 9.14 | −141.9 | −138.8 | −138.6 |
| 16 | 9.15 | 9.13 | 9.11 | 9.13 | −140.1 | −139.0 | −137.8 |
| 17 | 9.21 | 9.19 | 9.19 | 9.20 | −143.9 | −142.7 | −142.6 |
| 18 | 8.61 | 8.88 | 8.84 | 8.78 | −108.6 | −124.6 | −122.6 |
| 19 | 9.12 | 9.07 | 9.12 | 9.10 | −139.4 | −135.8 | −139.2 |
| 20 | 9.27 | 9.22 | 9.23 | 9.24 | −147.6 | −145.0 | −145.8 |
| 21 | 9.28 | 9.31 | 9.31 | 9.30 | −148.2 | −150.2 | −150.1 |
| 22 | 9.31 | 9.30 | 9.30 | 9.30 | −150.4 | −149.4 | −149.4 |
| 23 | 9.32 | 9.32 | 9.30 | 9.31 | −150.9 | −151.0 | −149.8 |
| 24 | 9.35 | 9.36 | 9.31 | 9.34 | −152.7 | −153.4 | −150.4 |
| 25 | 9.23 | 9.25 | 9.32 | 9.27 | −145.9 | −146.8 | −150.9 |
| 26 | 9.32 | 9.31 | 9.29 | 9.31 | −150.7 | −150.2 | −149.4 |
| 27 | 8.60 | 8.80 | 8.67 | 8.69 | −108.4 | −120.4 | −112.2 |
| 28 | 9.08 | 9.08 | 9.15 | 9.10 | −136.5 | −136.8 | −141.2 |
| 29 | 9.09 | 9.05 | 9.02 | 9.05 | −137.3 | −134.9 | −133.3 |
| 30 | 9.20 | 9.19 | 9.20 | 9.20 | −143.7 | −143.3 | −143.6 |
| 31 | 9.32 | 9.34 | 9.32 | 9.33 | −151.2 | −152.4 | −151.1 |
| 32 | 9.42 | 9.40 | 9.38 | 9.40 | −157.2 | −156.6 | −154.8 |
| 33 | 9.31 | 9.34 | 9.14 | 9.26 | −151.1 | −153.2 | −141.9 |
| 34 | 9.33 | 9.39 | 9.36 | 9.36 | −153.3 | −156.9 | −154.9 |
| 35 | 9.23 | 9.27 | 9.30 | 9.27 | −147.2 | −149.5 | −151.5 |
| 36 | 9.37 | 9.39 | 9.41 | 9.39 | −155.4 | −156.8 | −158.0 |
| 37 | 9.40 | 9.44 | 9.44 | 9.43 | −157.7 | −159.6 | −159.6 |
| 38 | 8.87 | 8.89 | 8.90 | 8.89 | −126.1 | −126.1 | −127.6 |
| 39 | 8.90 | 8.92 | 8.96 | 8.93 | −127.7 | −127.7 | −130.4 |
| 40 | 8.93 | 8.93 | 8.95 | 8.94 | −128.7 | −128.7 | −130.1 |
| Average | 9.20 | 9.21 | 9.21 | 9.21 | −144.0 | −144.5 | −144.1 |
| Maximum | 9.42 | 9.44 | 9.44 | 9.43 | −108.4 | −118.1 | −112.2 |
| Minimum | 8.60 | 8.77 | 8.67 | 8.69 | −157.7 | −159.6 | −159.6 |
| Std. Dev. | 0.191 | | | | | | |

TABLE 13

Temp (° C.) and Weight % Solid of Na-Montmorillonite for the Respective pH and mV Values in Table 12

| | Temp (C.) | | | |
|---|---|---|---|---|
| Analysis | Trial 1 | Trial 2 | Trial 3 | % solid |
| 1 | 18.0 | 15.9 | 17.1 | 2.94 |
| 2 | 17.1 | 17.3 | 17.3 | 2.89 |
| 3 | 17.2 | 17.1 | 16.4 | 3.00 |
| 4 | 16.3 | 15.5 | 16.9 | 2.97 |
| 5 | 17.2 | 17.2 | 17.1 | 2.98 |
| 6 | 17.6 | 17.5 | 17.3 | 2.96 |
| 7 | 16.7 | 17.2 | 16.3 | 2.94 |
| 8 | 17.1 | 16.8 | 17.2 | 2.95 |
| 9 | 17.8 | 17.4 | 17.6 | 3.01 |
| 10 | 17.3 | 17.6 | 17.1 | 3.05 |
| 11 | 17.0 | 16.9 | 17.2 | 2.99 |
| 12 | 18.2 | 17.8 | 17.0 | 2.87 |
| 13 | 17.7 | 17.4 | 17.8 | 2.98 |
| 14 | 17.9 | 18.0 | 18.1 | 2.99 |

TABLE 13-continued

Temp (° C.) and Weight % Solid of Na-Montmorillonite for the Respective pH and mV Values in Table 12

| Analysis | Temp (C.) | | | % solid |
|---|---|---|---|---|
| | Trial 1 | Trial 2 | Trial 3 | |
| 15 | 18.0 | 17.9 | 18.0 | 3.04 |
| 16 | 17.1 | 17.2 | 17.6 | 3.09 |
| 17 | 17.5 | 17.5 | 17.5 | 2.77 |
| 18 | 18.9 | 18.7 | 18.8 | 2.60 |
| 19 | 18.6 | 18.6 | 18.7 | 2.67 |
| 20 | 18.4 | 18.5 | 18.6 | 2.68 |
| 21 | 18.2 | 18.6 | 18.6 | 2.77 |
| 22 | 18.1 | 18.1 | 17.9 | 2.72 |
| 23 | 18.4 | 18.4 | 18.5 | 2.69 |
| 24 | 18.7 | 18.5 | 18.6 | 2.73 |
| 25 | 18.7 | 18.4 | 19.0 | 2.72 |
| 26 | 18.6 | 18.8 | 18.6 | 2.75 |
| 27 | 18.9 | 18.7 | 18.8 | 2.92 |
| 28 | 18.5 | 18.5 | 18.8 | 3.08 |
| 29 | 18.8 | 18.8 | 19.0 | 3.00 |
| 30 | 18.5 | 18.6 | 18.6 | 3.10 |
| 31 | 19.4 | 19.4 | 19.4 | 12.32 |
| 32 | 19.8 | 19.8 | 19.7 | 11.70 |
| 33 | 20.1 | 20.6 | 20.6 | 13.38 |
| 34 | 21.8 | 21.6 | 21.6 | 10.90 |
| 35 | 21.7 | 21.5 | 21.5 | 12.76 |
| 36 | 21.3 | 21.5 | 21.5 | 13.08 |
| 37 | 21.6 | 21.6 | 21.7 | 13.99 |
| 38 | 20.7 | 20.7 | 20.7 | 12.43 |
| 39 | 20.4 | 20.4 | 20.4 | 13.04 |
| 40 | 20.7 | 20.4 | 20.4 | 12.62 |
| | | | Average | 5.33 |
| | | | Maximum | 13.99 |
| | | | Minimum | 2.60 |
| | | | Std. Dev. | 4.288 |

3. AgNO$_3$ Solution Experiment

In this set of experiments, pH values were obtained for the 0.05 N AgNO$_3$ solution. The observed pH values varied from about 3.22 to about 4.6. As shown in TABLE 14, these values tend to range low because the base pair for Ag$^+$, AgOH is much weaker than the acid HNO$_3$. The 4.6 reading was obtained after the solution may be a result of allowing the solution to sit overnight, equilibrate with atmospheric CO$_2$, and/or be a product from light. However, this higher value indicates how the solution can intrinsically behave in open air.

TABLE 14

Representative pH Values of 0.05 N AgNO$_3$ Solution Used in Experiments

| Analysis # | pH | mV | Temperature (° C.) |
|---|---|---|---|
| 1 | 3.22 | 199.5 | 23 |
| 2 | 3.28 | 197.2 | 23 |
| 3 | 4.6 | 156.6 | 18 |
| 4 | 3.55 | 185.0 | 21 |
| 5 | 3.25 | 198.5 | 22 |

4. Chloride Powders Experiment

In this set of experiments, chloride powders (i.e., CsCl, SrCl$_2$.6H$_2$O and BaCl$_2$) were reacted with the montmorillonite technology and were then mixed with variable amounts of 0.05 N AgNO$_3$ solution. The AgNO$_3$ solution had approximately between 150 ml and 10 ml per 0.014 mol cation equivalent.

Specifically, 2.5 g of equivalent Cs cation, 3.082 g of equivalent Ba cation and 3.944 g of equivalent Sr cation were used. Each of these piles was sprayed 20 times with a slurry of Na-montmorillonite. Thereafter, each pile was removed and placed into a beaker. The beaker was then filled with more Na-montmorillonite slurry until there was 100 ml of combined substance. Approximately 50 ml of de-ionized water may be added to each beaker to aid dissolution of each respective salt. An additional 50 ml was added to ach beaker for a total of 200 ml of mixture. To these mixtures, a volume of 10 ml, 50 ml, 100 ml, and 150 ml of 0.05 N AgNO$_3$.

The pH data from replicate measurements from the resulting mixtures ranged from about 6.76 to 7.61, as shown in TABLE 15. This range indicates that the waste is not corrosive and could be stored in a variety of containers. Examples of containers include, but are not limited to, stainless steel, plastic lined drums, metal drums, or other storage tanks made of polymers, metals or a combination of materials.

TABLE 15 pH Values of Mixed Waste

| Analysis # | pH | mV | Temperature (° C.) |
|---|---|---|---|
| 1 | 6.76 | −3.5 | 23.5 |
| 2 | 6.97 | −7.8 | 23.6 |
| 3 | 7.14 | −17.5 | 23.6 |
| 4 | 7.10 | −15.2 | 23.3 |
| 5 | 7.20 | −21.6 | 23.6 |
| 6 | 7.34 | −29.9 | 23.6 |
| 7 | 7.28 | −25.9 | 23.6 |
| 8 | 7.55 | −41.7 | 23.3 |
| 9 | 7.60 | −45.2 | 23.6 |
| 10 | 7.61 | −45.4 | 23.4 |
| 11 | 7.31 | −27.5 | 23.6 |
| 12 | 7.41 | −33.7 | 23.6 |
| 13 | 7.39 | −32.3 | 23.4 |
| 14 | 7.47 | −37.4 | 23.4 |
| 15 | 7.52 | −39.3 | 23.4 |
| Average | 7.31 | −28.26 | 23.50 |
| Minimum | 6.76 | −45.40 | 23.30 |
| Maximum | 7.61 | −3.50 | 23.60 |

For the same experiment above, supernatant solutions were also obtained. The pH data from replicate measurements from the resulting solutions separated from the water mixture are provided below. The pH values are between approximately 6.9 and approximately 7.53, as shown in TABLE 16. As above, this range indicates (and perhaps reaffirms) that the waste is not corrosive and could be stored in a variety of containers. Again, nonlimiting examples of containers include: stainless steel, plastic lined drums, metal drums, or other storage tanks made of polymers, metals or a combination of materials.

TABLE 16

Representative pH Values of Supernatant Solution from Experiments where Waste from CsCl, BaCl$_2$ and SrCl$_2$· 6H$_2$O were Mixed

| Analysis # | pH | mV | Temperature (° C.) |
|---|---|---|---|
| 1 | 7.38 | −31.9 | 23.8 |
| 2 | 7.53 | −40.8 | 23.4 |
| 3 | 7.34 | −29.3 | 23.7 |
| 4 | 7.5 | −39 | 23.8 |
| 5 | 6.9 | −16.3 | 23.7 |
| 6 | 6.94 | −17.3 | 23.8 |
| 7 | 6.98 | −19.3 | 23.7 |
| 8 | 7.02 | −23 | 23.8 |
| 9 | 7.05 | −23.5 | 23.7 |
| 10 | 7.08 | −27.9 | 23.8 |

5. Pure End Member Experiment

Below demonstrates an example of a pure end member reaction. Here, 100 ml of 0.05 N AgNO$_3$ solution was reacted with 100 ml of 0.25 M Cl. The solution immediately turned white as expected. As shown in TABLE 17, the pH values for the resulting solution varied from about 6.47 to about 6.96. This near neutral pH range occurs because the acid-base pairs for Ag$^+$, Cs, Cl$^-$ and NO$_3^-$ are of similar strength with HNO$_3$, making a slightly stronger acid in the system than equilibration of the base CsOH. Also, this range indicates that the waste is stable for storage in the same or similar manner as described above, where a variety of containers may be used.

TABLE 17 pH Values of Resulting Suspension from the Reaction of 100 ml of 0.05 N AgNO$_3$ Solution was Reacted with 100 ml of 0.25 M Cl Solution

| Analysis # | pH | mV | Temperature (° C.) |
|---|---|---|---|
| 1 | 6.47 | −10.9 | 23.1 |
| 2 | 6.92 | −13.9 | 23.1 |
| 3 | 7 | −18.9 | 23.2 |
| 4 | 6.96 | −18.2 | 23.1 |
| 5 | 6.88 | −13.3 | 23.2 |
| 6 | 6.74 | −5.5 | 23.2 |
| 7 | 6.74 | −5.2 | 23.2 |
| 8 | 6.71 | −3.4 | 23.2 |
| 9 | 6.47 | −11.1 | 23.4 |
| 10 | 6.5 | −9.1 | 23.1 |
| 11 | 6.52 | −7.7 | 23.1 |

D. TEM and EDS data

TEM grids were prepared from both tubes using holey carbon films on 3 mm copper grid substrates. TEM investigation was done using a TEM 3010 operated at 300 kV.

Although there may be analytical limitations involved with EDS, it usually is the only method that can provide individual chemical analyses on individual clay particles. The advantage here is that bulk analyses of clay materials are usually a summation of all of the chemical compositions of multiple minerals and thus the true variability of particle composition may not be realized. Several populations of differing compositions may mix to produce the same chemical compositions.

EDS analyses from a 300 kV TEM are generally of higher quality than those from an SEM operating at lower voltages. The use of a 300 kV beam typically ensures that any element with Z>5 (that is present at a concentrations greater than a few tenths of a weight percent) is detected. Furthermore, obtaining discrete EDS analyses on individual clay particles with an SEM can be challenging and not easily repeatable.

1. Cs-montmorillonite in AgNO$_3$ Treatment (Short Term Trial)

A mass of 2.00 g of unwashed (Cl$^-$ present) Cs-montmorillonite was placed in each of two Oak Ridge test tubes. To these tubes, 80 ml of 0.05 N AgNO$_3$ was added. A white precipitate formed immediately. Suspensions were agitated every 5 minutes for 35 minutes to evenly disperse materials. Over the course of 40 minutes, the material turned from a bulk color of white to a medium light purple. The material was centrifuged at 10,500 r.p.m. for 6 minutes. The supernatant was tested for the presence of Cl$^-$ using three drops of 0.05 N AgNO$_3$. No chloride was detected. This process was repeated using small glass vials to determine if the color change was a common process.

TEM investigations indicate that neither Ag$^+$ spontaneously exchanges with Cs$^+$ in Cs-montmorillonite, nor is there any partial or competitive exchange. TABLE 18 below shows representative analyses of Cs-montmorillonite using AgNO$_3$ treatment. An X-Y plot of Cs$_2$O and Fe$_2$O$_3$ content is illustrated in FIG. 12. This plot is a representative analysis of Cs-montmorillonite involved in AgNO$_3$ treatment. As can be seen, there is a negative correlation with increasing Fe$_2$O$_3$ content and increasing Cs$_2$O content, indicating that more Fe-rich montmorillonites are less effective at exchanging Cs$^+$. In other words, higher Fe$_2$O$_3$ content correlates with lower Cs$_2$O content. This correlation tends to suggest that low Fe-montmorillonites may be the better material for use.

TABLE 18

EDS Data Showing Representative Analyses of Cs-montmorillonite in AgNO$_3$ Treatment (Short Term)

| | 1 | 2 | 3 | 4 | 5 | 6 | 7 | 8 |
|---|---|---|---|---|---|---|---|---|
| Al$_2$O$_3$ | 19.20 | 19.38 | 18.42 | 17.48 | 18.80 | 17.78 | 18.20 | 19.20 |
| SiO$_2$ | 68.01 | 67.73 | 69.44 | 68.86 | 67.92 | 67.06 | 66.86 | 67.98 |
| Na$_2$O | 0.00 | 0.00 | 0.00 | 0.60 | 1.24 | 0.64 | 0.81 | 0.64 |
| Fe$_2$O$_3$ | 5.86 | 5.98 | 6.02 | 4.52 | 3.91 | 4.21 | 4.50 | 4.63 |
| Cs$_2$O | 6.93 | 6.91 | 6.12 | 8.54 | 8.13 | 10.31 | 9.63 | 7.55 |
| SUM | 100.00 | 100.00 | 100.00 | 100.00 | 100.00 | 100.00 | 100.00 | 100.00 |

As shown in FIG. 13, TEM imaging indicates that there are three broad textures of AgCl crystals. Illustrated in part A), the most common crystals, comprising approximately 75% of AgCl textures observed, are intergrowths of AgCl crystals with diameters ranging between ~0.5 μm to ~1.0 μm. Illustrated in part B), ~20% of the AgCl occurs as randomly intergrown AgCl crystals with diameters ranging between ~50 nm to ~150 nm. Aggregates of this type typically occur as particles ranging between ~1 to ~5 microns in diameter. Nanoparticles of AgCl were also common. Illustrated in part C), these occur as discrete AgCl particles ranging between ~2 nm to ~15 nm in diameter. This texture was nearly ubiquitous over the sample grids and comprise the remaining ~5% of AgCl crystals.

TEM imaging indicates that morphology of Cs-montmorillonite remains unchanged in the 0.05 N AgNO$_3$ process compared to untreated materials in previously reported experiments, as shown in FIG. 14. Crystallinity was also similar to untreated materials.

FIG. 14 shows TEM images and SAED of Cs-montmorillonite. Part A) shows a large particle of Cs-montmorillonite with AgCl crystals adhered to (001) the face. Part B) shows a respective SAED pattern from the center of the image. A high degree of stacking disorder appears present. However, a close inspection of the diffraction rings indicates that they are largely composed of discrete spots, which is a characteristic of Cs-montmorillonite. Part C shows an aggregate of Cs-montmorillonite particles. Part D) shows an SAED pattern from a larger particle in the left-center of image C. Diffraction rings may be composed of discrete spots.

2. Cs-montmorillonite in AgNO₃ Treatment (Long Term Trial)

Similarly, TEM investigation may be conducted on trials of CsCl—Na-montmorillonite systems that had been reacted with 0.05 N AgNO₃ and allowed to stand undisturbed for a long term. The long term may last for days, months or years. In this exemplified trial, 10 months were allotted for the mixture to stand undisturbed. TEM investigation of these aged suspensions indicates that the process may stabilize the material for an extended period of time. Over this period of time, there was no visible change in the color or texture.

As above, three Oak ridge tubes (rather than two) were prepared using a mass of 2.00 g of unwashed (Cl⁻ present) Cs-montmorillonite. To these vials, 80 ml of 0.05 N AgNO₃ was added. A white precipitate formed immediately. Suspensions were agitated every 5 minutes for 35 minutes to evenly disperse materials. Over the course of 40 minutes, the material turned from a bulk color of white to a medium light purple. The material was centrifuged at 10,500 r.p.m. for 6 minutes. The supernatant was tested for the presence of Cl⁻ using three drops of 0.05 N AgNO₃. No chloride was detected.

The long term trial differs from the short term trial in that a portion was transferred to glass vials with supernatant fluid. The material was agitated and suspended periodically for a week. The vials were then stored in a drawer and periodically inspected over a period of ten months. The vials exhibited floccules that appear separated from the supernatant and retained a purple color.

This trial was a test to determine if the Cs-montmorillonite phase was stable and if the AgCl phase was stable. The trial was also used to determine if new minerals would form.

In summary, TEM imaging and EDS analyses indicate that both the Cs-montmorillonite and the AgCl phases are stable and that no signs of corrosion were evident. Furthermore, no new mineral phases were observed.

TEM investigations also indicate that compositions of individual Cs-montmorillonite particles at the start of the experiment tend to have less Cs₂O than the aged material. At the start of the experiment, Cs₂O content may vary from about 6.12 wt % to about 10.31 wt % in individual montmorillonite particles. At the end of the experiment, Cs₂O content may vary from about 8.14 wt % to about 15.19 wt %. This significant increase may be explained by the equilibration of Cs⁺ in solution and kinetic diffusion through the floccules.

The following tables show EDS chemical compositions of the montmorillonite particles that have been treated with 0.05 N AgNO₃ and allowed to be undisturbed for 10 months. TABLES 19-21 show EDS data for Trial 1. TABLES 22-24 show EDS data for Trial 2. TABLES 25-27 show EDS data for Trial 3.

TABLE 19

EDS Chemical Compositions of Montmorillonite Particles in CsCl Experiment with 150 ml of 0.05 N AgNO₃ added - Trial 1, Analyses 1-7

| | Trial #1 | | | | | | |
|---|---|---|---|---|---|---|---|
| | 1 | 2 | 3 | 4 | 5 | 6 | 7 |
| SiO₂ | 58.06 | 60.28 | 57.22 | 58.65 | 55.57 | 59.73 | 59.63 |
| Al₂O₃ | 22.30 | 20.62 | 22.16 | 22.62 | 21.63 | 21.07 | 22.72 |
| Fe₂O₃ | 3.41 | 4.87 | 3.31 | 3.04 | 5.25 | 3.52 | 3.54 |
| MgO | 3.63 | 0.87 | 3.63 | 3.03 | 4.00 | 2.89 | 2.86 |
| CaO | 0.00 | 0.05 | 0.04 | 0.12 | 0.01 | 0.11 | 0.01 |
| Na₂O | 1.73 | 0.16 | 1.82 | 1.23 | 1.75 | 1.11 | 1.38 |
| K₂O | 0.06 | 0.07 | 0.01 | 0.03 | 0.00 | 0.00 | 0.05 |
| Cs₂O | 10.72 | 12.98 | 11.72 | 11.15 | 11.71 | 11.43 | 9.78 |
| Cl | 0.09 | 0.10 | 0.09 | 0.12 | 0.08 | 0.14 | 0.03 |
| SUM | 100.00 | 100.00 | 100.00 | 99.99 | 100.00 | 100.00 | 100.00 |

TABLE 20

EDS Chemical Compositions of Montmorillonite Particles in CsCl Experiment with 150 ml of 0.05 N AgNO₃ added - Trial 1, Analyses 8-14

| | Trial #1 | | | | | | |
|---|---|---|---|---|---|---|---|
| | 8 | 9 | 10 | 11 | 12 | 13 | 14 |
| SiO₂ | 60.72 | 56.27 | 58.81 | 57.54 | 57.85 | 55.84 | 57.53 |
| Al₂O₃ | 22.23 | 25.26 | 22.12 | 22.77 | 22.50 | 23.61 | 22.59 |
| Fe₂O₃ | 3.41 | 3.78 | 3.13 | 3.37 | 3.65 | 2.86 | 3.72 |
| MgO | 2.15 | 2.66 | 2.82 | 3.44 | 3.42 | 4.02 | 3.36 |
| CaO | 0.12 | 0.07 | 0.04 | 0.07 | 0.07 | 0.00 | 0.03 |
| Na₂O | 0.89 | 1.85 | 1.45 | 1.50 | 1.45 | 2.85 | 1.81 |
| K₂O | 0.00 | 0.42 | 0.04 | 0.00 | 0.00 | 0.01 | 0.01 |
| Cs₂O | 10.37 | 9.24 | 11.26 | 11.10 | 10.98 | 10.63 | 10.87 |
| Cl | 0.11 | 0.45 | 0.34 | 0.21 | 0.08 | 0.18 | 0.08 |
| SUM | 100.00 | 100.00 | 100.01 | 100.00 | 100.00 | 100.00 | 100.00 |

TABLE 21

EDS Chemical Compositions of Montmorillonite Particles in CsCl Experiment with 150 ml of 0.05 N AgNO$_3$ added - Trial 1, Analyses 15-20

| | Trial #1 | | | | | |
|---|---|---|---|---|---|---|
| | 15 | 16 | 17 | 18 | 19 | 20 |
| SiO$_2$ | 52.83 | 60.51 | 57.19 | 57.67 | 59.57 | 56.50 |
| Al$_2$O$_3$ | 24.21 | 21.05 | 21.09 | 21.67 | 20.03 | 22.09 |
| Fe$_2$O$_3$ | 3.62 | 4.02 | 4.72 | 4.75 | 4.60 | 4.20 |
| MgO | 5.23 | 2.39 | 3.09 | 3.56 | 1.23 | 2.97 |
| CaO | 0.05 | 0.00 | 0.00 | 0.08 | 0.07 | 0.06 |
| Na$_2$O | 2.23 | 0.70 | 1.38 | 1.95 | 0.00 | 1.32 |
| K$_2$O | 0.13 | 0.00 | 0.03 | 0.12 | 0.12 | 0.00 |
| Cs$_2$O | 11.54 | 11.08 | 12.50 | 10.17 | 15.19 | 12.71 |
| Cl | 0.16 | 0.24 | 0.00 | 0.03 | 0.19 | 0.15 |
| SUM | 100.00 | 99.99 | 100.00 | 100.00 | 100.00 | 100.00 |

TABLE 22

EDS Chemical Compositions of Montmorillonite Particles in CsCl Experiment with 150 ml of 0.05 N AgNO$_3$ added - Trial 2, Analyses 1-7

| | Trial #2 | | | | | | |
|---|---|---|---|---|---|---|---|
| | 1 | 2 | 3 | 4 | 5 | 6 | 7 |
| SiO$_2$ | 55.50 | 53.19 | 52.49 | 51.51 | 53.01 | 53.66 | 53.01 |
| Al$_2$O$_3$ | 22.38 | 25.40 | 24.74 | 25.87 | 25.25 | 23.73 | 25.12 |
| Fe$_2$O$_3$ | 3.00 | 2.74 | 2.85 | 3.07 | 2.91 | 3.10 | 2.85 |
| MgO | 4.53 | 5.78 | 5.27 | 6.00 | 5.22 | 5.79 | 5.81 |
| CaO | 0.14 | 0.10 | 0.09 | 0.04 | 0.13 | 0.17 | 0.11 |
| Na$_2$O | 1.93 | 2.09 | 2.12 | 2.47 | 2.02 | 2.22 | 2.18 |
| K$_2$O | 0.00 | 0.00 | 0.00 | 0.00 | 0.00 | 0.00 | 0.07 |
| Cs$_2$O | 12.52 | 10.65 | 12.33 | 10.94 | 11.38 | 11.24 | 10.78 |
| Cl | 0.01 | 0.06 | 0.11 | 0.09 | 0.08 | 0.10 | 0.05 |
| SUM | 100.01 | 100.01 | 100.00 | 99.99 | 100.00 | 100.01 | 99.98 |

TABLE 23

EDS Chemical Compositions of Montmorillonite Particles in CsCl Experiment with 150 ml of 0.05 N AgNO$_3$ added - Trial 2, Analyses 8-14

| | Trial #2 | | | | | | |
|---|---|---|---|---|---|---|---|
| | 8 | 9 | 10 | 11 | 12 | 13 | 14 |
| SiO$_2$ | 53.91 | 56.28 | 54.10 | 53.25 | 52.18 | 52.43 | 52.16 |
| Al$_2$O$_3$ | 23.02 | 22.01 | 23.38 | 24.96 | 24.86 | 24.75 | 25.39 |
| Fe$_2$O$_3$ | 3.33 | 3.33 | 3.17 | 3.02 | 2.99 | 3.07 | 2.77 |
| MgO | 4.13 | 3.30 | 3.74 | 5.47 | 5.50 | 5.44 | 5.67 |
| CaO | 0.17 | 0.13 | 0.28 | 0.17 | 0.13 | 0.10 | 0.06 |
| Na$_2$O | 2.43 | 1.58 | 1.60 | 2.09 | 2.26 | 2.23 | 2.16 |
| K$_2$O | 0.00 | 0.00 | 0.00 | 0.00 | 0.04 | 0.03 | 0.00 |
| Cs$_2$O | 12.94 | 13.23 | 13.47 | 10.99 | 11.96 | 11.89 | 11.03 |
| Cl | 0.07 | 0.15 | 0.26 | 0.05 | 0.10 | 0.06 | 0.76 |
| SUM | 100.00 | 100.01 | 100.00 | 100.00 | 100.02 | 100.00 | 100.00 |

TABLE 24

EDS Chemical Compositions of Montmorillonite Particles in CsCl Experiment with 150 ml of 0.05 N AgNO$_3$ added - Trial 2, Analyses 15-20

| | Trial #2 | | | | | |
|---|---|---|---|---|---|---|
| | 15 | 16 | 17 | 18 | 19 | 20 |
| SiO$_2$ | 53.71 | 55.90 | 52.34 | 52.45 | 57.22 | 54.53 |
| Al$_2$O$_3$ | 24.38 | 20.95 | 24.74 | 24.64 | 21.85 | 22.41 |
| Fe$_2$O$_3$ | 3.31 | 3.54 | 3.26 | 3.13 | 3.34 | 3.27 |
| MgO | 5.19 | 3.52 | 5.27 | 5.63 | 2.93 | 3.59 |
| CaO | 0.05 | 0.06 | 0.11 | 0.12 | 0.14 | 0.22 |
| Na$_2$O | 1.65 | 1.19 | 2.46 | 2.08 | 0.91 | 1.97 |
| K$_2$O | 0.00 | 0.00 | 0.07 | 0.03 | 0.35 | 0.00 |
| Cs$_2$O | 11.34 | 14.21 | 11.66 | 11.84 | 13.19 | 13.96 |
| Cl | 0.37 | 0.64 | 0.10 | 0.07 | 0.07 | 0.05 |
| SUM | 100.00 | 100.01 | 100.01 | 99.99 | 100.00 | 100.00 |

TABLE 25

EDS Chemical Compositions of Montmorillonite Particles in CsCl Experiment with 150 ml of 0.05 N AgNO$_3$ added - Trial 3, Analyses 1-7

| | Trial #3 | | | | | | |
|---|---|---|---|---|---|---|---|
| | 1 | 2 | 3 | 4 | 5 | 6 | 7 |
| SiO$_2$ | 53.73 | 62.18 | 60.34 | 60.34 | 58.56 | 52.93 | 53.54 |
| Al$_2$O$_3$ | 24.80 | 19.13 | 21.94 | 20.90 | 21.74 | 25.14 | 25.11 |
| Fe$_2$O$_3$ | 2.86 | 3.44 | 3.24 | 3.30 | 3.30 | 2.64 | 2.77 |
| MgO | 6.26 | 0.56 | 1.85 | 3.24 | 4.46 | 6.60 | 6.73 |
| CaO | 0.15 | 0.38 | 0.47 | 0.38 | 0.24 | 0.24 | 0.07 |
| Na$_2$O | 2.66 | 0.99 | 1.15 | 1.16 | 1.37 | 2.51 | 2.77 |
| K$_2$O | 0.01 | 0.00 | 0.09 | 0.00 | 0.00 | 0.00 | 0.03 |
| Cs$_2$O | 9.42 | 13.03 | 10.69 | 10.64 | 10.26 | 9.81 | 8.85 |
| Cl | 0.10 | 0.28 | 0.22 | 0.04 | 0.07 | 0.14 | 0.14 |
| SUM | 99.99 | 99.99 | 99.99 | 100.00 | 100.00 | 100.01 | 100.01 |

TABLE 26

EDS Chemical Compositions of Montmorillonite Particles in CsCl Experiment with 150 ml of 0.05 N AgNO3 added - Trial 3, Analyses 8-14

| | Trial #3 | | | | | | |
|---|---|---|---|---|---|---|---|
| | 8 | 9 | 10 | 11 | 12 | 13 | 14 |
| SiO$_2$ | 60.03 | 62.21 | 61.79 | 55.24 | 58.56 | 57.75 | 54.63 |
| Al$_2$O$_3$ | 21.77 | 19.78 | 20.53 | 24.32 | 22.70 | 22.49 | 24.85 |

TABLE 26-continued

EDS Chemical Compositions of Montmorillonite Particles in CsCl
Experiment with 150 ml of 0.05 N AgNO3 added - Trial 3, Analyses 8-14

| | Trial #3 | | | | | | |
|---|---|---|---|---|---|---|---|
| | 8 | 9 | 10 | 11 | 12 | 13 | 14 |
| $Fe_2O_3$ | 3.21 | 2.93 | 3.59 | 2.80 | 3.10 | 3.45 | 2.96 |
| MgO | 3.07 | 3.12 | 2.18 | 5.65 | 3.20 | 3.85 | 5.85 |
| CaO | 0.22 | 0.18 | 0.27 | 0.10 | 0.11 | 0.36 | 0.24 |
| $Na_2O$ | 1.50 | 1.12 | 0.90 | 2.25 | 1.78 | 2.33 | 2.67 |
| $K_2O$ | 0.00 | 0.00 | 0.00 | 0.00 | 0.08 | 0.01 | 0.10 |
| $Cs_2O$ | 10.10 | 10.58 | 10.51 | 9.47 | 10.25 | 9.75 | 8.58 |
| Cl | 0.10 | 0.08 | 0.22 | 0.16 | 0.21 | 0.02 | 0.12 |
| SUM | 100.00 | 100.00 | 99.99 | 99.99 | 99.99 | 100.01 | 100.00 |

TABLE 27

EDS Chemical Composition of Montmorillonite Particles in CsCl
Experiment with 150 ml of 0.05 N AgNO$_3$ added - Trial 3,
Analyses 15-20

| | Trial #3 | | | | | |
|---|---|---|---|---|---|---|
| | 15 | 16 | 17 | 18 | 19 | 20 |
| $SiO_2$ | 61.15 | 58.91 | 58.05 | 61.78 | 56.42 | 59.78 |
| $Al_2O_3$ | 19.26 | 19.58 | 22.55 | 17.65 | 24.16 | 20.51 |
| $Fe_2O_3$ | 4.06 | 4.05 | 3.40 | 5.01 | 3.44 | 3.97 |
| MgO | 2.50 | 2.84 | 4.50 | 0.39 | 5.44 | 2.47 |
| CaO | 0.44 | 0.24 | 0.20 | 0.31 | 0.19 | 0.37 |
| $Na_2O$ | 0.91 | 1.50 | 2.04 | 0.00 | 2.16 | 1.29 |
| $K_2O$ | 0.16 | 0.04 | 0.00 | 0.00 | 0.00 | 0.08 |
| $Cs_2O$ | 11.26 | 12.63 | 9.12 | 14.71 | 8.14 | 11.35 |
| Cl | 0.25 | 0.21 | 0.15 | 0.14 | 0.05 | 0.19 |
| SUM | 99.99 | 100.00 | 100.01 | 99.99 | 100.00 | 100.01 |

TABLE 26 shows a summary of the EDS data for Trials 1-3, where the summary lists their average, minimum, maximum, median, variance and standard deviation.

TABLE 28

Summary of All EDS Data Obtained from Individual Montmorillonite
Particles from 10 Month Trials

| | Average | Maximum | Minimum | Variance | Std. Dev. |
|---|---|---|---|---|---|
| $SiO_2$ | 56.657 | 62.21 | 51.51 | 9.5052 | 3.0831 |
| $Al_2O_3$ | 22.718 | 25.87 | 17.65 | 3.6217 | 1.9031 |
| $Fe_2O_3$ | 3.439 | 5.25 | 2.64 | 0.3577 | 0.5981 |
| MgO | 3.8965 | 6.73 | 0.39 | 2.3416 | 1.5302 |
| CaO | 0.1447 | 0.47 | 0.00 | 0.0132 | 0.1151 |
| $Na_2O$ | 1.6877 | 2.85 | 0.00 | 0.4259 | 0.6526 |
| $K_2O$ | 0.0382 | 0.42 | 0.00 | 0.0058 | 0.0764 |
| $Cs_2O$ | 11.297 | 15.19 | 8.14 | 2.1744 | 1.4746 |
| Cl | 0.1502 | 0.76 | 0.00 | 0.0186 | 0.1363 |

Figure 16:
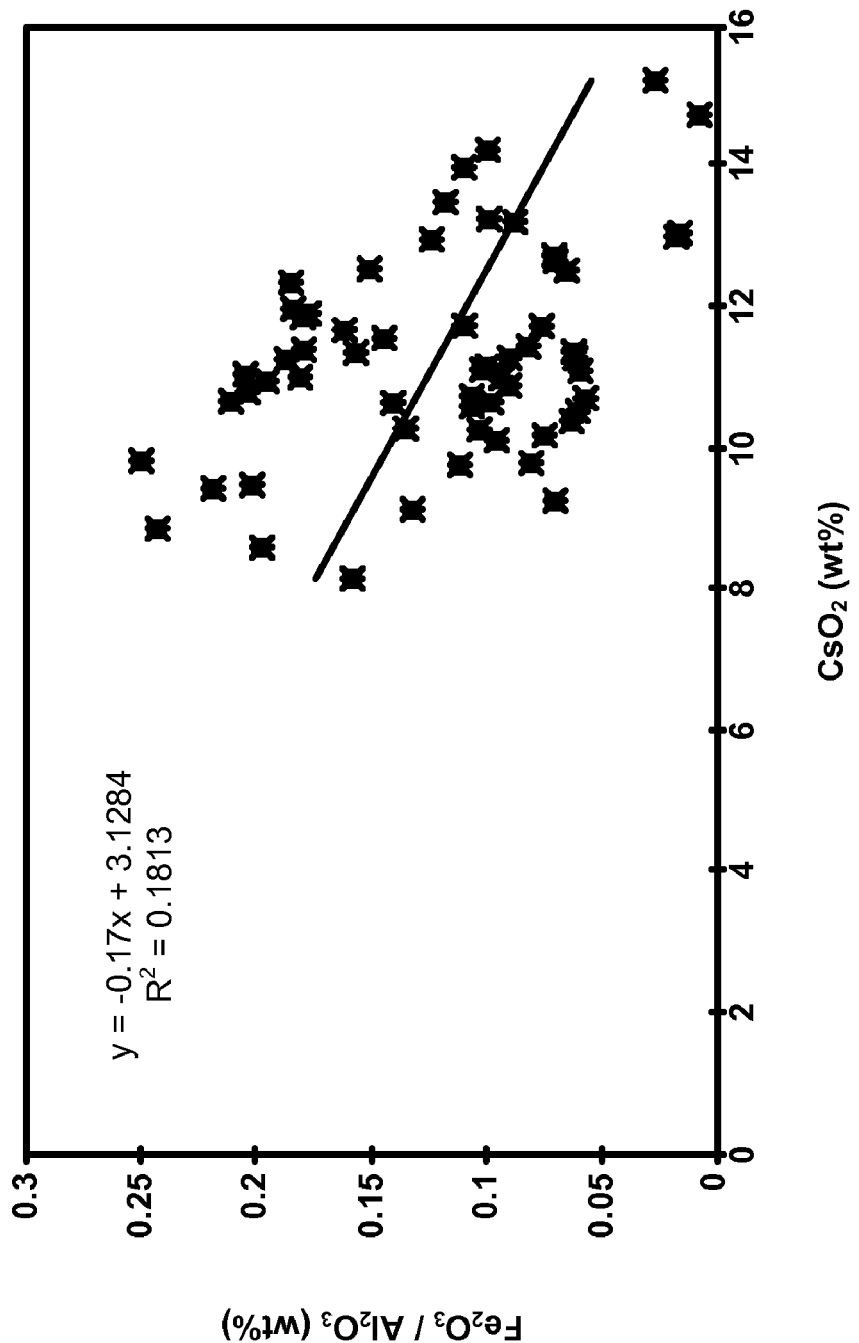
FIG. 16 shows plotted chemical compositions of individual montmorillonite particles from the 10 month stability experiment, where a very weak relationship between $MgO/Fe_2O_3$ and $Cs_2O$ exists.

The following figures shows plotted chemical compositions of individual montmorillonite particles from the 10 month stability experiment. In particular, FIG. 15 shows a very weak relationship between $Fe_2O_3/Al_2O_3$ and $Cs_2O$. Similarly, FIG. 16 shows a very weak relationship between $MgO/Fe_2O_3$ and $Cs_2O$. Referring to the latter, functionally, there is generally no correlation.

Figure 17:
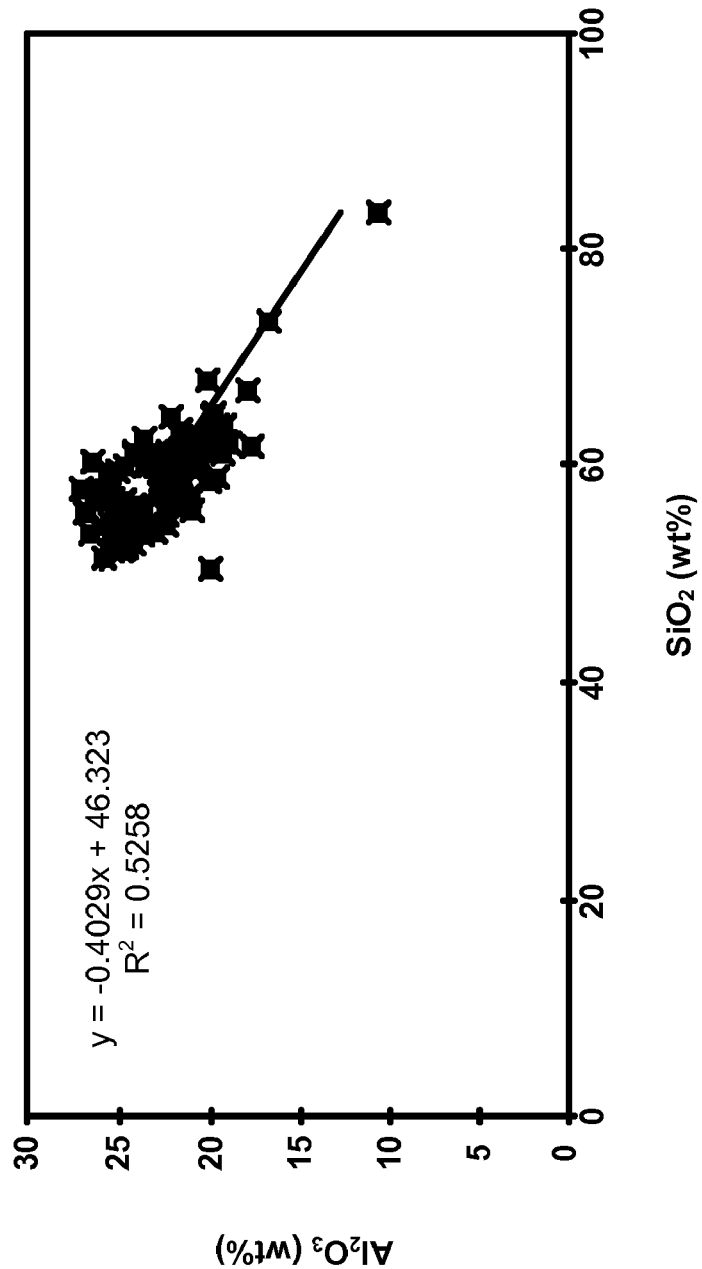
FIG. 17 shows an EDS compositions plot for $SiO_2$—$Al_2O_3$, which shows a moderate linear trend for all reacted compositions.
Figure 18:
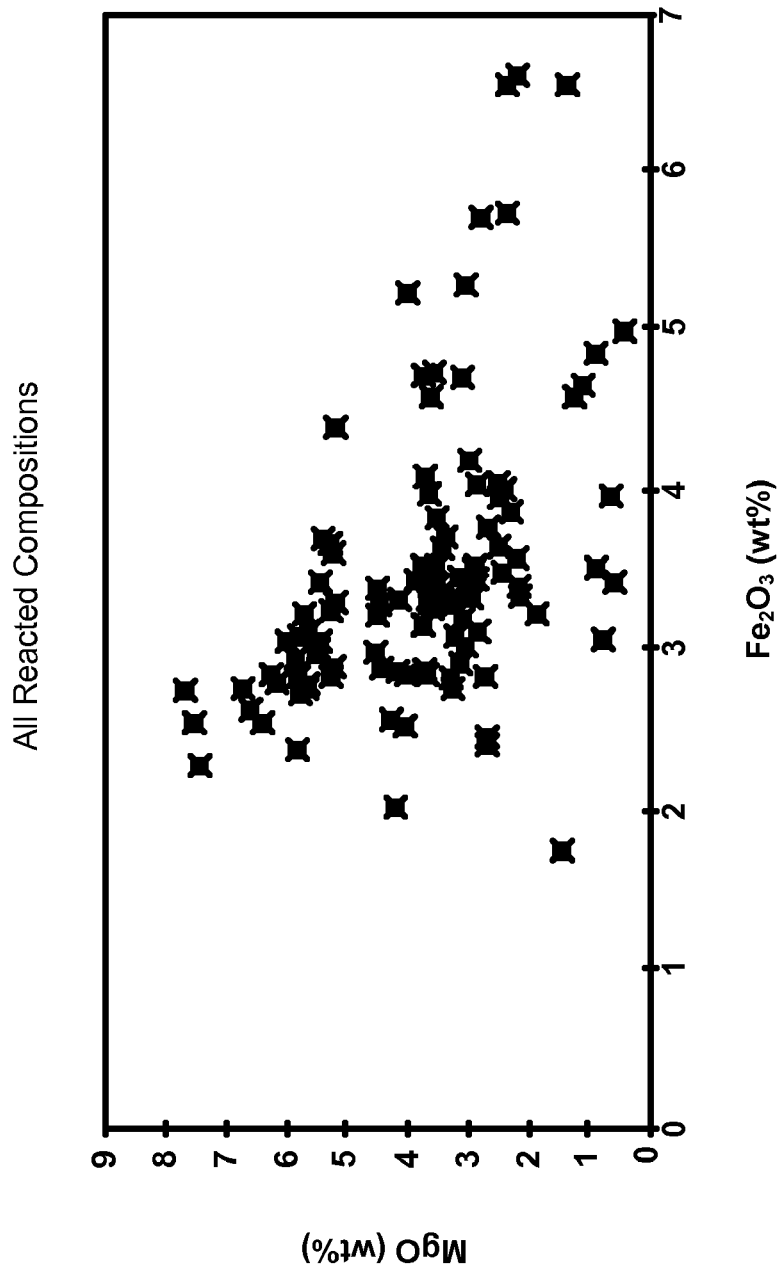
FIG. 18 shows an EDS compositions plot for MgO—$Fe_2O_3$.
Figure 19:
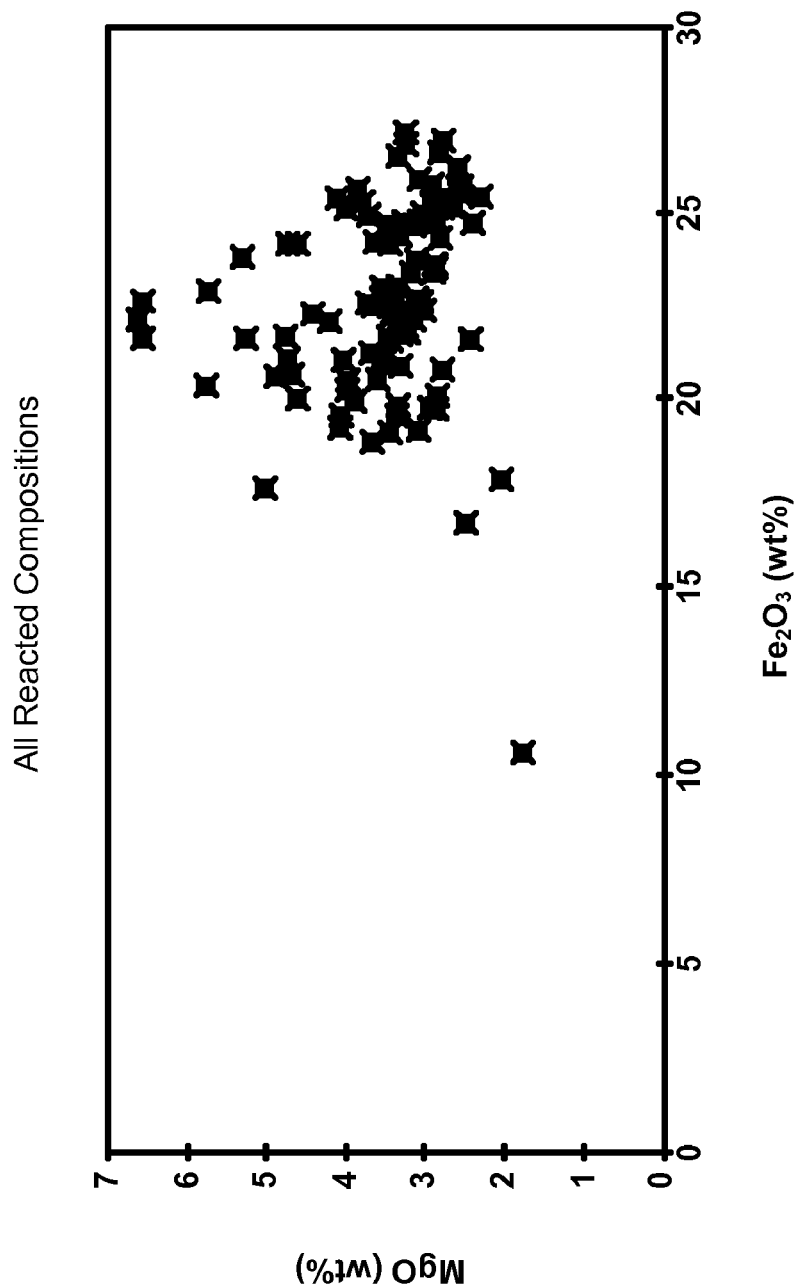
FIG. 19 shows an EDS compositions plot for $Fe_2O_3$—$Al_2O_3$.

The following figures chart EDS data compiled from all reacted samples from the montmorillonite plots in defined fields. Examples of these samples include groupings of $SiO_2$—$Al_2O_3$, MgO—$Fe_2O_3$, and $Fe_2O_3$—$Al_2O_3$. These groupings define the chemical composition of the montmorillonite used in the claimed invention. As shown in FIG. 17, the $SiO_2$—$Al_2O_3$ compositions plot in a moderate linear trend with $r^2=0.5258$. As shown in FIGS. 18 and 19, the MgO—$Fe_2O_3$ compositions and $Fe_2O_3$—$Al_2O_3$ compositions respectively show no linear trends but plot in fields that are broadly triangular in shape.

3. Montmorillonite Mixed with Chloride Powders

In this set of experiments, an amount equivalent to approximately 0.014 M of cations was used, in which cations involved include 2.5 g of equivalent Cs cation, 3.082 g of equivalent Ba cation and 3.944 g of equivalent Sr cation. Each pile was sprayed 20 times with a slurry of Na-montmorillonite. Then, each pile was removed from the plexiglass substrate and placed in a beaker. The beaker was filled to 100 ml with more Na-montmorillonite slurry. Approximately 50 ml of de-ionized water was added to each beaker to aid dissolution of each respective salt. An additional 50 ml was added to each beaker for a total of 200 ml of mixture. To these mixtures, a volume of 10 ml, 50 ml, 100 ml and 150 ml of 0.05 N $AgNO_3$ were added. TEM investigation was carried out for the 150 ml of 0.05 N $AgNO_3$ experiments. The camera constant for all SAED patterns may be set at 60 cm. EDS results and explanation obtained are also provided below.

The reactions and exchange of Cs, Ba and Sr cations with Na-montmorillonite does not appear to affect particle morphology. Variation in particle morphology between the Cs, Ba and Sr chloride experiments is generally a function of the natural variability of the Na-montmorillonite and the changes induced during processing. An important result is that particle morphology typically does not hinder cation exchange.

Referring to FIGS. 20-25, the most common morphology observed in CsCl experiments are foliated lamellar aggregates of Cs-montmorillonite with curled edges that vary from approximately 0.1 μm to approximately 1.5 μm in diameter. Subangular foliated lamellar aggregates are also common and usually have curled edges. The diameters of these particles commonly vary from approximately 0.7 μm to approximately 1.0 μm. Subhedral platelets with irregular outlines and curled edges also occur and are observed to be between approximately 0.02 μm to approximately 1.0 μm in diameter. Subangular silica particles observed in the CsCl experiments were typically 0.1 μm in diameter.

Most SAED patterns of Cs-montmorillonite along [hk0] show ring patterns indicative of turbostratic stacking. The camera constant may be set at 60 cm. Some diffraction spots are discrete, indicating a relative increase in crystallinity compared to starting Na-montmorillonite owing to Cs cation exchange. Diffraction spots between rings may be from silica particles or AgCl particles. Diffraction spots in patterns that arise from AgCl are sometimes diffuse owing to beam damage. Spots arising from silica particle tend to be sharp.

Figure 20:
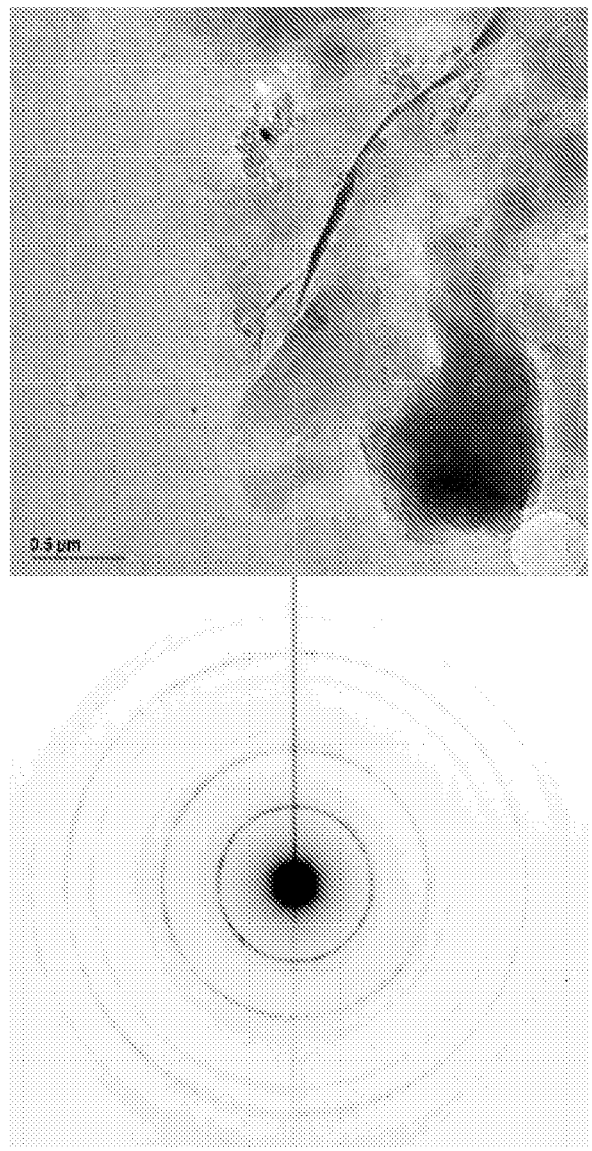
FIG. 20 shows stacked subangular foliated lamellar aggregates of Cs-montmorillonite and the SAED pattern along [hk0].

FIG. 20 shows stacked subangular foliated lamellar aggregates of Cs-montmorillonite with curled edges at ~0.7 μm to ~1.0 μm in diameter. Subhedral platelets may be seen with irregular outlines and curled edges. Subangular quartz aggregates may be ~0.2 μm to ~1.0 μm in diameter. The SAED pattern of Cs-montmorillonite along [hk0] shows a ring pattern, which is indicative of turbostratic stacking. The camera constant may be set at 60 cm. Some diffraction spots are discrete, indicating a relative increase in crystallinity owing to Cs cation exchange.

Figure 21:
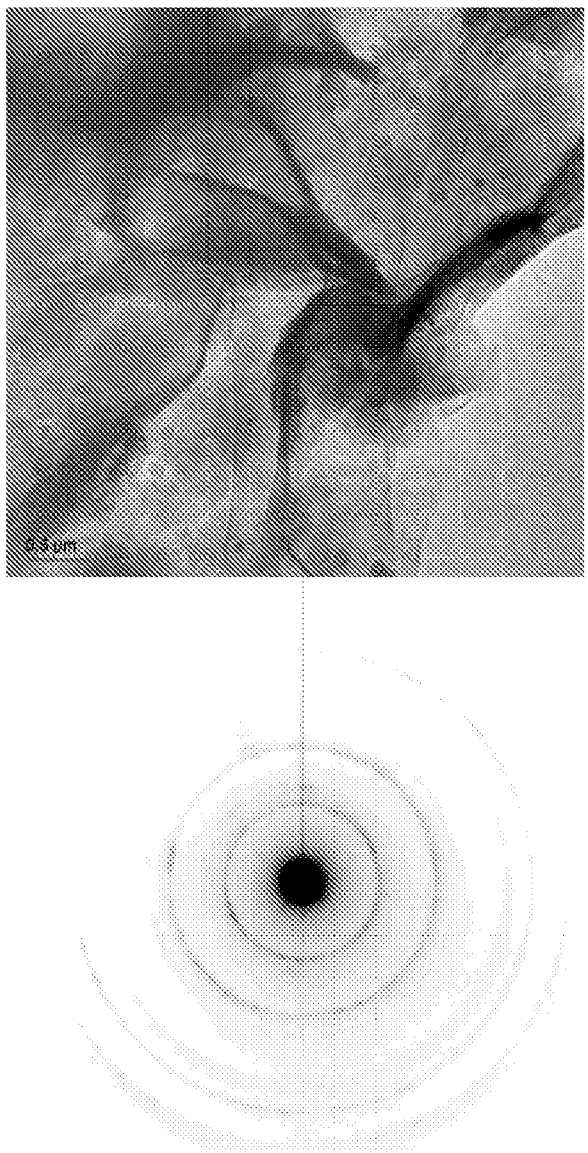
FIG. 21 shows foliated lamellar aggregates of Cs-montmorillonite and the SAED pattern along [hk0].

FIG. 21 shows foliated lamellar aggregates of Cs-montmorillonite with a diameter at ~1.5 μm. Subangular silica particles may be ~0.2 μm in diameter. The SAED pattern of Cs-montmorillonite along [hk0] shows a ring pattern, which is indicative of turbostratic stacking. The camera constant may be set at 60 cm. Some diffraction spots are discrete, indicating a relative increase in crystallinity owing to Cs cation exchange. Blurring or diffusing of rings may be due to particle folding.

Figure 22:
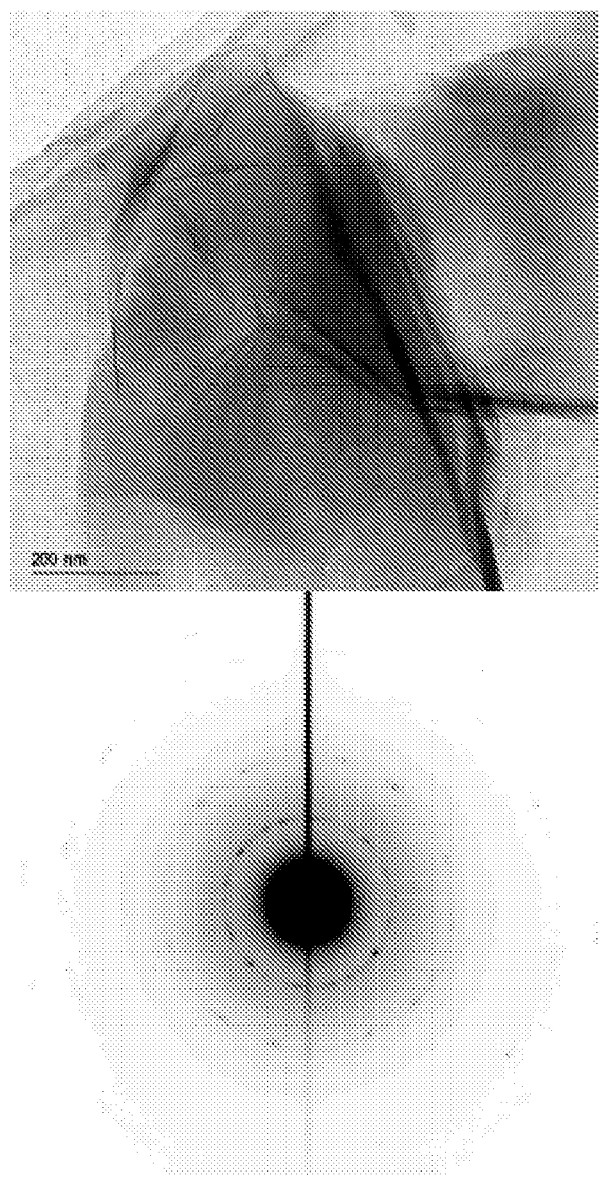
FIG. 22 shows foliated lamellar aggregates of Cs-montmorillonite and the SAED pattern along [hk0].

FIG. 22 shows foliated lamellar aggregates of Cs-montmorillonite with curled and folded edges that are ~1.0 μm-600 nm in diameter. The SAED pattern of Cs-montmorillonite along [hk0] shows a ring pattern, which is indicative of turbostratic stacking. The camera constant may be set at 60 cm. Some diffraction spots are very well developed and discrete, indicating a relative increase in crystallinity owing to Cs cation exchange.

Figure 23:
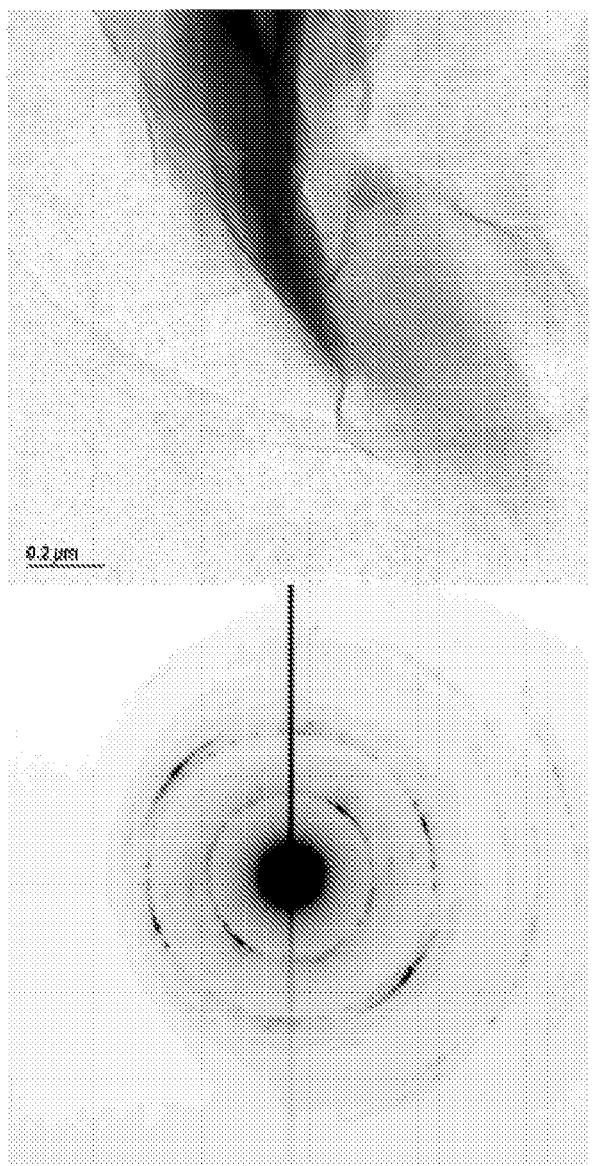
FIG. 23 shows foliated lamellar aggregates of Cs-montmorillonite and the SAED pattern along [hk0].

FIG. 23 shows foliated lamellar aggregates of Cs-montmorillonite with curled edges that are ~1.1 μm-0.1 μm in diameter. The SAED pattern of Cs-montmorillonite along [hk0] shows a ring pattern, which is indicative of turbostratic stacking. The camera constant may be set at 60 cm. Some diffraction spots are discrete, indicating a relative increase in crystallinity owing to Cs cation exchange. Blurring or diffusing of rings may be due to particle folding.

Figure 24:
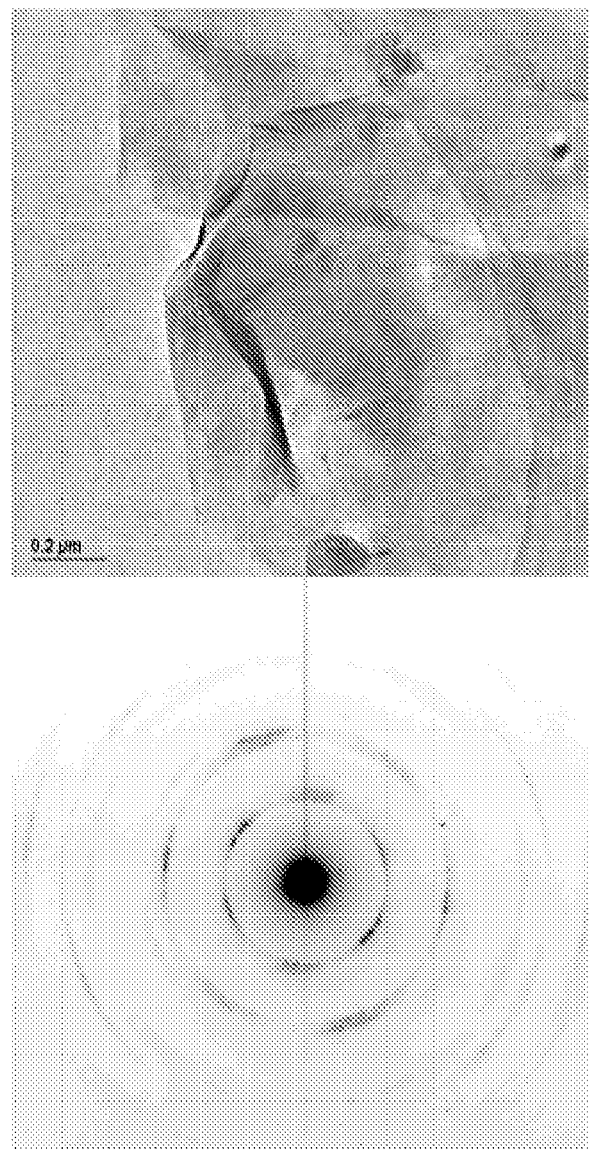
FIG. 24 shows foliated lamellar aggregates of Cs-montmorillonite and the SAED pattern along [hk0].

FIG. 24 shows foliated lamellar aggregates of Cs-montmorillonite with curled edges that are ~1.5 μm in diameter. Subangular silica particles are ~0.1 μm in diameter. The SAED pattern of Cs-montmorillonite along [hk0] shows a ring pattern, which is indicative of turbostratic stacking. The camera constant may be set at 60 cm. Some diffraction spots are discrete, indicating a relative increase in crystallinity owing to Cs cation exchange. Blurring or diffusing of rings may be due to particle folding.

Figure 25:
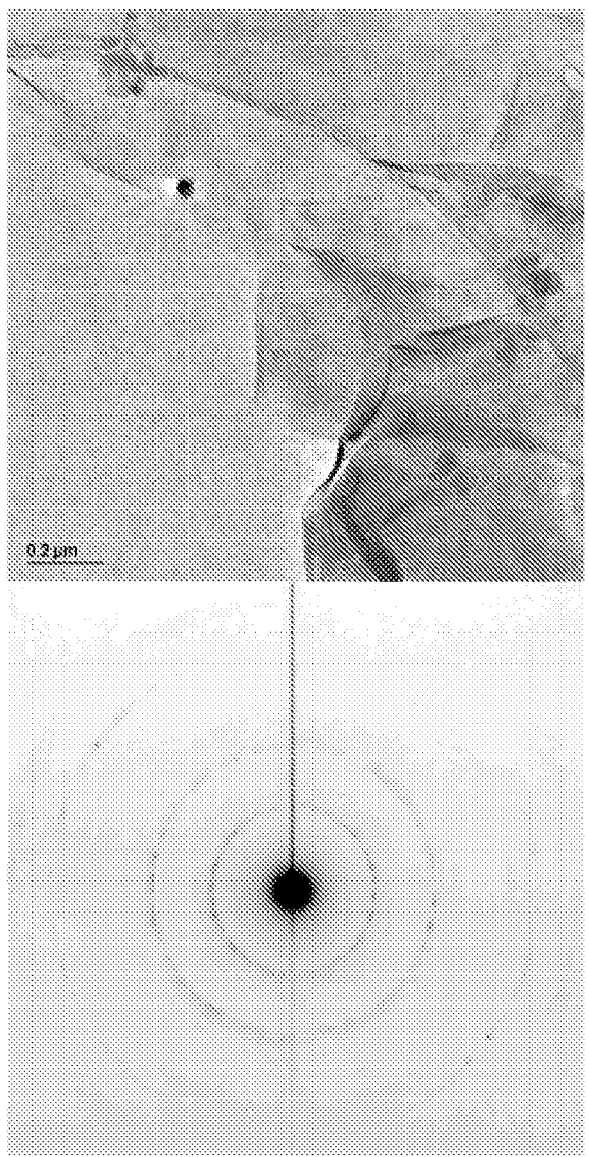
FIG. 25 shows foliated lamellar aggregates of Cs-montmorillonite and the SAED pattern along [hk0].

FIG. 25 shows foliated lamellar aggregates of Cs-montmorillonite with curled edges that are ~1.0 μm to ~1.5 μm in diameter. Subangular silica particles are ~0.1 μm in diameter. The SAED pattern of Cs-montmorillonite along [hk0] shows a ring pattern, which is indicative of turbostratic stacking. The camera constant may be set at 60 cm. Some diffraction spots are discrete, indicating a relative increase in crystallinity owing to Cs cation exchange.

Referring to FIGS. 26-33, a common morphology observed in the $BaCl_2$ experiments is compact lamellar aggregates of Ba-montmorillonite. These particles were commonly observed to be between approximately 1.4 μm and approximately 3.0 μm in diameter. Foliated lamellar aggregates of Ba-montmorillonite were also common and usually had curled edges. These particles were typically between approximately 0.6 μm and approximately 1.5 μm in diameter. Subhedral platelets with irregular outlines are also observed and were approximately 0.01 μm to approximately 1.4 μm in diameter. Subangular silica aggregates were common and were approximately 0.1 μm to approximately 0.2 μm in diameter. Aggregates of AgCl in the $BaCl_2$ experiments were commonly approximately 400 nm to 450 nm in diameter and were composed of smaller grains that are approximately 25 to 75 nm. Beam damage was commonly observed in these aggregates. Subangular silica particles and aggregates were commonly observed and had diameters between approximately 0.1 μm and 0.2 μm.

The majority of SAED patterns of Ba-montmorillonite along [hk0] show ring patterns indicative of turbostratic stacking. For most patterns some diffraction spots are very well developed and discrete indicating a relative increase in crystallinity compared to starting Na-montmorillonite owing to Ba cation exchange. For approximately 15% of patterns rings are weak and diffuse. Spots between rings may be from silica particles or AgCl particles. Diffraction spots in patterns that arise from AgCl are sometimes diffuse owing to beam damage.

Figure 26:
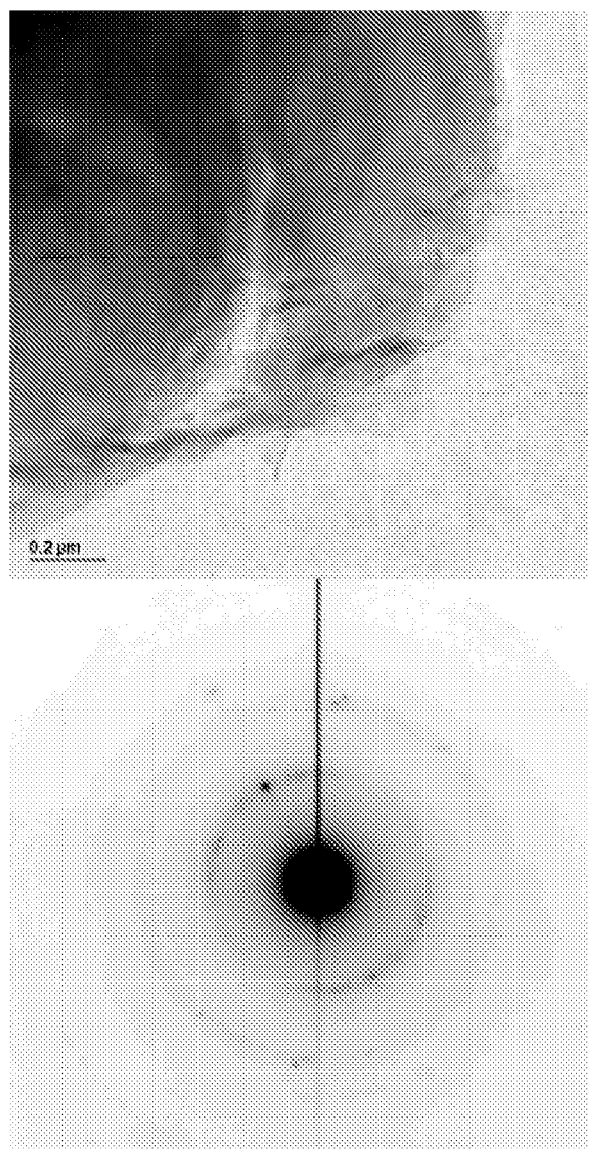
FIG. 26 shows compact lamellar aggregate of Ba-montmorillonite and the SAED pattern along [hk0].

FIG. 26 shows compact lamellar aggregate of Ba-montmorillonite with diameters between ~1.4 μm-~1.5 μm. The SAED pattern of Ba-montmorillonite along [hk0] shows a ring pattern that is indicative of turbostratic stacking. The camera constant may be set at 60 cm. Some diffraction spots are well developed and discrete, indicating a relative increase in crystallinity owing to Ba cation exchange.

Figure 27:
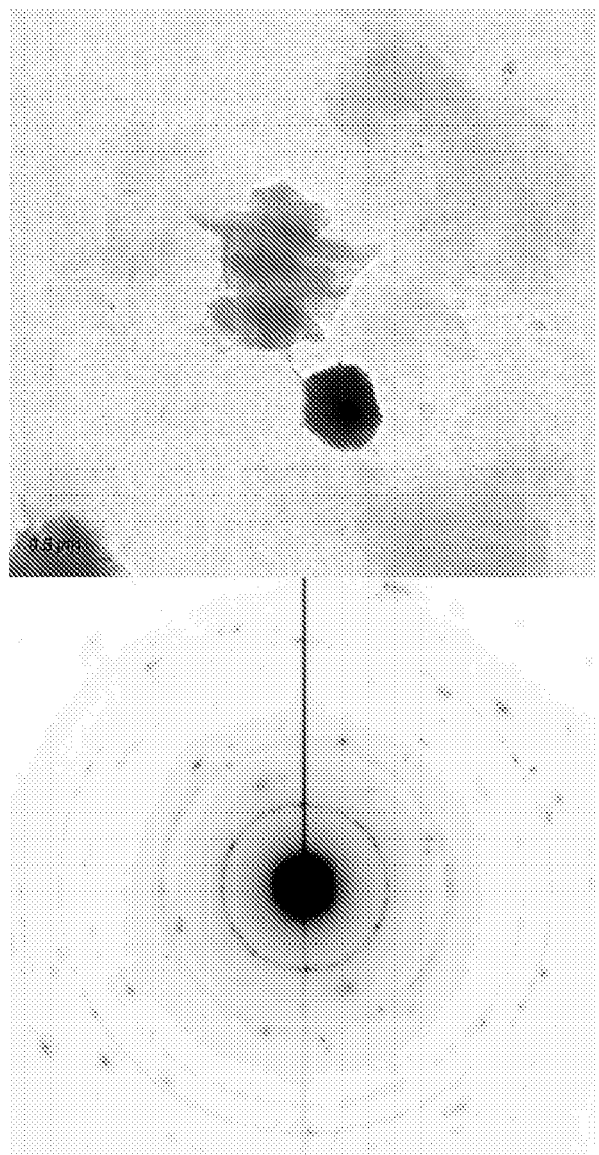
FIG. 27 shows foliated lamellar aggregate of Ba-montmorillonite and the SAED pattern along [hk0].

FIG. 27 shows foliated lamellar aggregate of Ba-montmorillonite with curled edges, where the diameters near the center are ~1.2 μm-~1.5 μm, and where the diameters near the left corner are ~0.6 μm. The dark particle in the center is an aggregate of AgCl having a diameter of ~0.45 μm. Subhedral platelets with irregular outlines may be seen surrounding three particles. The SAED pattern of Ba-montmorillonite along [hk0] shows a ring pattern that is indicative of turbostratic stacking. The camera constant may be set at 60 cm. Some diffraction spots are well developed and discrete, indicating a relative increase in crystallinity owing to Ba cation exchange. Spots between rings may be from AgCl particles. Diffusion may be a result of beam damage.

Figure 28:
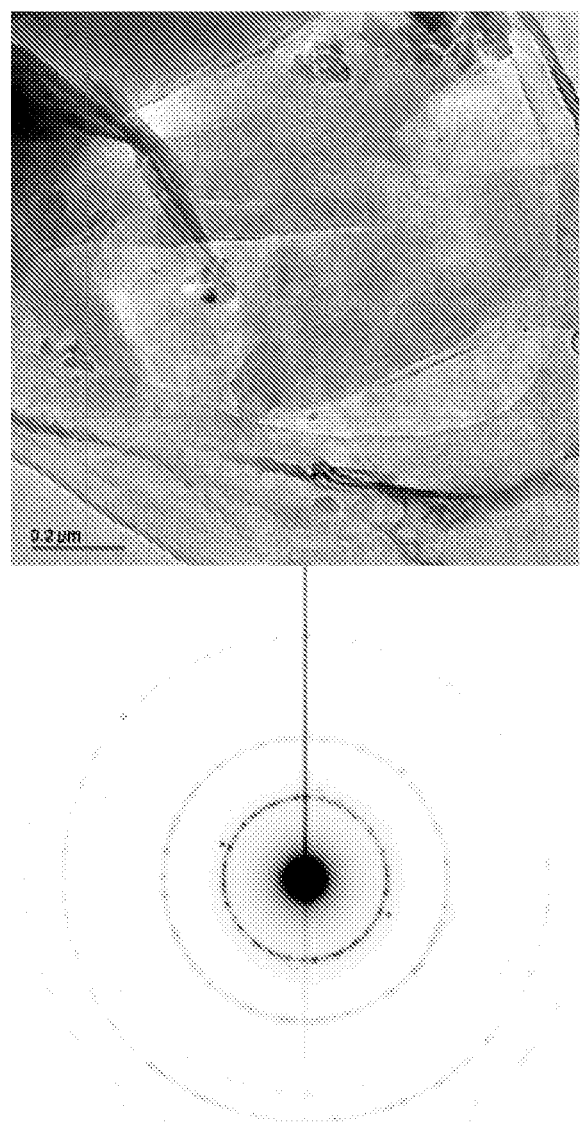
FIG. 28 shows foliated lamellar aggregates of Ba-montmorillonite and the SAED pattern along [hk0].

FIG. 28 shows foliated lamellar aggregates of Ba-montmorillonite with curled edges that are ~1.5 μm in diameter. Subangular silica particles are ~0.1 μm in diameter. The SAED pattern of Ba-montmorillonite along [hk0] shows a ring pattern that is indicative of turbostratic stacking. The camera constant may be set at 60 cm. Some diffraction spots are very well developed and discrete, indicating a relative increase in crystallinity owing to Ba cation exchange.

Figure 29:
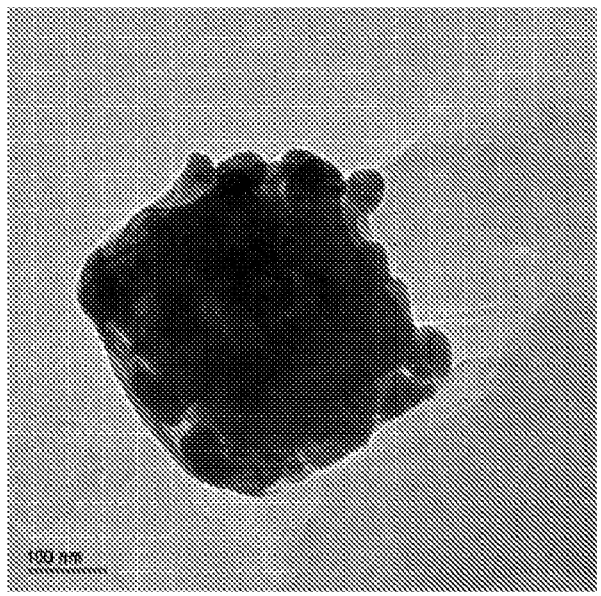
FIG. 29 shows an aggregate of AgCl.

FIG. 29 shows an aggregate of AgCl approximately 400 nm in diameter. The AgCl aggregate may be composed of grains that are approximately 25 to 75 nm.

Figure 30:
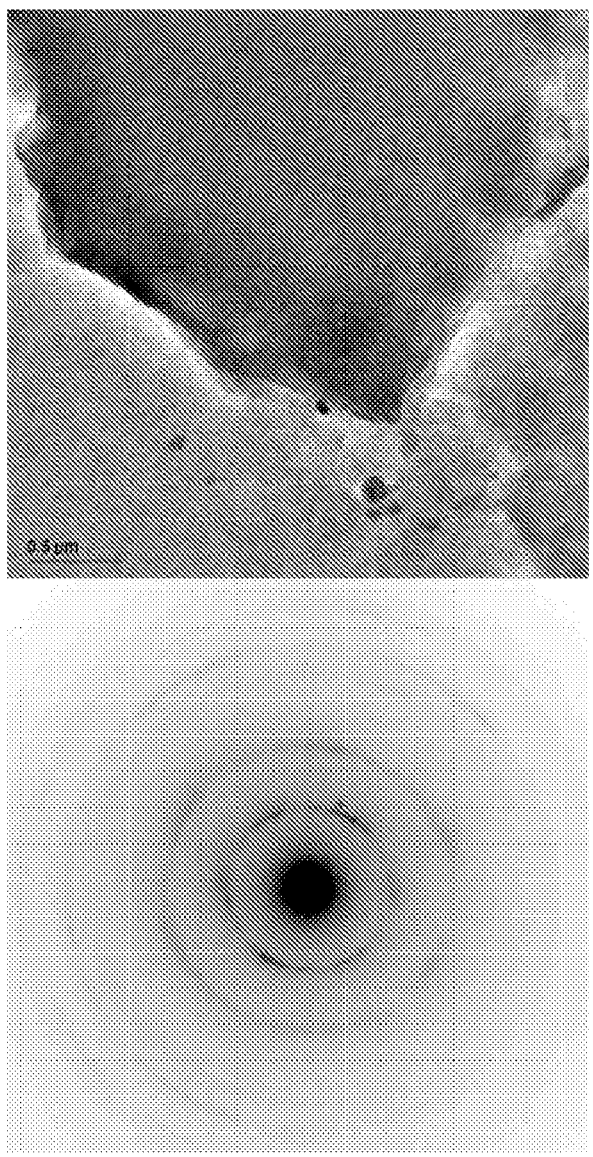
FIG. 30 shows compact lamellar aggregate of Ba-montmorillonite and the SAED pattern along [hk0].

FIG. 30 shows compact lamellar aggregate of Ba-montmorillonite with curled edges that are between ~2.3 μm to ~3.0 μm in diameter. Subangular quartz aggregates may be seen having a diameter of ~0.15 μm. The SAED pattern of Ba-montmorillonite along [hk0] shows a ring pattern that is indicative of turbostratic stacking. The camera constant may be set at 60 cm. Rings appear to be weak and diffuse.

Figure 31:
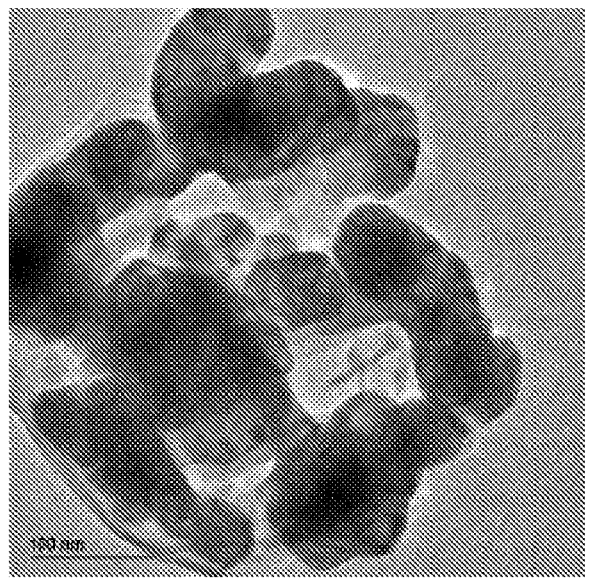
FIG. 31 shows a beam damaged aggregate of AgCl.

FIG. 31 shows a beam damaged aggregate of AgCl that is approximately 450 nm in diameter.

Figure 32:
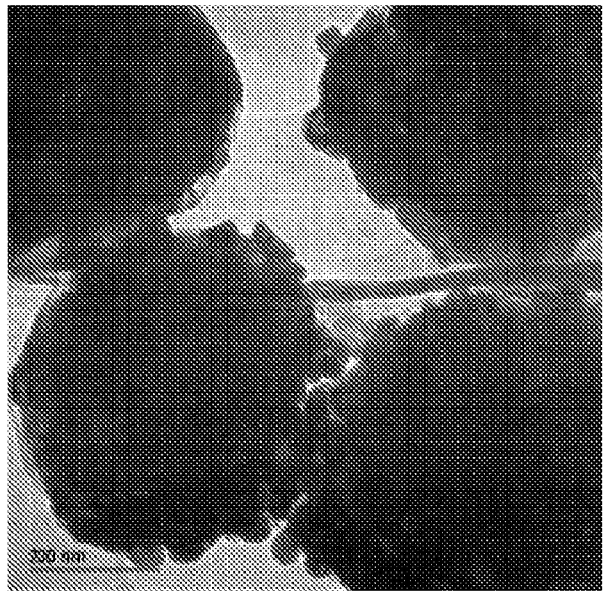
FIG. 32 shows aggregates of AgCl.

FIG. 32 shows aggregates of AgCl that are approximately 400 nm in diameter. These Aggregates may be composed of grains that are approximately 25 to 75 nm.

Figure 33:
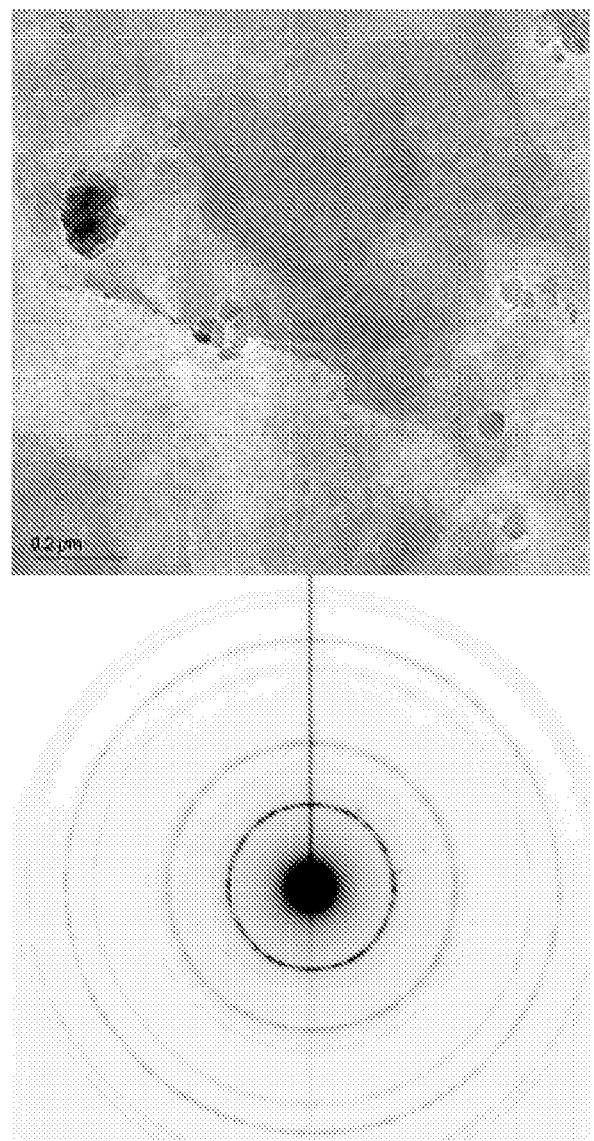
FIG. 33 shows subhedral platelets of Ba-montmorillonite with irregular outlines and the SAED pattern along [hk0].

FIG. 33 shows subhedral platelets of Ba-montmorillonite with irregular outlines. Subangular silica aggregates appear to have diameters that are between ~0.1 μm-~0.2 μm. The SAED pattern of Ba-montmorillonite along [hk0] shows a ring pattern that is indicative of turbostratic stacking. The camera constant may be set at 60 cm. Some diffraction spots are very well developed and discrete, indicating a relative increase in crystallinity owing to Ba cation exchange. Spots between rings may be from silica particles.

Referring to FIGS. 34-42, the dominant morphology of the Sr-montmorillonite resulting from the $SrCl_2.6H_2O$ experiments are subhedral foliated lamellar aggregates. This morphology of Sr-montmorillonite commonly had diameters between approximately 1.0 μm and approximately 1.7 μm. These particles usually have edges that are folded or have edges that show curling. AgCl aggregates found in the $SrCl_2.6H_2O$ experiments are commonly between approximately 0.6 μm 2.7 μm in diameter. AgCl aggregates are commonly composed of smaller AgCl particles 10 to 80 nm. Small silica grains and aggregates occur and are usually approximately 0.1 μm in diameter.

SAED patterns of Sr-montmorillonite along [hk0] show ring patterns indicative of turbostratic stacking. The camera constant may be set at 60 cm. Some diffraction spots are discrete indicating a relative increase in crystallinity compared to starting Na-montmorillonite owing to Sr cation exchange. Occasional blurring of rings is interpreted to result from folding of Sr-montmorillonite particles. Spots between rings may be from silica particles or AgCl particles.

Figure 34:
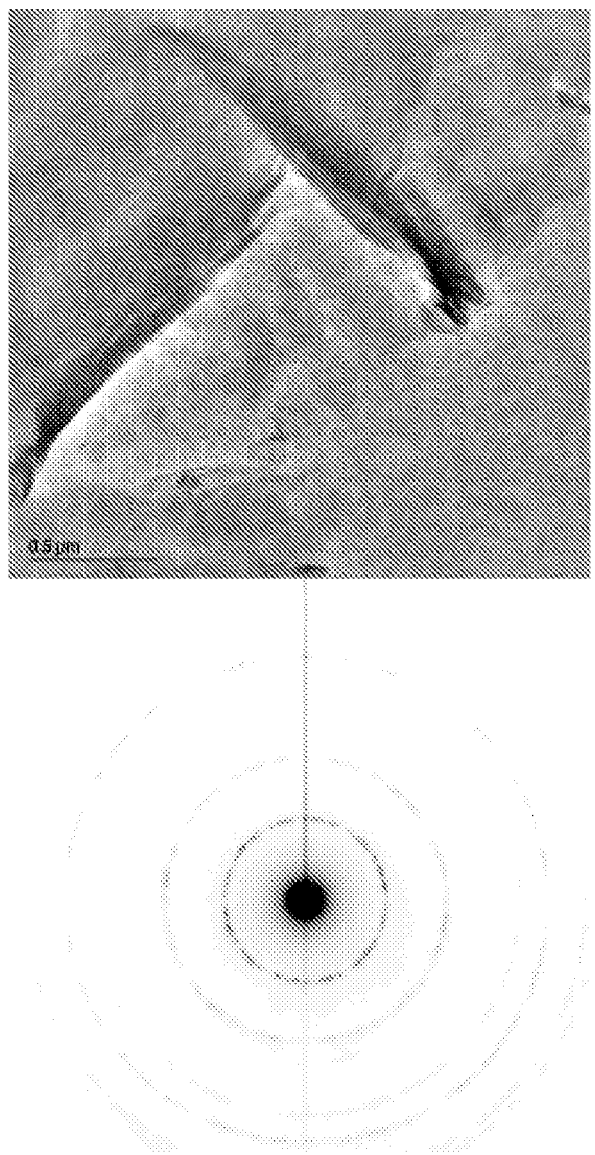
FIG. 34 shows two subhedral foliated lamellar aggregates of Sr-montmorillonite and the SAED pattern along [hk0].

FIG. 34 shows two subhedral foliated lamellar aggregates of Sr-montmorillonite, where the diameters of the left aggregates are between ~1.2 µm to ~1.5 µm, and where the diameters of the right aggregates are between ~1.3 µm to ~1.7 µm. Particle edges may be seen folded along lower portions. The SAED pattern of Sr-montmorillonite along [hk0] shows a ring pattern that is indicative of turbostratic stacking. The camera constant may be set at 60 cm. Some diffraction spots are discrete, indicating a relative increase in crystallinity owing to Sr cation exchange.

Figure 35:
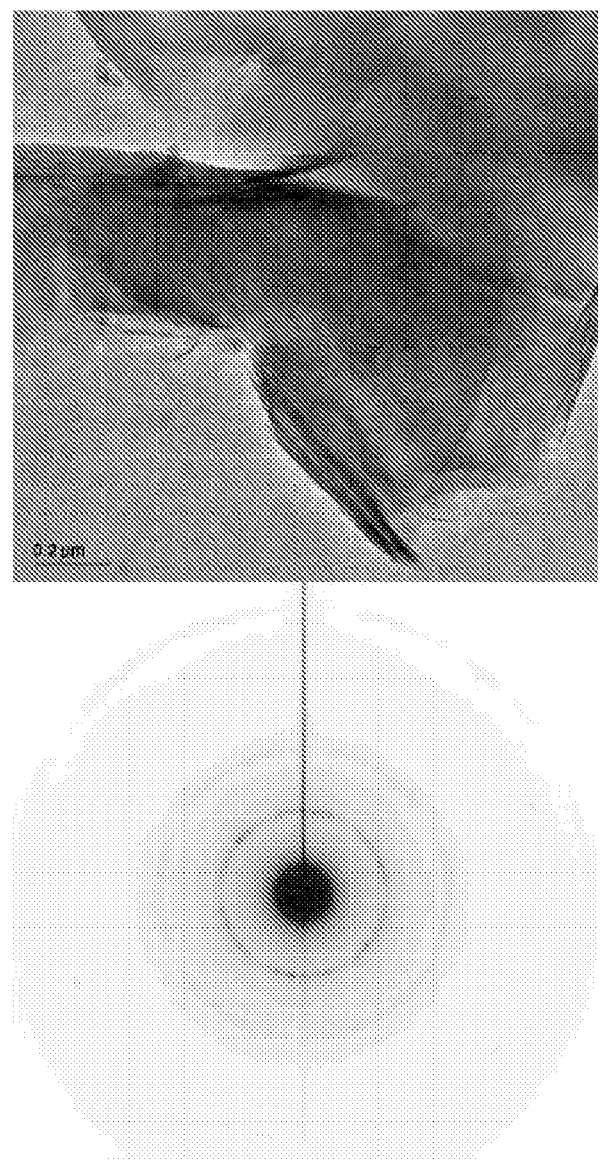
FIG. 35 shows two subangular foliated lamellar aggregates Sr-montmorillonite and the SAED pattern along [hk0].

FIG. 35 shows two subangular foliated lamellar aggregates Sr-montmorillonite having diameters between ~1.0 µm to ~1.2 µm. Curling and folding may be seen occurring along particle edges. Small quartz aggregates may have diameters of ~0.1 µm, as can be seen in the center left portion of the image. The SAED pattern of Sr-montmorillonite along [hk0] shows a ring pattern that is indicative of turbostratic stacking. The camera constant may be set at 60 cm. Some weak and poorly developed diffraction spots are discrete, indicating a relative increase in crystallinity owing to Sr cation exchange.

Figure 36:
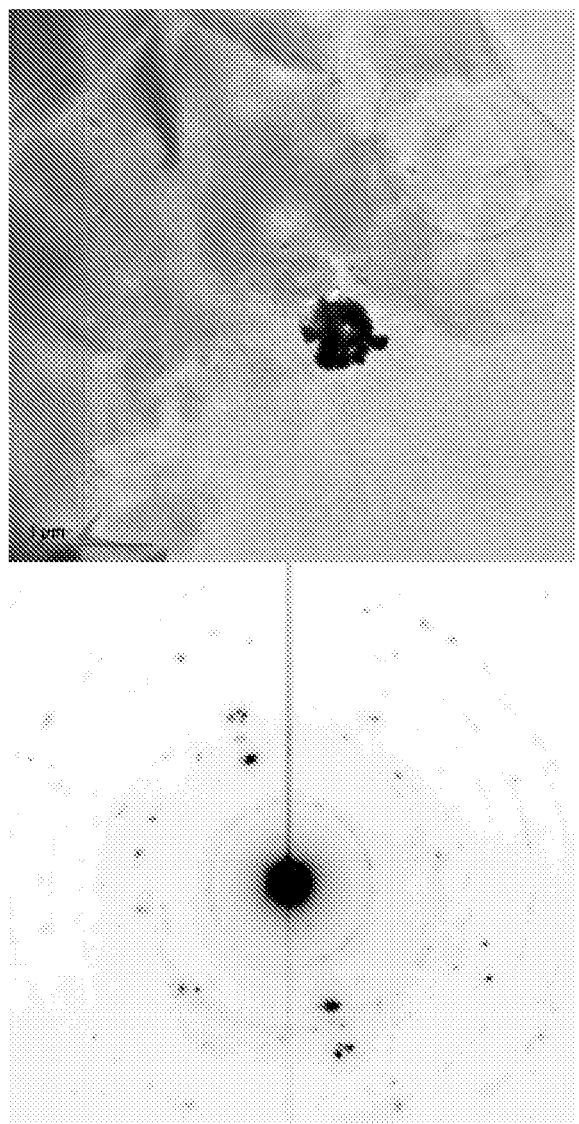
FIG. 36 shows subhedral platelets Sr-montmorillonite with irregular outlines and foliated lamellar aggregate Sr-montmorillonite and the SAED pattern of the AgCl particle.

FIG. 36 shows subhedral platelets Sr-montmorillonite with irregular outlines and foliated lamellar aggregate Sr-montmorillonite with curled edges having a diameter of ~1.5 µm. The AgCl aggregate in the center has a diameter of ~0.6 µm. The SAED pattern of the AgCl particle can also be seen. The camera constant may be set at 60 cm. Rings may be from background Sr-montmorillonite particles. The dark discrete spots between rings may be from multiple nanoparticles of AgCl composing the aggregate.

Figure 37:
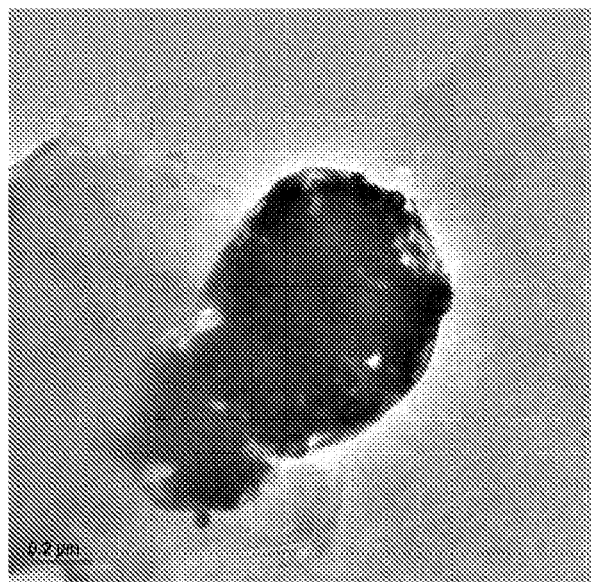
FIG. 37 shows AgCl aggregates.

FIG. 37 shows AgCl aggregates having diameters between ~0.7 m-~1.5 µm. Foliated lamellar Sr-montmorillonite aggregates may be seen layered underneath silica particles with curled edges. Subhedra Sr-montmorillonite platelets with irregular outlines may also be seen.

Figure 38:
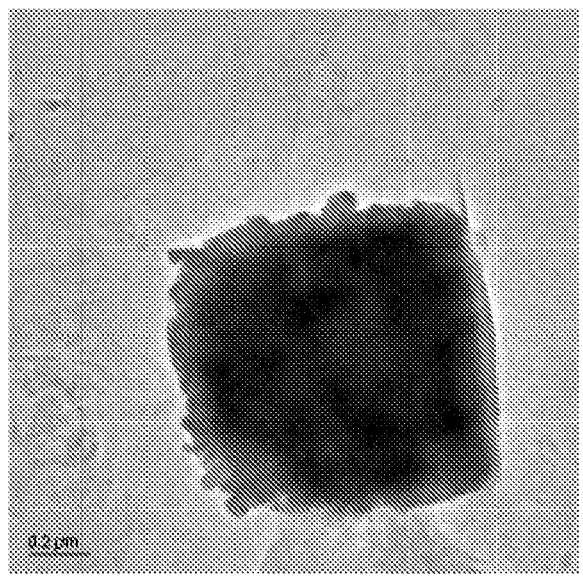
FIG. 38 shows a beam damaged aggregate of AgCl.

FIG. 38 shows a beam damaged aggregate of AgCl with a diameter of ~0.8 µm.

Figure 39:
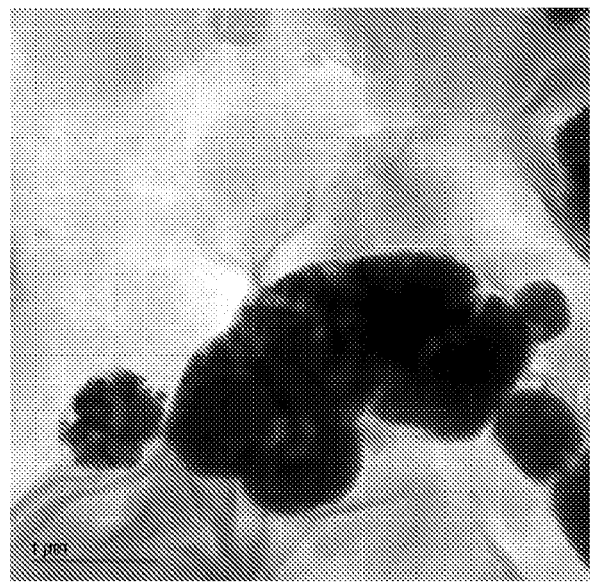
FIG. 39 shows AgCl aggregates.

FIG. 39 shows AgCl aggregates, where the left aggregate has a diameter of ~0.7 µm, the center aggregate has a diameter of ~1.5 µm-~2.7 µm, and the right aggregate has a diameter of ~0.6 µm. Sr-montmorillonite particles may also be seen below.

Figure 40:
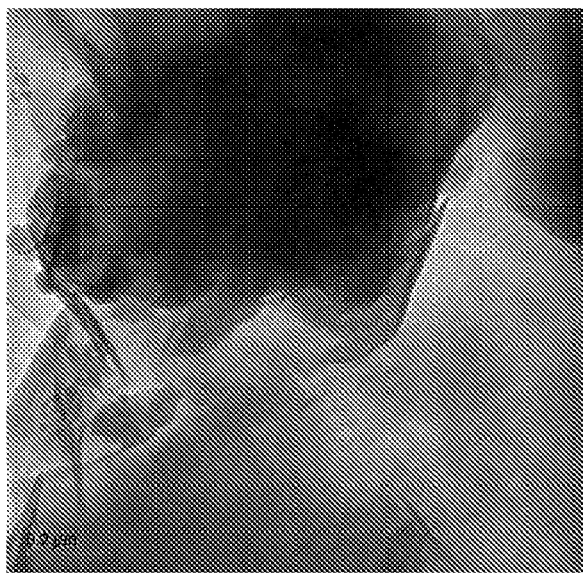
FIG. 40 shows large subangular foliated lamellar Sr-montmorillonite aggregates.

FIG. 40 shows large subangular foliated lamellar Sr-montmorillonite aggregates, having diameters between ~0.9 m-~1.2 µm, overlaying subhedral Sr-montmorillonite platelets with irregular outlines with curled edges. Small subrounded quartz aggregates, having a diameter of ~0.2 µm, are also present.

Figure 41:
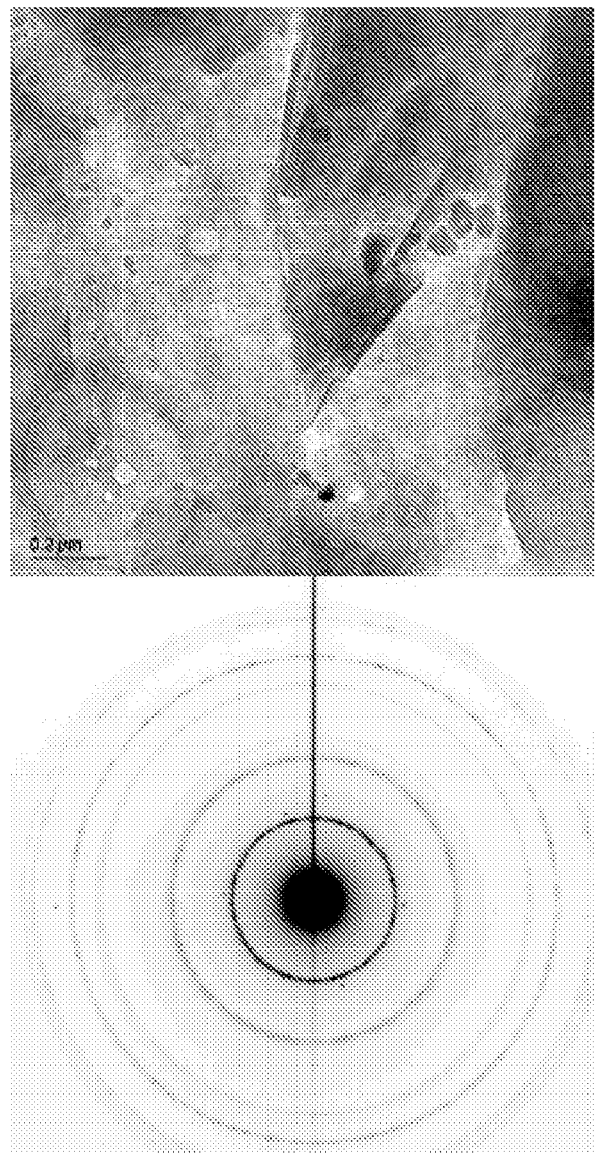
FIG. 41 shows subangular foliated lamellar Sr-montmorillonite aggregates and the SAED pattern along [hk0].

FIG. 41 shows subangular foliated lamellar Sr-montmorillonite aggregates with folded and curled edges, having diameters of ~0.8 µm-~1.3 µm. Subrounded silica aggregates may also be seen, having a diameter of ~0.1 µm. The SAED pattern of Sr-montmorillonite along [hk0] shows a ring pattern that is indicative of turbostratic stacking. The camera constant may be set at 60 cm. Some diffraction spots are discrete, indicating a relative increase in crystallinity owing to Sr cation exchange. Discrete spots between rings may be from silica particles.

Figure 42:
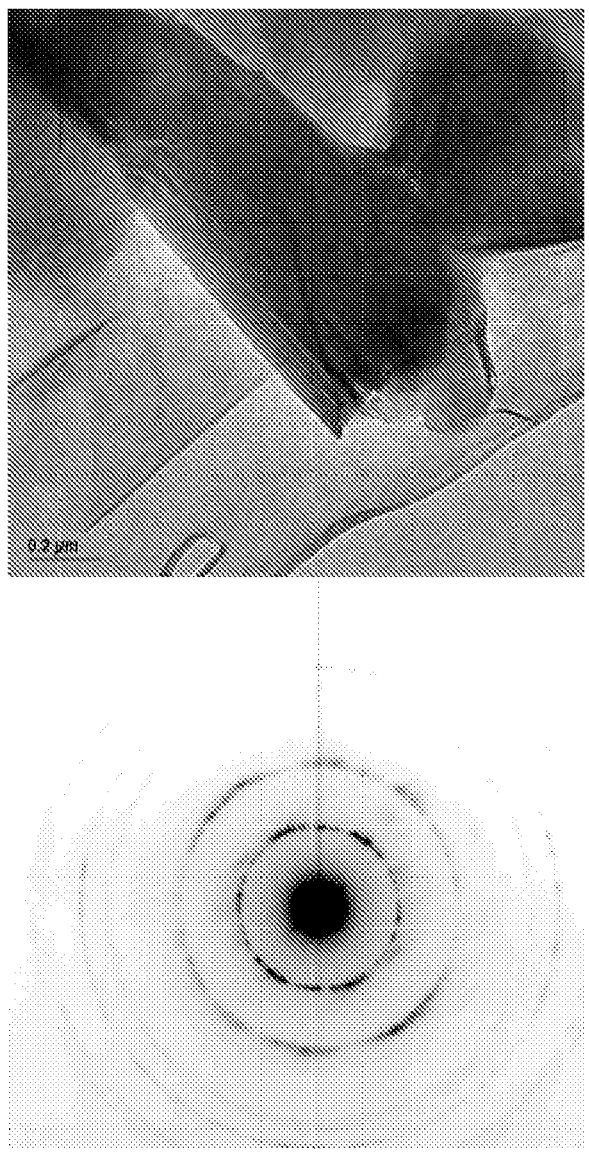
FIG. 42 shows two subhedral foliated lamellar Sr-montmorillonite aggregates and the SAED pattern along [hk0].

FIG. 42 shows two subhedral foliated lamellar Sr-montmorillonite aggregates, where the left aggregate has a diameter of ~0.55 µm-~1.35 µm, and the right aggregate has a diameter of ~0.5 µm-~0.7 µm. Folded and curled edges along edges of particles may be seen. The SAED pattern of Sr-montmorillonite along [hk0] shows a ring pattern that is indicative of turbostratic stacking. The camera constant may be set at 60 cm. Some diffraction spots are discrete, indicating a relative increase in crystallinity owing to Sr cation exchange. Blurring of rings may be due to folding of Sr-montmorillonite particles.

Chemical relationships for Cs were investigated for the 150 ml of 0.05 N $AgNO_3$ experiments. There tends to be a moderate correlation between $Cs_2O$ content and $Fe_2O_3/Al_2O_3$ content for the 150 ml of 0.05 N $AgNO_3$ experiment for individual montmorillonite particles. $Cs_2O$ content and $Fe_2O_3/Al_2O_3$ content correlate to about $r^2=0.5111$. This relationship appears counter to some of the experimental relationships observed earlier on, where increasing Fe content correlated with low Cs content. This disparity may be explained by the variation in cation ordering, valence state and site occupancy of Fe in the 2:1 layer.

Figure 43:
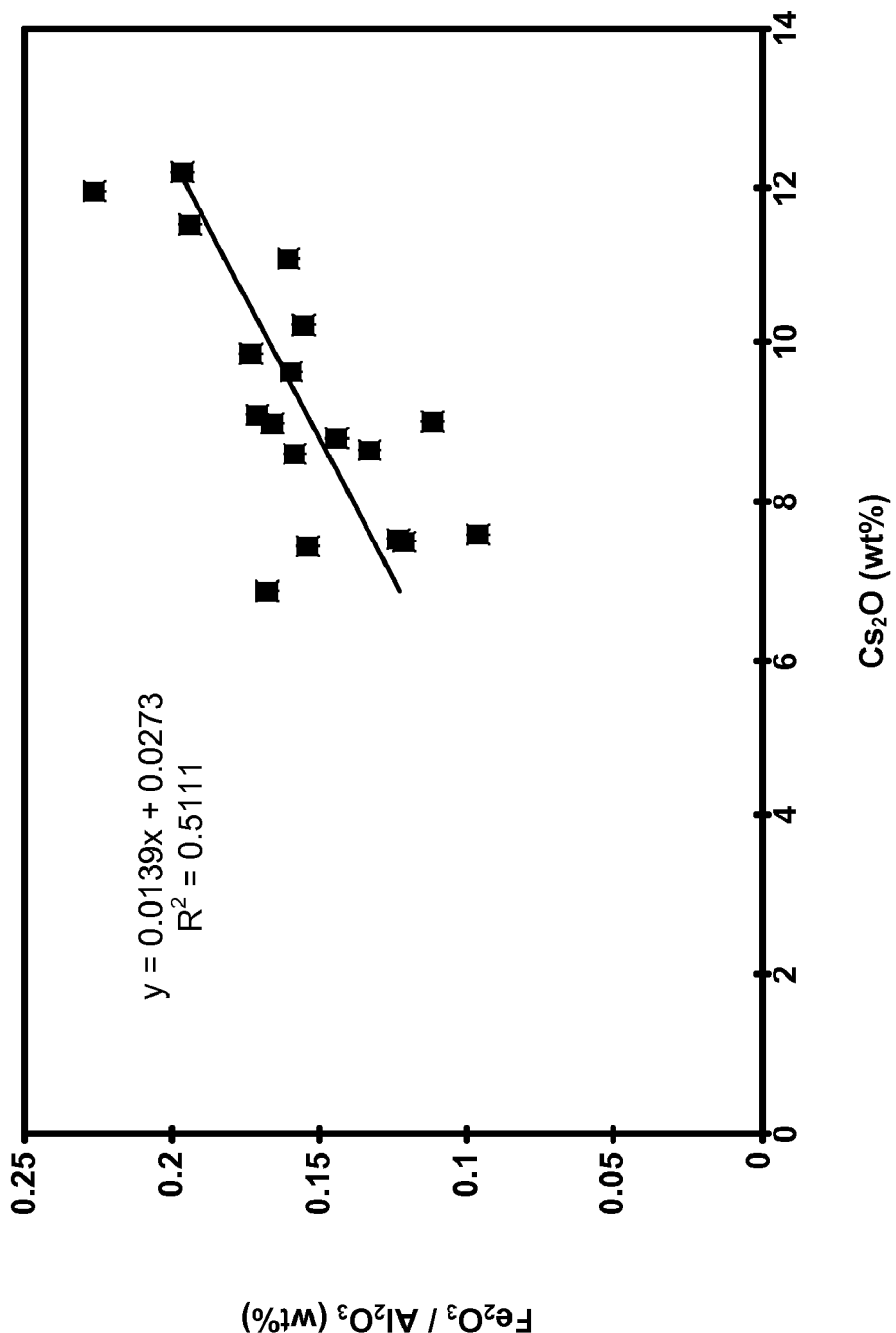
FIG. 43 shows a concentration plot of EDS compositions for $Cs_2O$ content and $Fe_2O_3/Al_2O_3$ content in wt % in an experiment with 150 ml of 0.05 N $AgNO_3$.

FIG. 43 shows a chemical composition plot individual montmorillonite particles of $Cs_2O$ content and $Fe_2O_3/Al_2O_3$ content in the experiment with 150 ml of 0.05 N AgNO Chemical relationships for Ba and Sr were also investigated for the 150 ml of 0.05 N $AgNO_3$ experiments. There seems to be distinct chemical relationships between the concentration of Ba and the ratio of $Fe_2O_3/Al_2O_3$. Barium concentrations (expressed as BaO in wt %) tend to show a moderate correlation with the $Fe_2O_3/Al_2O_3$ composition of individual particles with BaO content increasing with $Fe_2O_3/Al_2O_3$ content ($r^2=0.6667$). Although the technology effectively absorbs Sr cations, the compositional relationship observed with Ba appears to not occur with Sr. Sr tends to show no effective correlation with $Fe_2O_3/Al_2O_3$ ($r^2=0.14$). Although both cations are divalent, Ba is larger in size. Often in the $Fe^{3+}$ oxidation state, Fe occurs in the octahedral sheet of the 2:1 layer of montmorillonites. Increasing Fe content in the 2:1 layer apparently increases Ba concentration, which is somewhat counterintuitive because Ba exists as a $M^{2+}$ cation. Higher charge cations should generally repel each other unless significant shielding occurs. Ba shows complex coordination relationships in other phyllosilicates. Ba occurs as an interlayer cation in anandite, a rare phyllosilicate. Not only are the barium atoms coordinated to oxygen cations in this structure, but also sulfur atoms, which act as a thirteenth neighbor atom. The valence state of Fe is dominantly in the 2+ state in the anadite structure. Although a specific mechanism has not been identified in the montmorillonite, there tends to be a strong correlation of Fe content controlling Ba content. Fe oxidation state tends to remain important. However, single crystal studies tend not to be feasible with montmorillonites to elucidate the exact structural relationship between Fe and Ba.

Figure 44:
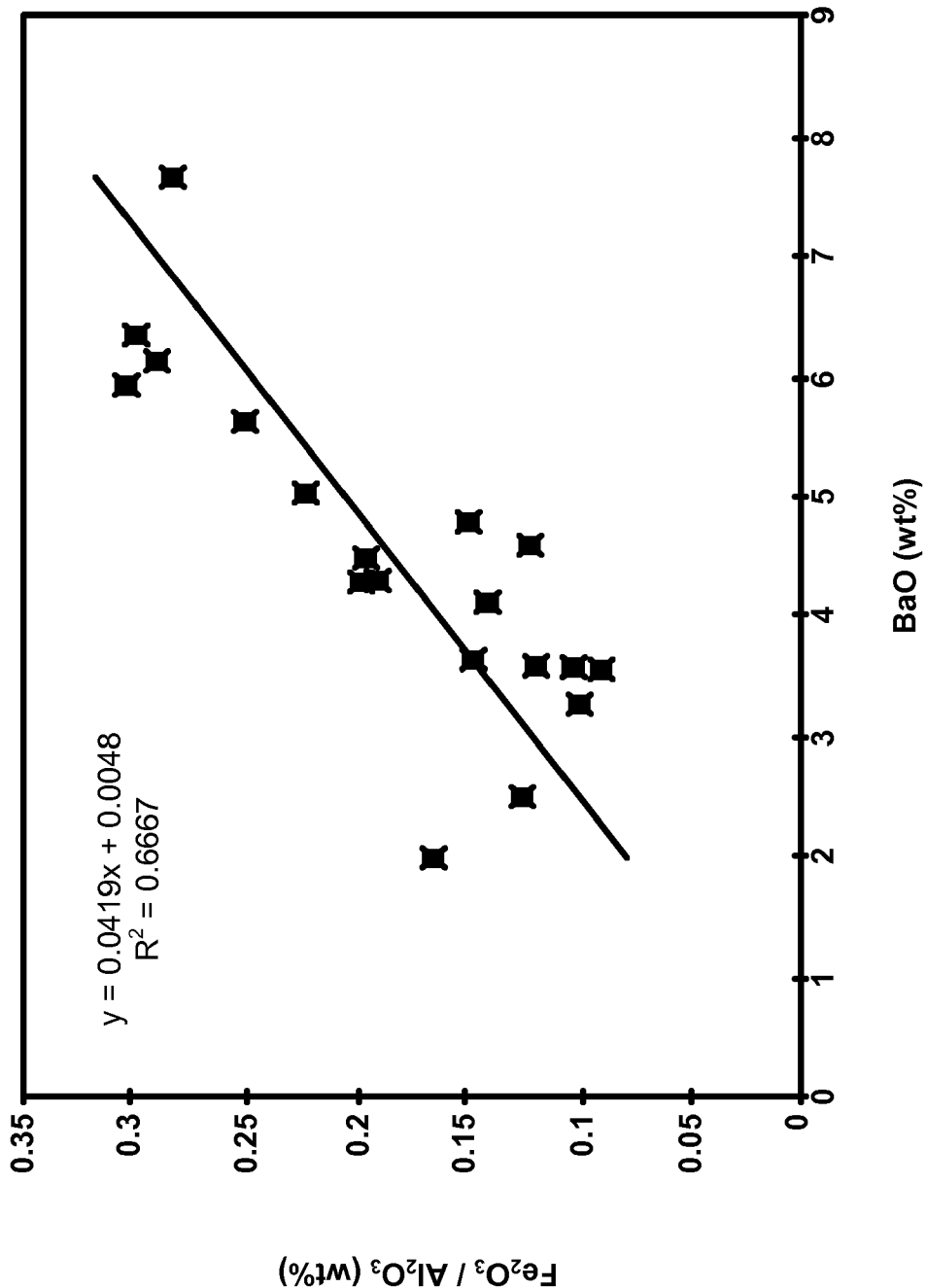
FIG. 44 shows concentration plot of EDS compositions for BaO content and $Fe_2O_3/Al_2O_3$ content in wt % in an experiment with 150 ml of 0.05 N $AgNO_3$.
Figure 45:
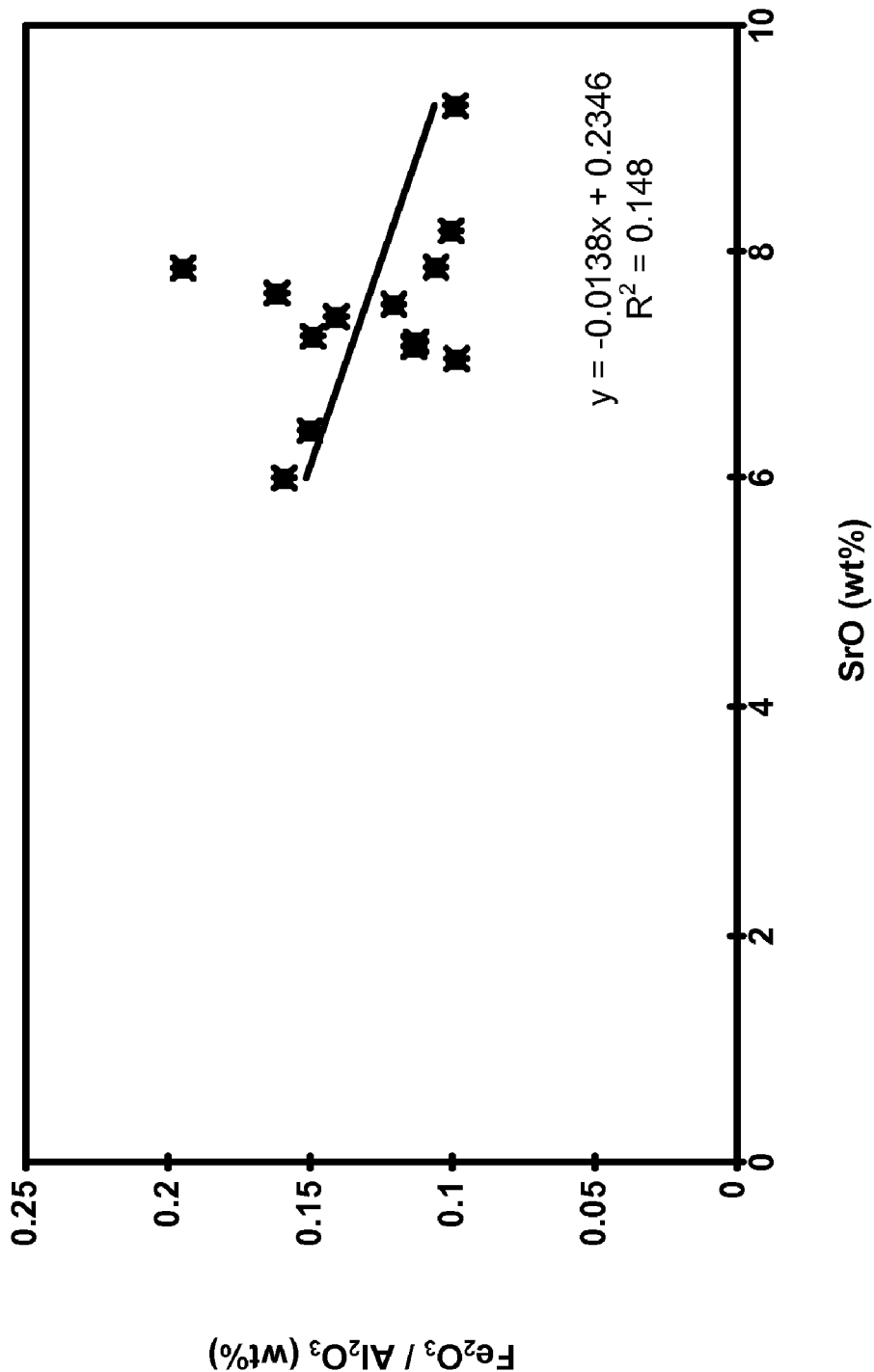
FIG. 45 shows concentration plot of EDS compositions for SrO content and $Fe_2O_3/Al_2O_3$ content in wt % in an experiment with 150 ml of 0.05 N $AgNO_3$.

FIG. 44 shows a chemical composition plot of individual montmorillonite particles showing BaO content and $Fe_2O_3/Al_2O_3$ content in the experiment with 150 ml of 0.05 N AgNO3. Likewise, FIG. 45 shows a chemical composition plot of individual montmorillonite particles showing SrO content and $Fe_2O_3/Al_2O_3$ content in the experiment with 150 ml of 0.05 N $AgNO_3$.

Like the other experiments, the following elements observed for the CsCl, $BaCl_2$ and $SrCl_2.6H_2O$ experiments include Si, Al, Fe, Ca, K, Na and Mg.

TABLES 29-31 show EDS data (weight percent of oxides for each experimental run) for CsCl. TABLE 32 shows their average, minimum, maximum, median, variance and standard deviation.

TABLE 29

EDS Data for CsCl Experiment - Analyses 1-6

|  | 1 | 2 | 3 | 4 | 5 | 6 |
|---|---|---|---|---|---|---|
| $SiO_2$ | 63.74 | 61.01 | 62.07 | 60.04 | 60.76 | 63.74 |
| $Al_2O_3$ | 19.58 | 21.57 | 18.88 | 23.41 | 22.72 | 19.19 |
| $Fe_2O_3$ | 3.35 | 3.42 | 3.66 | 2.89 | 3.53 | 3.08 |
| MgO | 2.13 | 3.51 | 2.48 | 3.72 | 0.86 | 0.75 |
| CaO | 0.54 | 0.56 | 0.55 | 0.56 | 0.29 | 0.26 |
| $Na_2O$ | 0.87 | 1.28 | 0.57 | 1.60 | 1.40 | 1.52 |
| $K_2O$ | 0.00 | 0.03 | 0.25 | 0.18 | 0.00 | 0.00 |
| $Cs_2O$ | 9.12 | 8.62 | 11.54 | 7.54 | 10.26 | 11.11 |
| Cl | 0.67 | 0.00 | 0.00 | 0.06 | 0.19 | 0.36 |
| SUM | 100.00 | 100.00 | 100.00 | 100.00 | 100.01 | 100.01 |

TABLE 30

EDS Data for CsCl Experiment - Analyses 7-12

|  | 7 | 8 | 9 | 10 | 11 | 12 |
|---|---|---|---|---|---|---|
| $SiO_2$ | 60.19 | 56.83 | 62.72 | 64.83 | 59.95 | 62.68 |
| $Al_2O_3$ | 23.52 | 24.71 | 20.80 | 19.76 | 23.00 | 21.60 |
| $Fe_2O_3$ | 2.86 | 2.39 | 2.77 | 2.85 | 3.54 | 2.42 |
| MgO | 3.68 | 5.83 | 3.25 | 2.71 | 3.75 | 2.68 |
| CaO | 0.46 | 0.32 | 0.47 | 0.63 | 0.75 | 0.50 |
| $Na_2O$ | 1.55 | 2.25 | 1.24 | 0.32 | 1.47 | 0.89 |
| $K_2O$ | 0.12 | 0.03 | 0.02 | 0.04 | 0.00 | 0.16 |
| $Cs_2O$ | 7.50 | 7.59 | 8.67 | 8.82 | 7.44 | 9.03 |
| Cl | 0.12 | 0.05 | 0.05 | 0.04 | 0.10 | 0.04 |
| SUM | 100.00 | 100.00 | 99.99 | 100.00 | 100.00 | 100.00 |

TABLE 31

EDS Data for CsCl Experiment - Analyses 13-18

|  | 13 | 14 | 15 | 16 | 17 | 18 |
|---|---|---|---|---|---|---|
| $SiO_2$ | 56.35 | 64.61 | 62.80 | 60.92 | 62.10 | 60.08 |
| $Al_2O_3$ | 21.24 | 19.84 | 21.07 | 21.66 | 20.26 | 20.67 |
| $Fe_2O_3$ | 3.68 | 3.33 | 3.50 | 3.46 | 3.98 | 4.67 |
| MgO | 5.28 | 3.43 | 2.42 | 2.85 | 0.62 | 1.09 |
| CaO | 0.67 | 0.52 | 0.55 | 0.43 | 0.60 | 0.36 |
| $Na_2O$ | 2.74 | 1.34 | 0.54 | 0.93 | 0.00 | 1.07 |
| $K_2O$ | 0.13 | 0.04 | 0.11 | 0.05 | 0.18 | 0.09 |
| $Cs_2O$ | 9.90 | 6.87 | 9.01 | 9.67 | 12.21 | 11.97 |
| Cl | 0.00 | 0.00 | 0.00 | 0.02 | 0.06 | 0.00 |
| SUM | 99.99 | 99.98 | 100.00 | 99.99 | 100.01 | 100.00 |

TABLE 32

Summary of EDS Data for CsCl Experiment

|  | Average | Maximum | Minimum | Variance | Std. Dev. |
|---|---|---|---|---|---|
| $SiO_2$ | 61.41 | 64.83 | 56.35 | 5.51 | 2.35 |
| $Al_2O_3$ | 21.30 | 24.71 | 18.88 | 2.69 | 1.64 |
| $Fe_2O_3$ | 3.30 | 4.67 | 2.39 | 0.31 | 0.56 |
| MgO | 3.84 | 5.83 | 0.62 | 2.08 | 1.44 |
| CaO | 0.50 | 0.75 | 0.26 | 0.02 | 0.13 |
| $Na_2O$ | 1.20 | 2.74 | 0.00 | 0.43 | 0.66 |
| $K_2O$ | 0.08 | 0.25 | 0.00 | 0.01 | 0.08 |
| $Cs_2O$ | 9.27 | 12.21 | 6.87 | 2.66 | 1.63 |
| Cl | 0.10 | 0.67 | 0.00 | 0.03 | 0.17 |

TABLE 33

EDS Data for $BaCl_2$ Experiment - Analyses 1-7

|  | 1 | 2 | 3 | 4 | 5 | 6 | 7 |
|---|---|---|---|---|---|---|---|
| $SiO_2$ | 60.39 | 61.04 | 57.88 | 60.59 | 60.93 | 64.69 | 67.90 |
| $Al_2O_3$ | 26.48 | 22.13 | 27.12 | 22.64 | 23.81 | 22.11 | 20.11 |
| $Fe_2O_3$ | 3.33 | 6.61 | 3.24 | 6.55 | 5.30 | 3.31 | 2.84 |
| MgO | 3.66 | 2.17 | 5.71 | 2.35 | 3.03 | 3.35 | 3.28 |
| CaO | 0.56 | 1.01 | 0.68 | 0.95 | 0.81 | 0.66 | 0.79 |
| BaO | 2.50 | 6.35 | 3.59 | 6.13 | 5.03 | 4.79 | 4.12 |
| $Na_2O$ | 2.74 | 0.58 | 1.79 | 0.67 | 1.08 | 1.12 | 0.96 |
| $K_2O$ | 0.26 | 0.07 | 0.00 | 0.08 | 0.00 | 0.16 | 0.00 |
| Cl | 0.08 | 0.05 | 0.01 | 0.03 | 0.00 | 0.00 | 0.00 |
| SUM | 100.00 | 100.01 | 100.02 | 99.99 | 99.99 | 99.99 | 100.00 |

TABLE 34

EDS Data for $BaCl_2$ Experiment - Analyses 8-14

|  | 8 | 9 | 10 | 11 | 12 | 13 | 14 |
|---|---|---|---|---|---|---|---|
| $SiO_2$ | 57.48 | 61.28 | 58.29 | 55.71 | 62.48 | 73.30 | 61.97 |
| $Al_2O_3$ | 25.59 | 22.29 | 25.41 | 26.90 | 23.60 | 16.73 | 20.38 |
| $Fe_2O_3$ | 2.56 | 4.41 | 2.29 | 2.76 | 2.88 | 2.47 | 5.75 |
| MgO | 7.54 | 5.19 | 7.45 | 7.69 | 4.16 | 2.68 | 2.35 |
| CaO | 0.54 | 0.74 | 0.36 | 0.55 | 0.78 | 0.48 | 0.96 |
| BaO | 3.27 | 4.29 | 3.56 | 3.58 | 4.60 | 3.64 | 7.67 |
| $Na_2O$ | 3.01 | 1.50 | 2.57 | 2.75 | 1.36 | 0.70 | 0.84 |
| $K_2O$ | 0.01 | 0.29 | 0.06 | 0.03 | 0.11 | 0.00 | 0.09 |
| Cl | 0.00 | 0.002 | 0.01 | 0.02 | 0.03 | 0.00 | 0.00 |
| SUM | 100.00 | 100.01 | 100.00 | 99.99 | 100.00 | 100.00 | 100.01 |

TABLE 35

EDS Data for $BaCl_2$ Experiment - Analyses 15-19

|  | 15 | 16 | 17 | 18 | 19 |
|---|---|---|---|---|---|
| $SiO_2$ | 61.30 | 60.96 | 63.32 | 61.26 | 83.36 |
| $Al_2O_3$ | 24.16 | 24.16 | 21.62 | 22.90 | 10.63 |
| $Fe_2O_3$ | 4.60 | 4.73 | 6.55 | 5.72 | 1.76 |
| MgO | 3.61 | 3.73 | 1.35 | 2.78 | 1.43 |
| CaO | 0.66 | 0.56 | 0.92 | 0.87 | 0.27 |
| BaO | 4.30 | 4.49 | 5.93 | 5.63 | 1.99 |
| $Na_2O$ | 1.32 | 1.33 | 0.26 | 0.79 | 0.51 |
| $K_2O$ | 0.03 | 0.00 | 0.04 | 0.003 | 0.00 |
| Cl | 0.03 | 0.04 | 0.02 | 0.02 | 0.06 |
| SUM | 100.01 | 100.00 | 100.01 | 100.00 | 100.01 |

TABLE 36

Summary of EDS Data for $BaCl_2$ Experiment

|  | Average | Maximum | Minimum | Variance | Std. Dev. |
|---|---|---|---|---|---|
| $SiO_2$ | 62.84 | 83.36 | 55.71 | 39.644 | 6.2963 |
| $Al_2O_3$ | 22.57 | 27.12 | 10.63 | 14.922 | 3.8629 |
| $Fe_2O_3$ | 4.09 | 6.61 | 1.76 | 2.58 | 1.6062 |
| MgO | 3.87 | 7.69 | 1.35 | 3.8869 | 1.9715 |
| CaO | 0.69 | 1.01 | 0.27 | 0.0428 | 0.2069 |
| BaO | 4.50 | 7.67 | 1.99 | 1.9536 | 1.3977 |
| $Na_2O$ | 1.36 | 3.01 | 0.26 | 0.6986 | 0.8358 |
| $K_2O$ | 0.07 | 0.29 | 0.00 | 0.0074 | 0.086 |
| Cl | 0.02 | 0.08 | 0.00 | 0.0005 | 0.0227 |

TABLES 33-35 show EDS data for $BaCl_2$. TABLE 36 shows their average, minimum, maximum, median, variance and standard deviation.

TABLES 37-39 show EDS data for $SrCl_2.6H_2O$. TABLE 40 shows their average, minimum, maximum, median, variance and standard deviation.

TABLE 37

EDS Data for SrCl$_2$•6H$_2$O Experiment - Analyses 1-5

|  | 1 | 2 | 3 | 4 | 5 |
|---|---|---|---|---|---|
| SiO$_2$ | 59.44 | 59.47 | 54.69 | 56.96 | 59.44 |
| Al$_2$O$_3$ | 25.61 | 25.09 | 25.51 | 25.68 | 25.61 |
| Fe$_2$O$_3$ | 3.84 | 3.99 | 2.56 | 2.54 | 3.84 |
| MgO | 3.51 | 3.64 | 6.40 | 4.04 | 3.51 |
| CaO | 0.53 | 0.74 | 0.54 | 0.47 | 0.53 |
| SrO | 6.44 | 6.02 | 8.20 | 9.30 | 6.44 |
| Na$_2$O | 0.58 | 0.87 | 2.06 | 0.99 | 0.58 |
| K$_2$O | 0.00 | 0.09 | 0.00 | 0.00 | 0.00 |
| Cl | 0.04 | 0.09 | 0.03 | 0.02 | 0.04 |
| SUM | 99.99 | 100.00 | 99.99 | 100.00 | 99.99 |

TABLE 38

EDS Data for SrCl$_2$•6H$_2$O Experiment - Analyses 6-10

|  | 6 | 7 | 8 | 9 | 10 |
|---|---|---|---|---|---|
| SiO$_2$ | 56.44 | 57.64 | 46.36 | 60.01 | 53.78 |
| Al$_2$O$_3$ | 24.91 | 25.73 | 23.67 | 24.68 | 26.59 |
| Fe$_2$O$_3$ | 3.71 | 2.90 | 3.24 | 3.47 | 2.81 |
| MgO | 3.51 | 3.64 | 6.40 | 4.04 | 3.51 |
| CaO | 0.53 | 0.74 | 0.54 | 0.47 | 0.53 |
| SrO | 6.44 | 6.02 | 8.20 | 9.30 | 6.44 |
| Na$_2$O | 0.58 | 0.87 | 2.06 | 0.99 | 0.58 |
| K$_2$O | 0.00 | 0.09 | 0.00 | 0.00 | 0.00 |
| Cl | 0.04 | 0.09 | 0.03 | 0.02 | 0.04 |
| SUM | 99.99 | 100.00 | 99.99 | 100.00 | 99.99 |

TABLE 39

EDS Data for SrCl$_2$•6H$_2$O Experiment - Analyses 11-15

|  | 11 | 12 | 13 | 14 | 15 |
|---|---|---|---|---|---|
| SiO$_2$ | 66.95 | 57.70 | 56.96 | 55.83 | 50.48 |
| Al$_2$O$_3$ | 17.88 | 26.19 | 25.37 | 26.80 | 19.95 |
| Fe$_2$O$_3$ | 2.03 | 2.58 | 4.10 | 3.23 | 3.88 |
| MgO | 4.19 | 4.27 | 3.70 | 4.50 | 2.28 |
| CaO | 0.33 | 0.50 | 0.56 | 0.72 | 0.65 |
| SrO | 7.18 | 7.07 | 7.65 | 7.55 | 7.87 |
| Na$_2$O | 1.33 | 1.67 | 1.39 | 1.36 | 1.67 |
| K$_2$O | 0.07 | 0.00 | 0.21 | 0.01 | 0.00 |
| Cl | 0.05 | 0.03 | 0.07 | 0.01 | 13.22 |
| SUM | 100.01 | 100.01 | 100.01 | 100.01 | 100.00 |

TABLE 40

Summary of EDS Data for SrCl$_2$•6H$_2$O Experiment

|  | Average | Maximum | Minimum | Variance | Std. Dev. |
|---|---|---|---|---|---|
| SiO$_2$ | 57.56 | 66.95 | 50.48 | 14.041 | 3.7472 |
| Al$_2$O$_3$ | 24.69 | 26.80 | 17.88 | 6.481 | 2.5458 |
| Fe$_2$O$_3$ | 3.25 | 4.10 | 2.03 | 0.4506 | 0.6712 |
| MgO | 4.23 | 6.40 | 2.28 | 1.2808 | 1.1317 |
| CaO | 0.54 | 0.74 | 0.33 | 0.0116 | 0.1076 |
| SrO | 7.40 | 9.30 | 6.02 | 0.6724 | 0.82 |
| Na$_2$O | 1.33 | 2.25 | 0.58 | 0.2901 | 0.5386 |
| K$_2$O | 0.04 | 0.21 | 0.00 | 0.0042 | 0.0647 |
| Cl | 0.97 | 13.22 | 0.00 | 12.423 | 3.5246 |

E. XRD

1. Montmorillonite Mixed with Chloride Powders

X-ray diffraction (XRD) investigation of air dried oriented samples indicates that AgCl is the precipitate that forms, and it occurs in appreciable quantities. Diffraction patterns from these experiments showed a commonly strong peak at ~2.77 Å while some patterns showed a less intense peak at 3.20 Å. These peaks correspond to AgCl (PDF #31-1238). Under each diffraction pattern the calculated reference pattern of AgCl (PDF #31-1238) is provided for comparison.

Furthermore, X-ray diffraction investigation of air dried oriented samples indicates that with increasing addition of 0.05 N AgNO$_3$ solution, a linear increase in the area of the most intense AgCl peak (at ~2.77 Å, PDF #31-1238) can be seen. Strong linear correlations may be observed in the Ba and Sr experiments with $r^2$ values being 0.9843 and 0.9579 respectively. The Cs experiment tends to have a strong but lesser correlation coefficient of 0.7573, which may be attributed to sample heterogeneity owing to mechanical separation.

The X-ray diffraction work indicates that a minimum ratio of 1:20 of 0.05 N AgNO$_3$ to montmorillonite suspension is generally needed to ensure successful sequestration of Cl$^-$. However, a ratio of 1:4 of 0.05 N AgNO$_3$ to montmorillonite suspension is preferred. The reacted montmorillonite slurry should be placed in a container filled to about 75% of the volume and then the remainder should be filled with 0.05N AgNO$_3$. Agitating the container should be done afterwards to readily precipitate the chloride.

Figure 46:
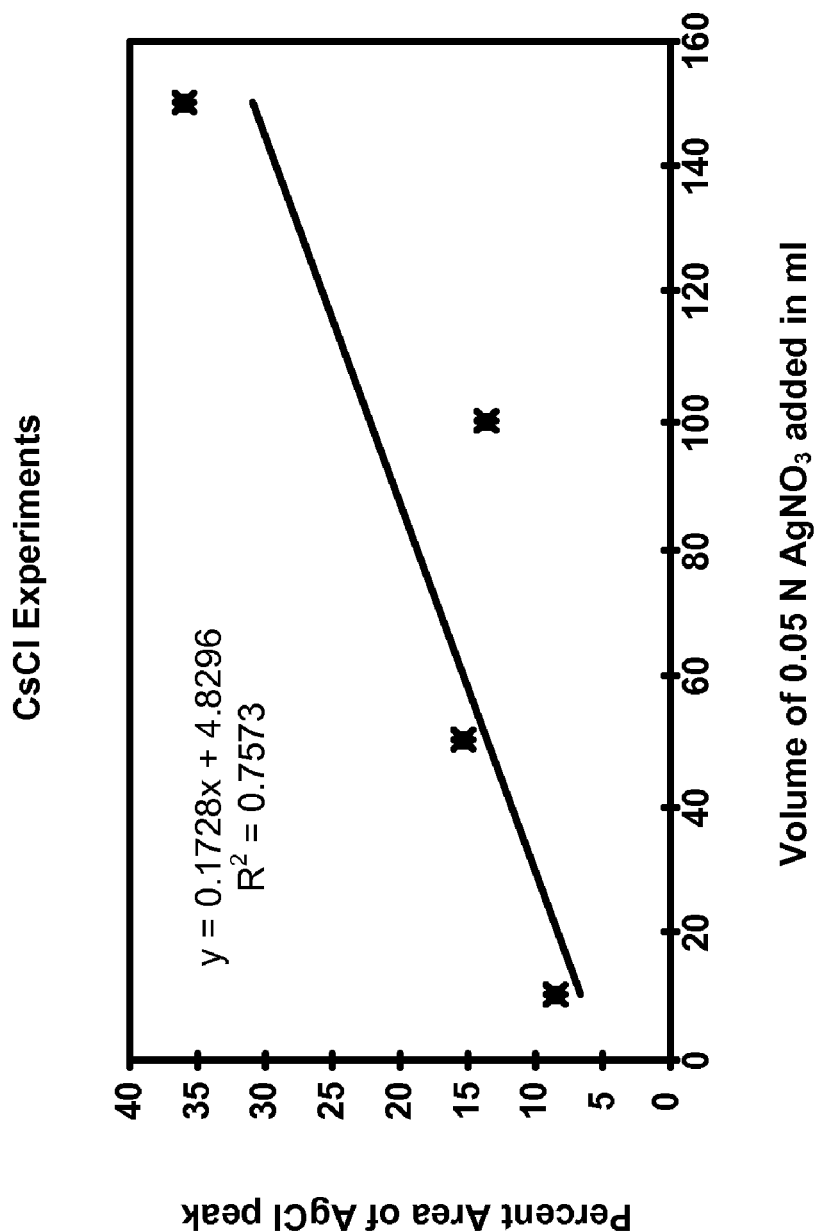
FIG. 46 shows a CsCl experiment plot displaying the percentage area of AgCl peaks as the volume of 0.05 N $AgNO_3$ increases.
Figure 47:
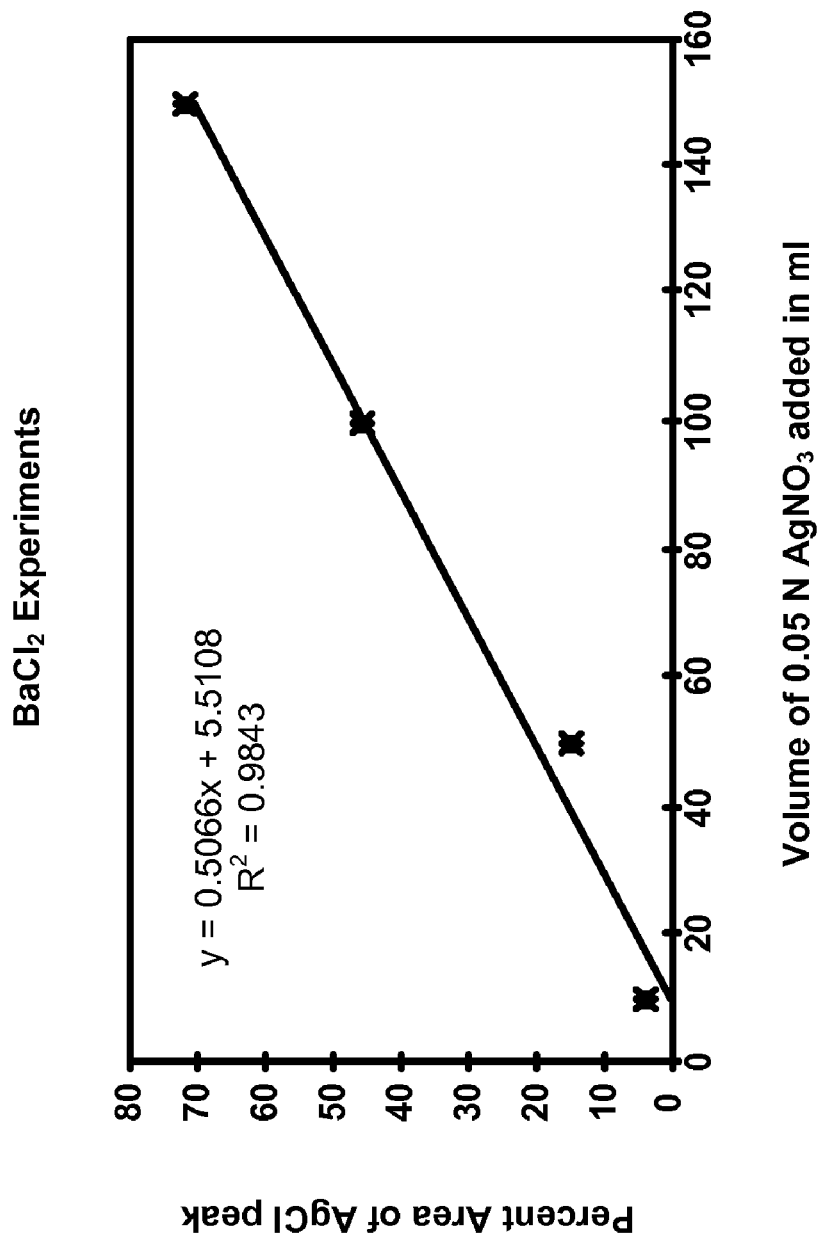
FIG. 47 shows a $BaCl_2$ experiment plot displaying the percentage area of AgCl peaks as the volume of 0.05 N $AgNO_3$ increases.
Figure 48:
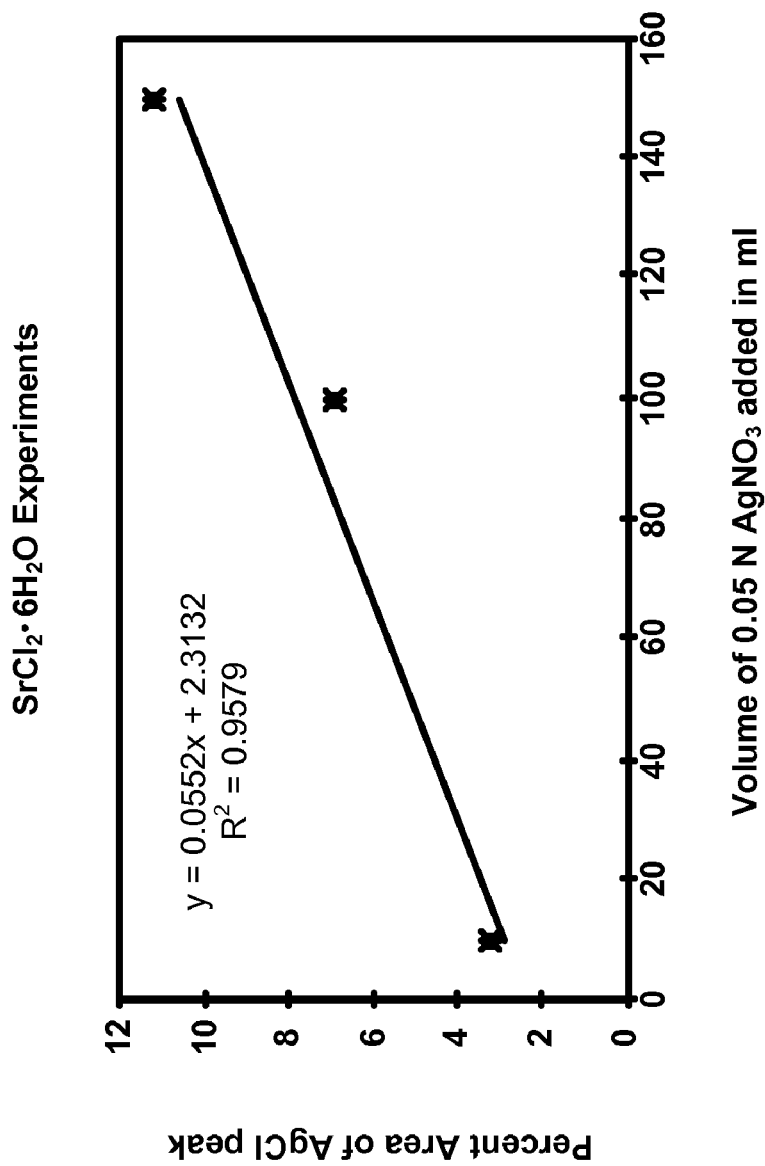
FIG. 48 shows a $SrCl_2.6H_2O$ experiment plot displaying the percentage area of AgCl peaks as the volume of 0.05 N $AgNO_3$ increases.

The following figures indicate the percentage area of AgCl peak with the addition of 0.05 N AgNO$_3$. FIG. 46 shows a plot of the area of the most intense diffraction peak of AgCl (at ~2.77 Å, PDF #31-1238) with the volume of 0.05 N AgNO$_3$ solution added for CsCl experiments. FIG. 47 shows a plot of the area of the most intense diffraction peak of AgCl (at ~2.77 Å, PDF #31-1238) with the volume of 0.05 N AgNO$_3$ solution added for BaCl$_2$ experiments. FIG. 48 shows a plot of the area of the most intense diffraction peak of AgCl (at ~2.77 Å, PDF #31-1238) with the volume of 0.05 N AgNO$_3$ solution added for SrCl$_2$.6H$_2$O experiments.

Figure 49:
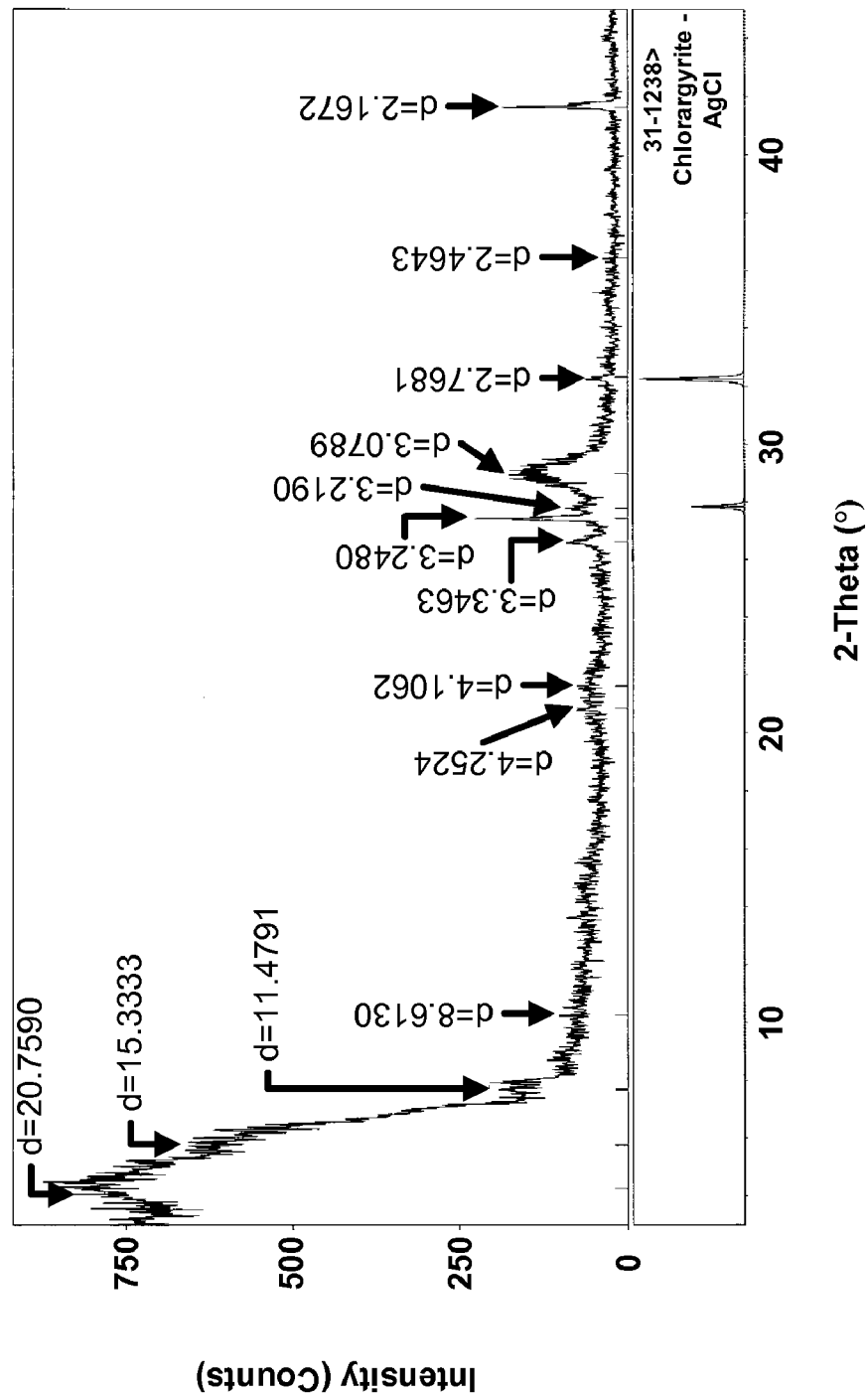
FIG. 49 shows a powder X-ray diffraction pattern for CsCl experiment using 10 ml of 0.05 N $AgNO_3$ solution.
Figure 50:
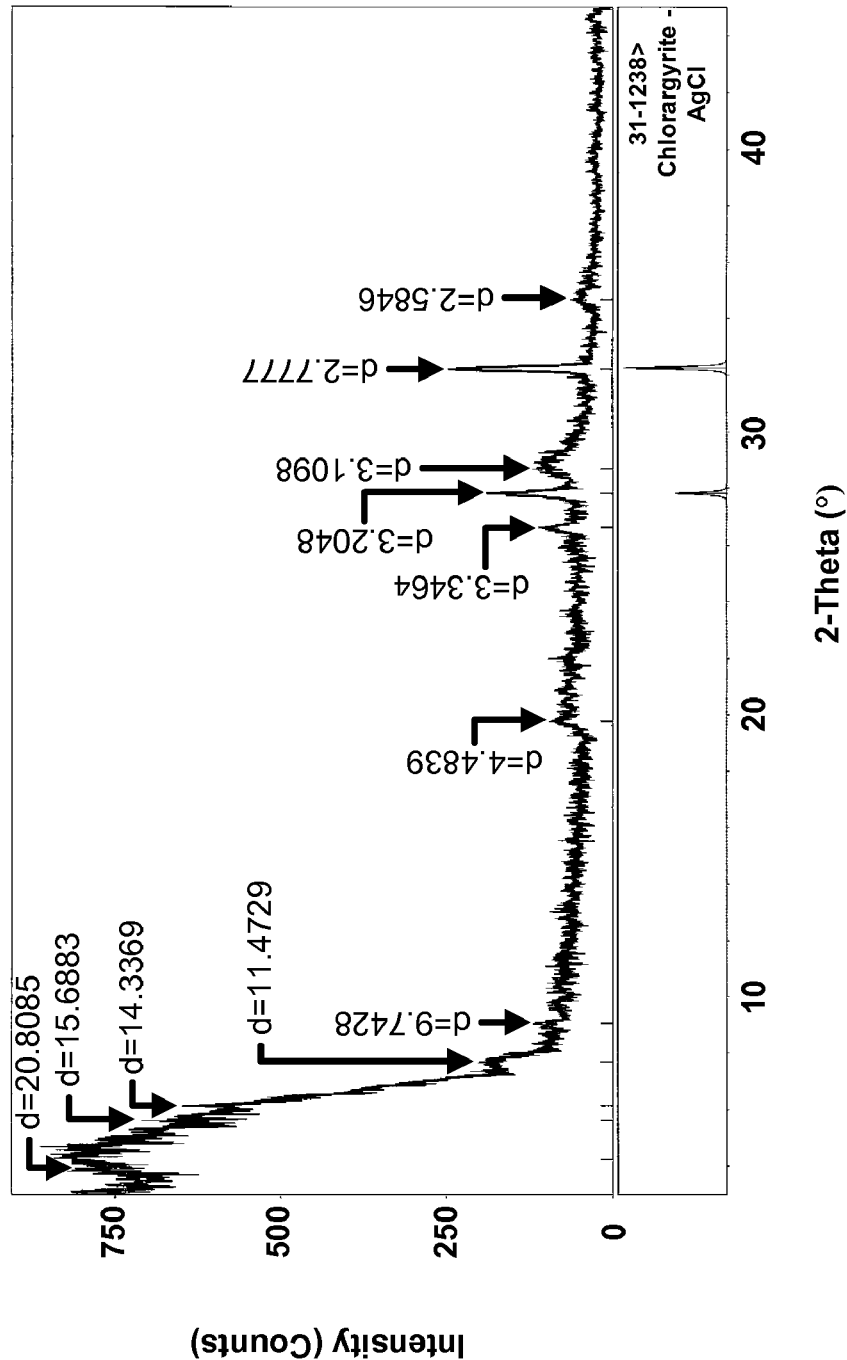
FIG. 50 shows a powder X-ray diffraction pattern for CsCl experiment using 100 ml of 0.05 N $AgNO_3$ solution.
Figure 51:
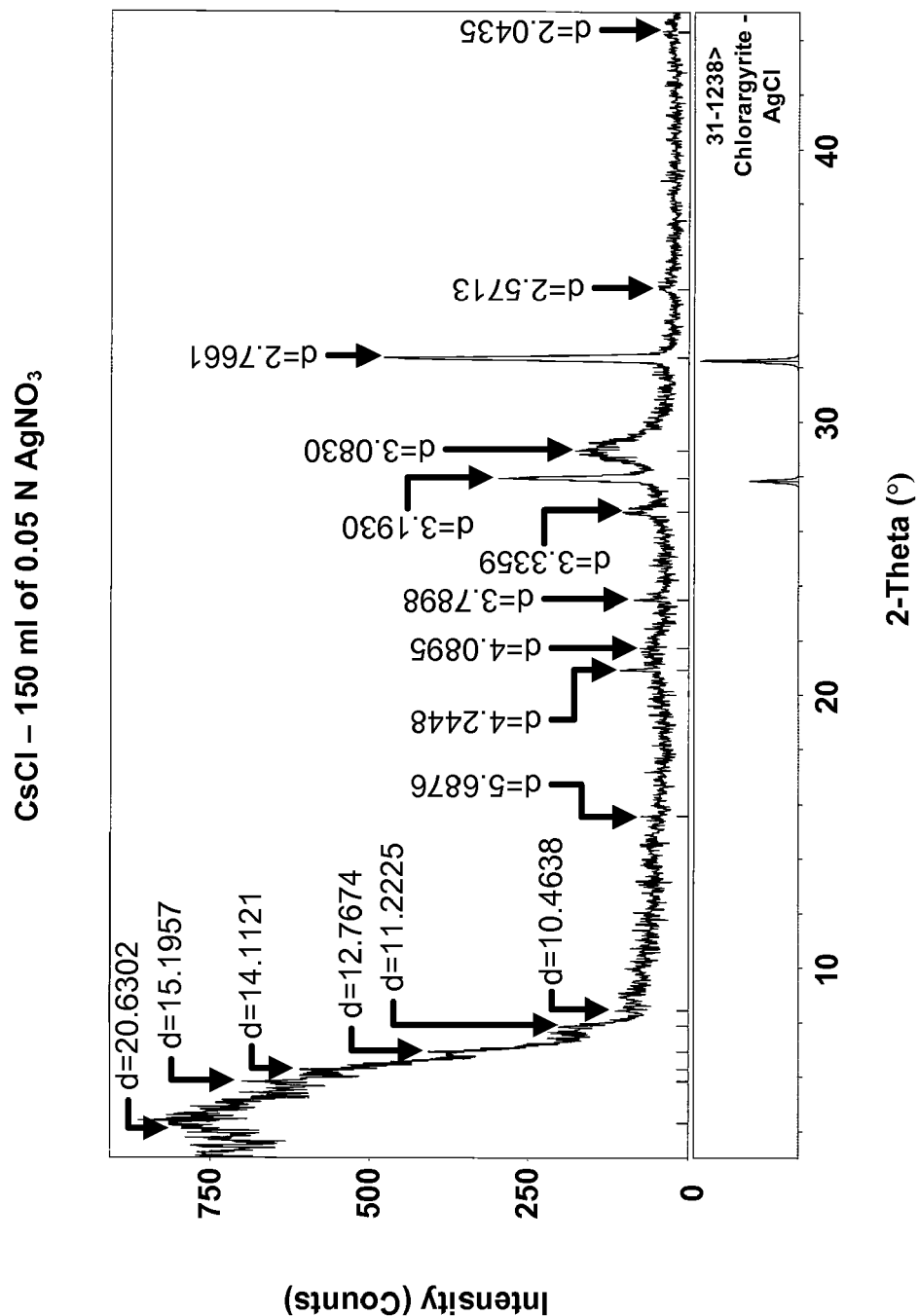
FIG. 51 shows a powder X-ray diffraction pattern for CsCl experiment using 150 ml of 0.05 N $AgNO_3$ solution.

The following figures show powder X-ray diffraction patterns for CsCl experiments. In FIG. 49, 10 ml of 0.05 N AgNO$_3$ solution was used. In FIG. 50, 100 ml of 0.05 N AgNO$_3$ solution was used. In FIG. 51, 150 ml of 0.05 N AgNO$_3$ solution was used. In each of these figures, strong ~2.77 Å and ~3.20 Å AgCl peaks occur. Further, the calculated profile of AgCl is shown below for comparison. Other peaks tend to be from the montmorillonite phase and other mineral components.

Figure 52:
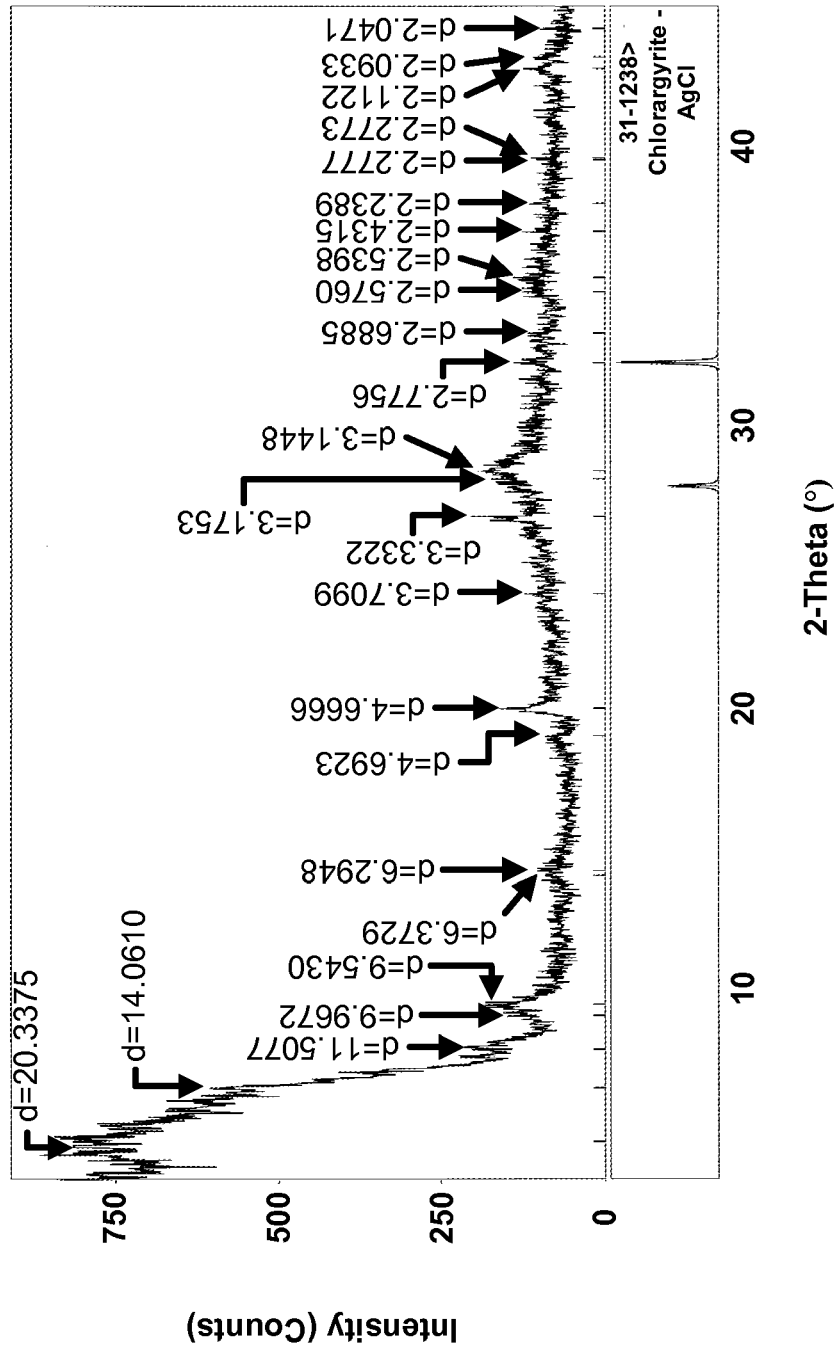
FIG. 52 shows a powder X-ray diffraction pattern for $BaCl_2$ experiment using 10 ml of 0.05 N $AgNO_3$ solution.
Figure 53:
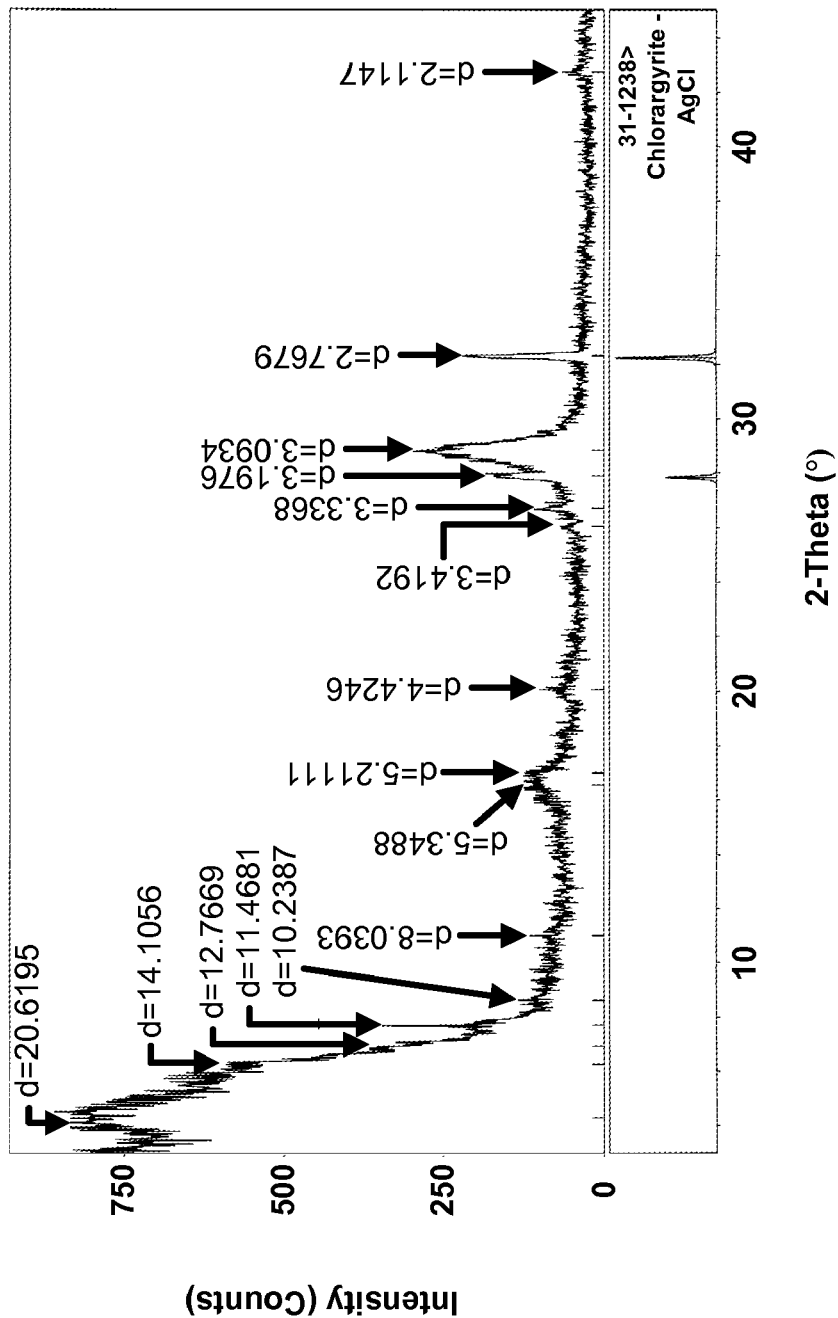
FIG. 53 shows a powder X-ray diffraction pattern for $BaCl_2$ experiment using 50 ml of 0.05 N $AgNO_3$ solution.
Figure 54:
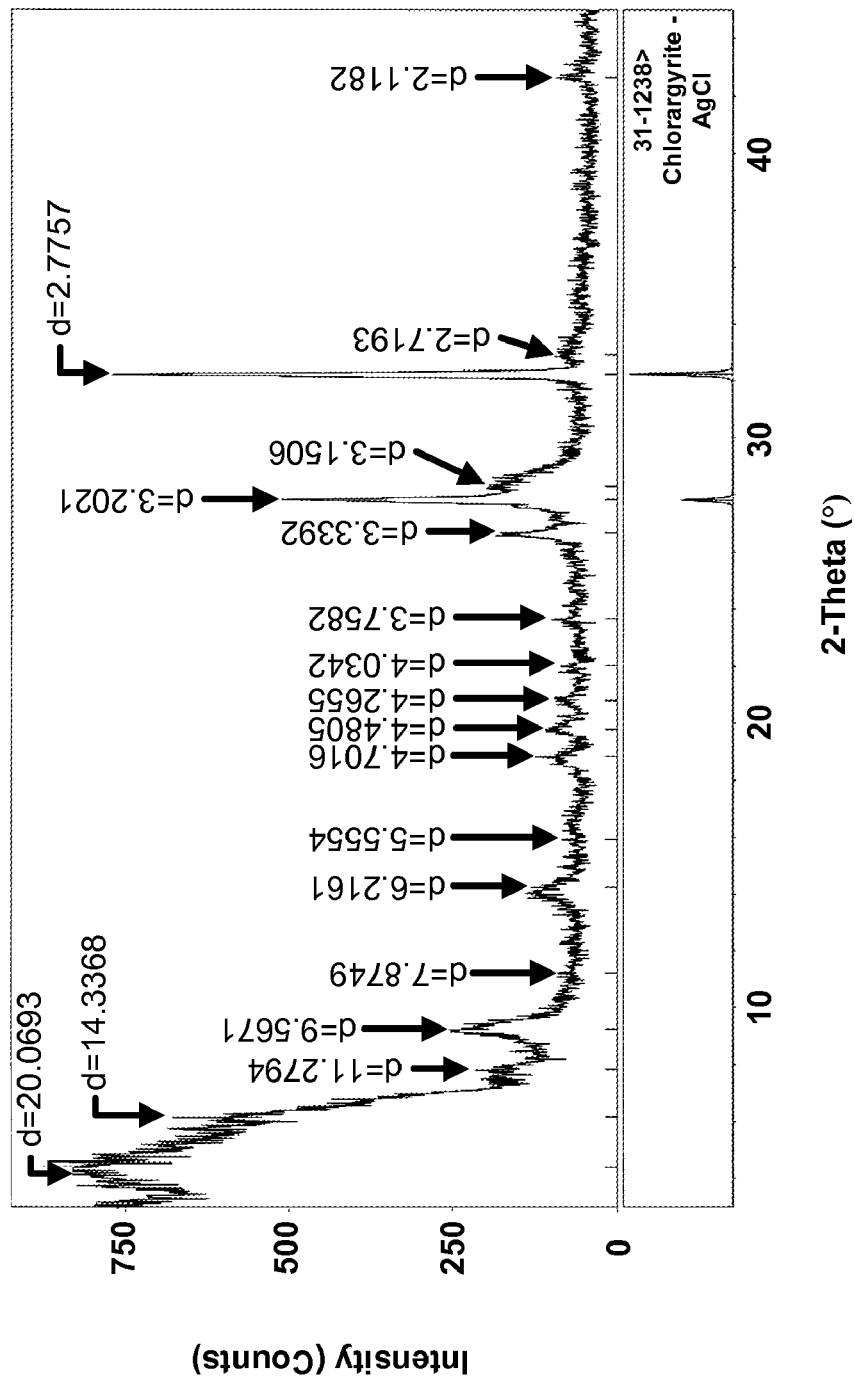
FIG. 54 shows a powder X-ray diffraction pattern for $BaCl_2$ experiment using 100 ml of 0.05 N $AgNO_3$ solution.

The following figures show powder X-ray diffraction patterns for BaCl$_2$ experiments. In FIG. 52, 10 ml of 0.05 N AgNO$_3$ solution was used, and a weak ~2.77 Å AgCl peak occurs. In FIG. 53, 50 ml of 0.05 N AgNO$_3$ solution was used, and moderate ~2.77 Å and ~3.20 Å AgCl peaks occur. In FIG. 54, 100 ml of 0.05 N AgNO$_3$ solution was used, and strong ~2.77 Å and ~3.20 Å AgCl peaks occur. In each of these figures, the calculated profile of AgCl is shown below for comparison. Other peaks tend to be from the montmorillonite phase and other mineral components.

Figure 55:
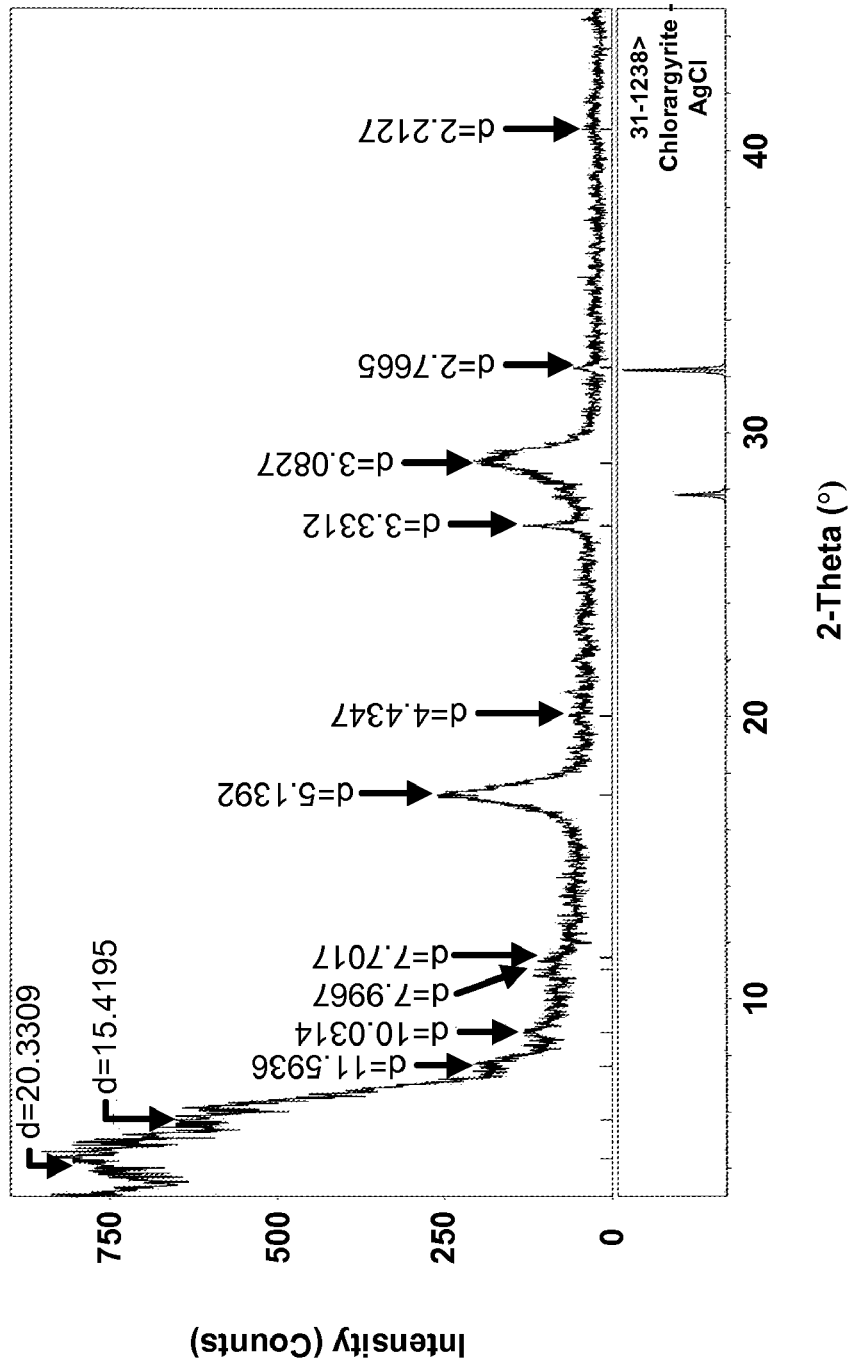
FIG. 55 shows a powder X-ray diffraction pattern for $SrCl_2.6H_2O$ experiment using 10 ml of 0.05 N $AgNO_3$ solution.
Figure 56:
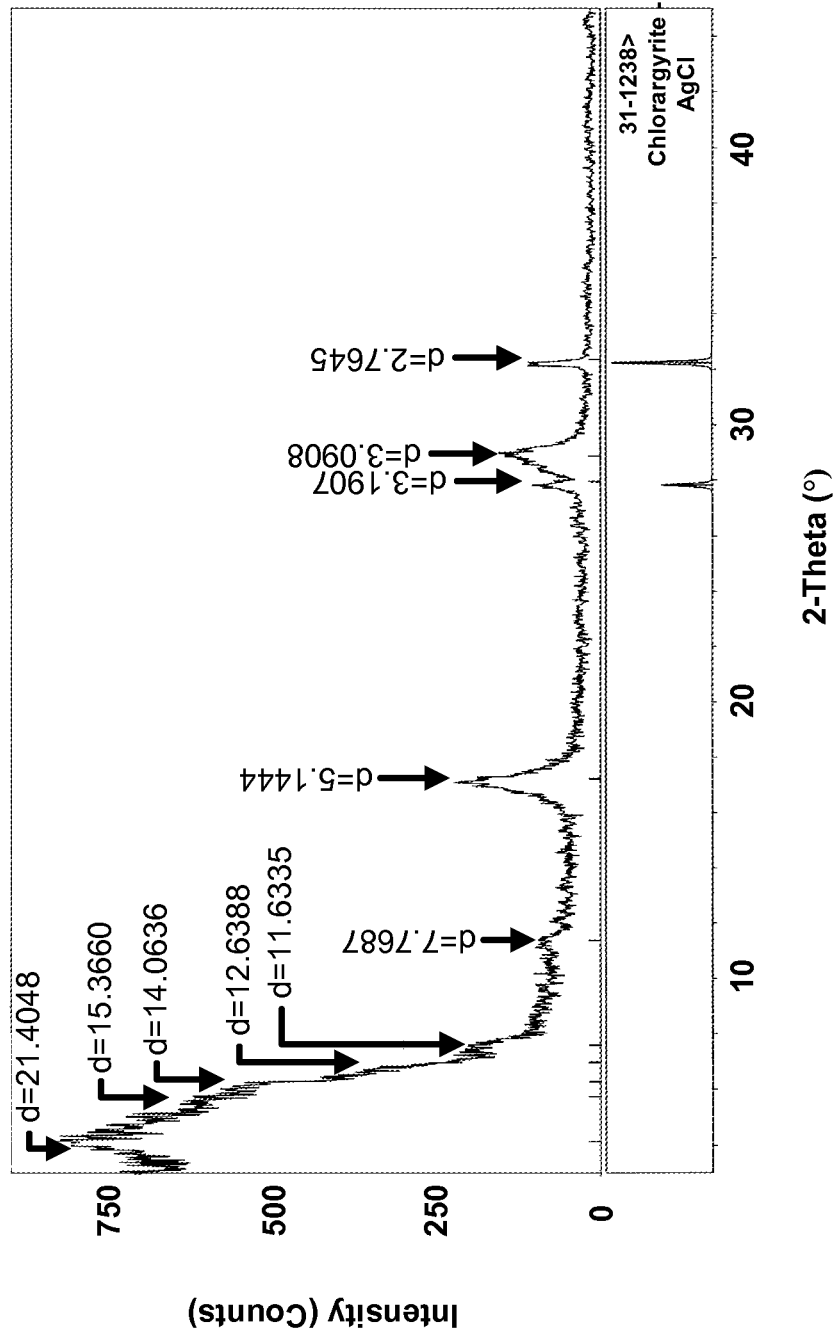
FIG. 56 shows a powder X-ray diffraction pattern for $SrCl_2.6H_2O$ experiment using 100 ml of 0.05 N $AgNO_3$ solution.
Figure 57:
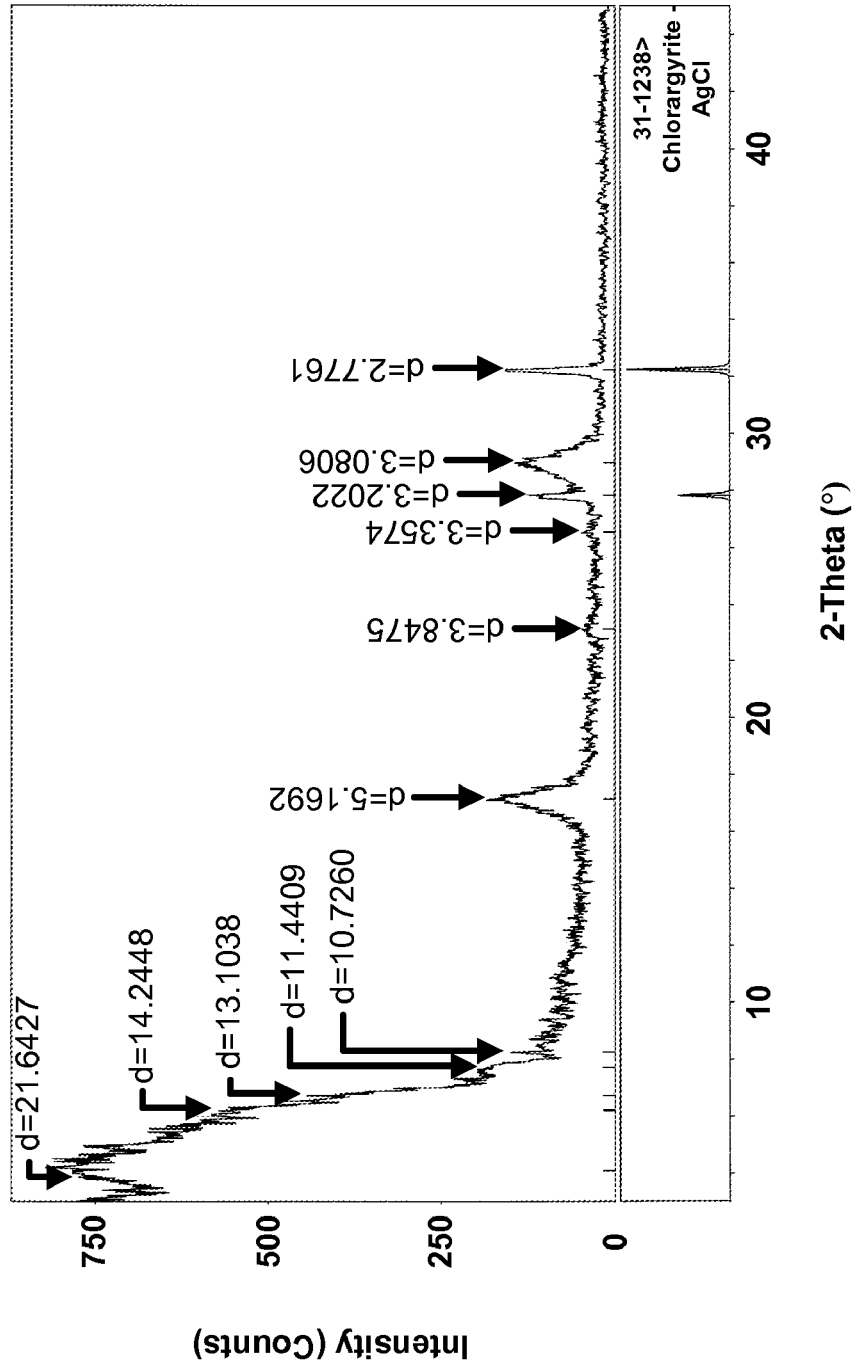
FIG. 57 shows a powder X-ray diffraction pattern for $SrCl_2.6H_2O$ experiment using 150 ml of 0.05 N $AgNO_3$ solution.

The following figures show powder X-ray diffraction patterns for SrCl$_2$.6H$_2$O experiments. In FIG. 55, 10 ml of 0.05 N AgNO$_3$ solution was used. In FIG. 56, 100 ml of 0.05 N AgNO$_3$ solution was used. In FIG. 57, 150 ml of 0.05 N AgNO$_3$ solution was used. In each of these figures, strong ~2.77 Å and ~3.20 Å AgCl peaks occur. Further, the calculated profile of AgCl is shown below for comparison. Other peaks tend to be from the montmorillonite phase and other mineral components.

2. Heated Montmorillonite-AgCl Slurry

After the silver nitrate has been added to the montmorillonite that is mixed with a chloride powder, the slurry formed may be referred to as a montmorillonite-AgCl slurry. The montmorillonite-AgCl slurry can be heated.

Experiments may be conducted at 475° C. for three hours. A major reduction in volume may occur. The heated montmorillonite-AgCl slurry may become a brick-like substance.

XRD data of these heated samples shows that the (001) reflections and other higher order reflections of Cs-exchanged tend to be comparatively lower and more poorly defined compared to unheated Cs-montmorillonite. AgCl peaks may persist and have a comparatively higher intensity owing to the relative decrease in the Cs-montmorillonite and resulting transformations. Lower order (001) peaks of Cs-montmorillonite, Cs-illite and intermediate phases may be seen at lower angles with d values at ~12.2 Å, ~12.6 Å, ~19.5 Å, and ~16.9 Å. Peaks at ~12.2 Å and ~12.6 Å are likely Cs-illite. Peaks at ~19.5 Å and ~16.9 Å are likely peaks from interstratified Cs-illite-montmorillonite phases.

Figure 58:
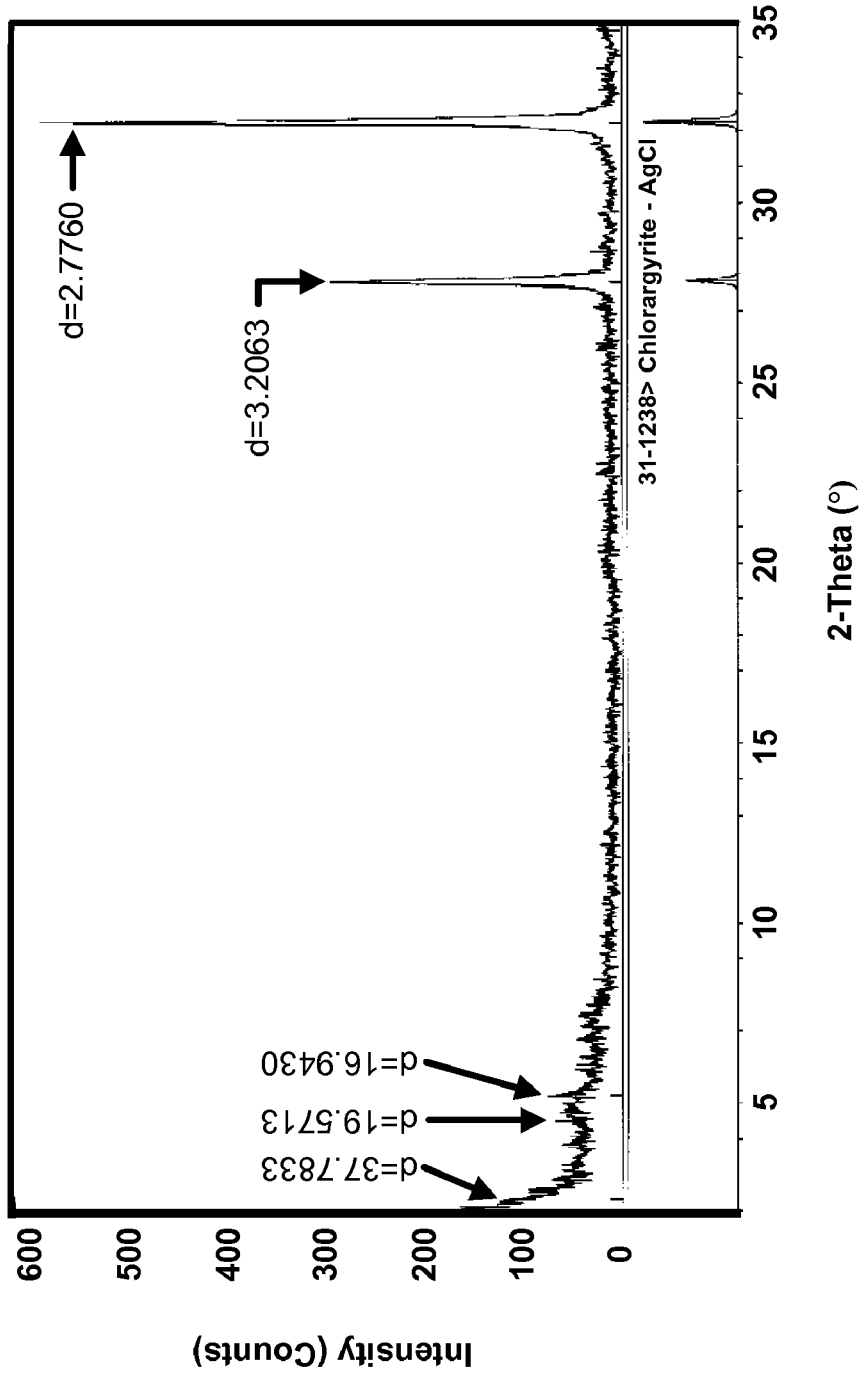
FIG. 58 shows a powder X-ray diffraction pattern for heated montmorillonite-AgCl slurry.
Figure 59:
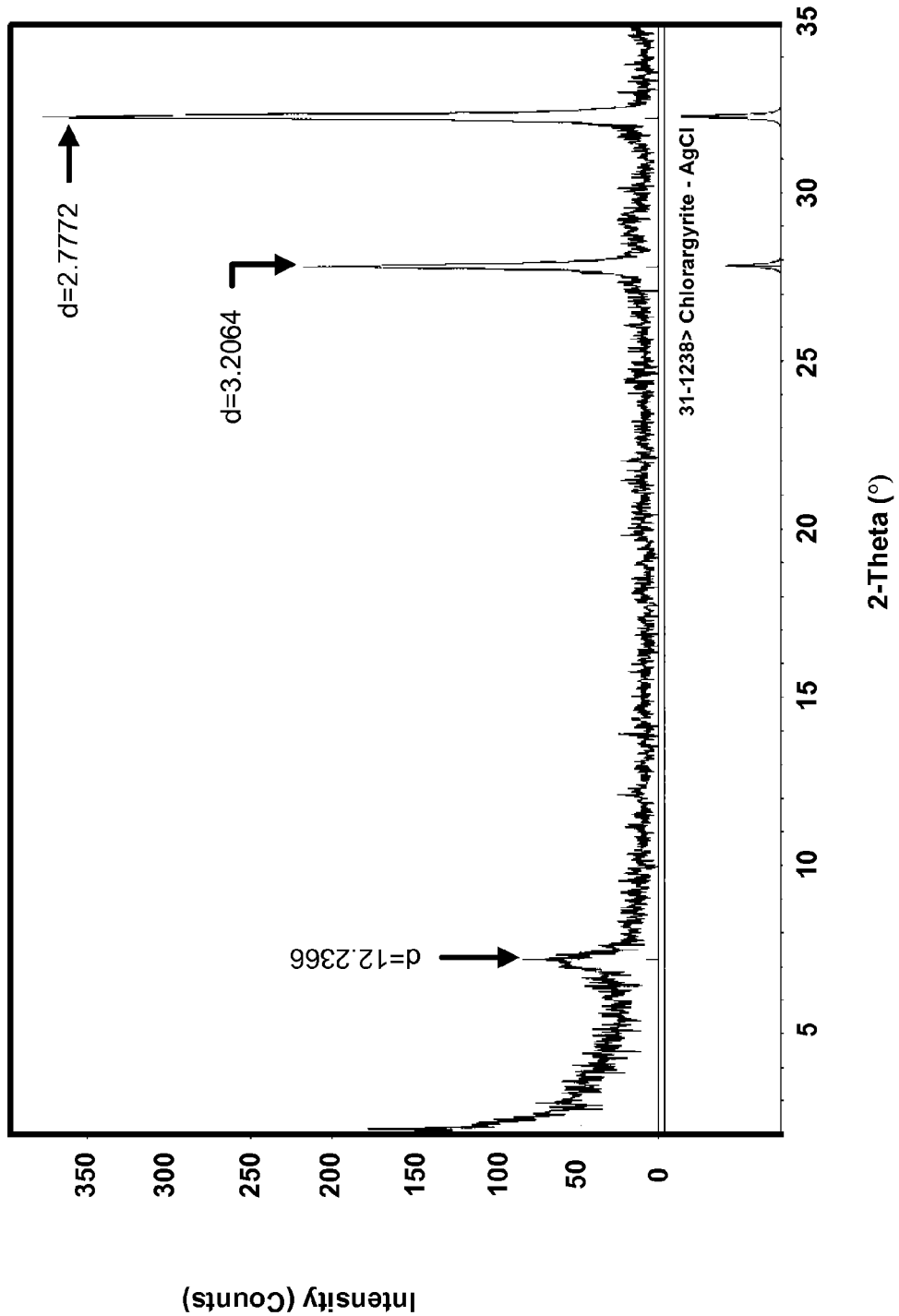
FIG. 59 shows another powder X-ray diffraction pattern for heated montmorillonite-AgCl slurry.
Figure 60:
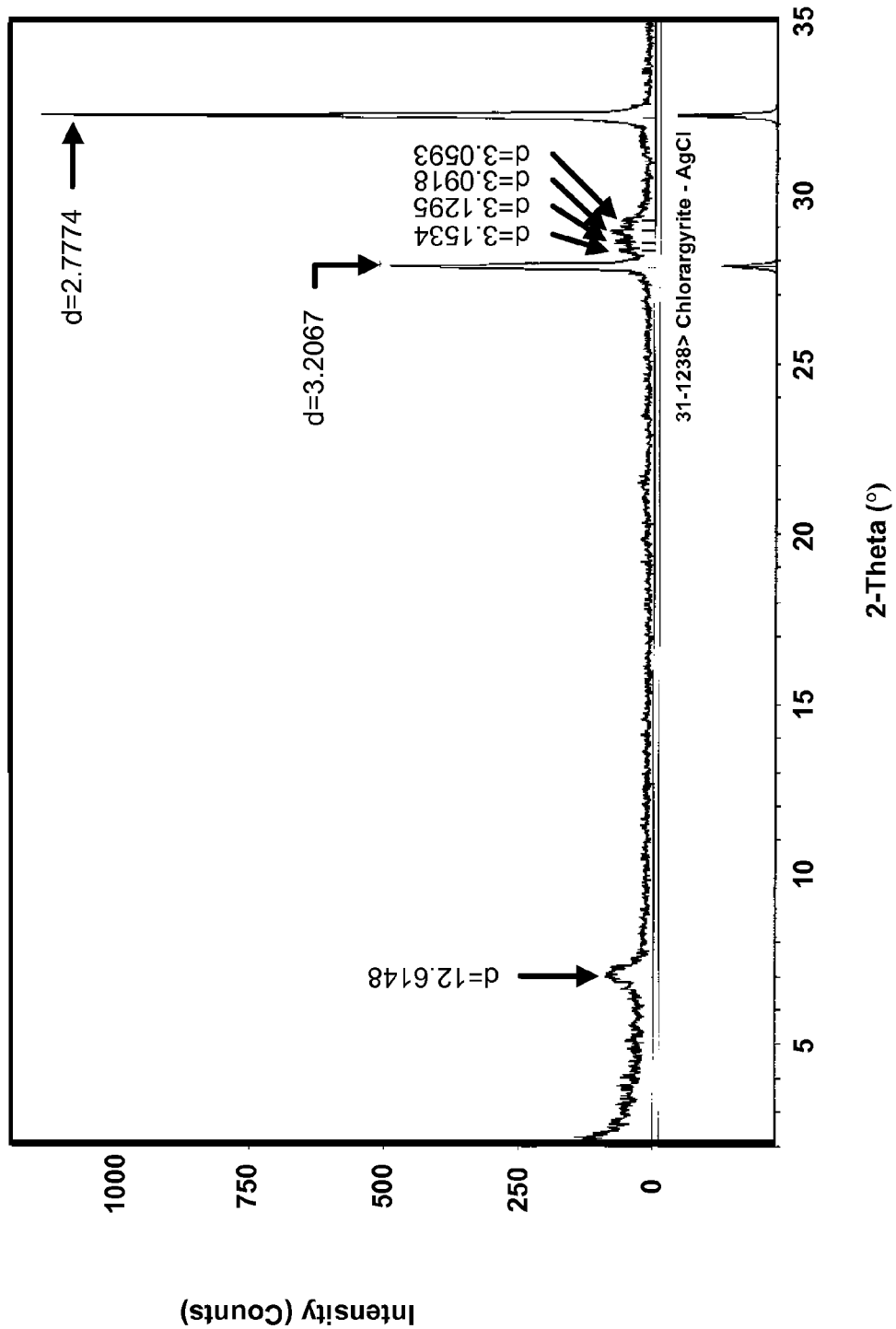
FIG. 60 shows another powder X-ray diffraction pattern for heated montmorillonite-AgCl slurry.

Representative air dried powder XRD patterns of heated Cs-montmorillonite—AgCl slurry heated at 475° C. for three hours can be seen in FIGS. 58, 59, and 60. Peaks of AgCl (~3.20 Å, ~2.77 Å) appear sharp and well defined, and further appear to dominate the patterns. Lower order (001) peaks of Cs-montmorillointe, Cs-illite and intermediate phases are shown at lower angles with d values at ~12.2 Å, ~12.6 Å, ~19.5 Å, and ~16.9 Å. Calculated PDF profile of AgCl is provided below.

F. Properties and Behavior of the Aqueous Clay Suspension on CsCl

Repeated feasibility tests show that a small pile of CsCl that is approximately 1 inch in diameter can be contained by 20 to 30 pumps of aqueous clay suspension 115. The spraying of the suspension on the CsCl powder does not agitate and disperse the powder. This effect is due to the rheological properties of the suspension. The suspension self aggregates and seals the pile. The mixture can then be vacuumed or removed. Upon exchange with Cs$^+$, visible changes in the physical properties occur. After exchange, the color of the aqueous clay suspension 115 turns to Munsell values of 5Y 7/2, 5Y 7/3, 5Y 6/2, 5Y 6/3 or intermediate colors between those values. A dramatic change in the rheological properities occurs where the gel-like consistency of the Na-montmorillonite completely disappears and becomes a waxy paste in the Cs-montmorillonite form. After material is collected it can be heated to 475° for a period of 2 to 7.5 hours. The result of this treatment is conversion of the paste or fluid to a solid brick like substance.

The color of the aqueous clay suspension 115 as compared to a Munsell color chart varies slightly from 2.5Y 6/3 to 2.5Y 6/2. The color is generally uniform within analyses and is not streaked.

Figure 68:
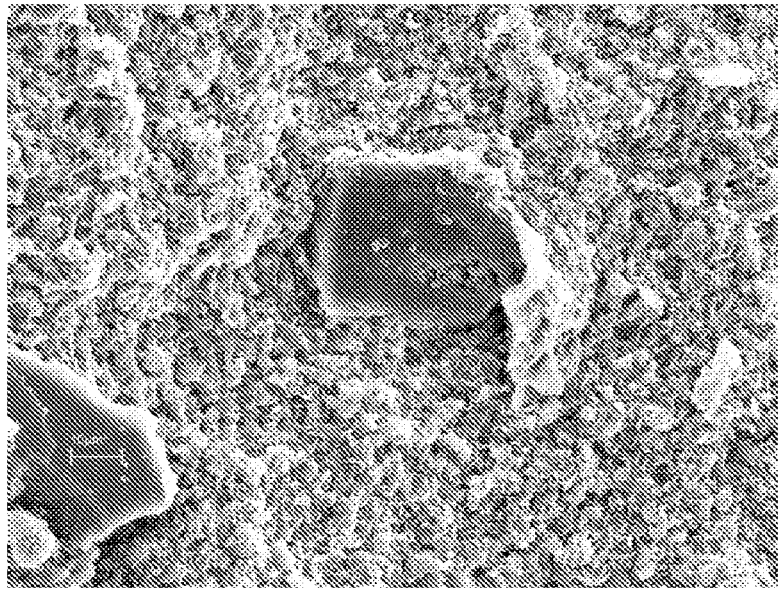
FIG. 68 shows an embodiment of heated Cs-exchanged montmorillonite in solidified state.
Figure 69:
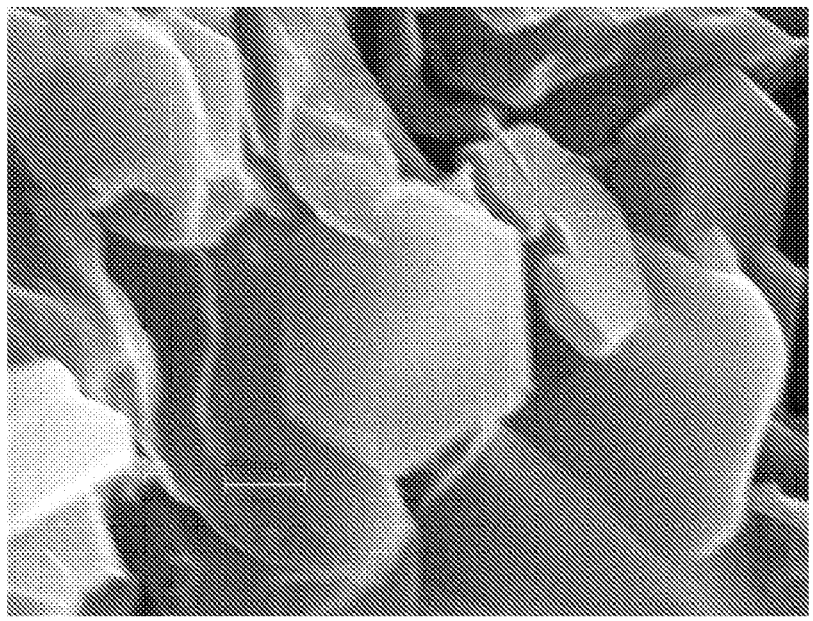
FIG. 69 shows another embodiment of heated Cs-exchanged montmorillonite in solidified state.

Each of the forty analyses of Cs-montmorillonite was analyzed for weight percentage of oxides using X-ray diffraction. For transmission electron microscopy investigation, grain mounts were prepared of the Cs-exchanged montmorillonite using alcohol as a dispersing medium. Analyses were prepared on 300 mesh hole carbon Cu grids. Analyses were investigated using a 300 kV JEM 3010 TEM and a 200 kV 2010 SEM. The weight percentages of oxides are shown in TABLES 41-44. FIGS. 61-67 show images of observed Cs-montmorillonite, the product of the aqueous clay suspension 115 applied to CsCl. FIGS. 68-69 show heated Cs-exchanged montmorillonite in solidified state. Plot concentrations of oxides from these tables are illustrated in FIGS. 70-74.

TABLE 41

Weight % of Oxides in Cs-montmorillonite Analyses 1-10

|  | 1 | 2 | 3 | 4 | 5 | 6 | 7 | 8 | 9 | 10 |
|---|---|---|---|---|---|---|---|---|---|---|
| $SiO_2$ | 59.18 | 61.74 | 67.68 | 58.64 | 56.55 | 59.09 | 59.34 | 62.90 | 60.69 | 60.83 |
| $Al_2O_3$ | 19.73 | 21.36 | 19.34 | 18.54 | 16.64 | 22.83 | 22.23 | 23.40 | 22.35 | 23.43 |
| $Fe_2O_3$ | 3.64 | 4.09 | 2.42 | 2.83 | 4.01 | 3.69 | 3.38 | 3.67 | 3.99 | 3.52 |
| MgO | 1.77 | 2.08 | 1.88 | 2.73 | 2.67 | 2.63 | 2.47 | 2.15 | 2.54 | 2.37 |
| CaO | 0.18 | 0.00 | 0.01 | 0.33 | 0.28 | 0.00 | 0.05 | 0.00 | 0.02 | 0.05 |
| $K_2O$ | 0.01 | 0.00 | 0.02 | 0.00 | 0.00 | 0.00 | 0.00 | 0.00 | 0.00 | 0.00 |
| $Cs_2O$ | 14.95 | 10.72 | 8.55 | 16.35 | 18.36 | 11.67 | 12.38 | 7.79 | 10.31 | 9.63 |
| Cl | 0.54 | 0.02 | 0.10 | 0.59 | 1.50 | 0.09 | 0.14 | 0.09 | 0.09 | 0.17 |
| Total | 100 | 100.01 | 100 | 100.01 | 100.01 | 100 | 99.99 | 100 | 99.99 | 100 |

TABLE 42

Weight % of Oxides in Cs-montmorillonite Analyses 11-20

|  | 11 | 12 | 13 | 14 | 15 | 16 | 17 | 18 | 19 | 20 |
|---|---|---|---|---|---|---|---|---|---|---|
| $SiO_2$ | 82.40 | 79.22 | 60.74 | 63.78 | 60.34 | 62.02 | 61.55 | 61.55 | 59.04 | 59.51 |
| $Al_2O_3$ | 9.74 | 11.67 | 20.65 | 20.80 | 19.43 | 22.50 | 23.26 | 22.46 | 23.70 | 20.61 |
| $Fe_2O_3$ | 1.38 | 1.18 | 3.85 | 3.34 | 4.20 | 3.34 | 4.03 | 3.83 | 3.04 | 2.90 |
| MgO | 1.28 | 1.77 | 2.61 | 2.33 | 1.66 | 2.01 | 2.11 | 2.88 | 3.36 | 3.06 |
| CaO | 0.00 | 0.15 | 0.02 | 0.00 | 0.44 | 0.09 | 0.09 | 0.10 | 0.00 | 0.14 |
| $K_2O$ | 0.11 | 0.00 | 0.20 | 0.00 | 0.02 | 0.00 | 0.00 | 0.00 | 0.00 | 0.00 |
| $Cs_2O$ | 4.91 | 5.84 | 11.56 | 9.31 | 12.34 | 9.88 | 8.90 | 8.95 | 10.59 | 13.42 |
| Cl | 0.17 | 0.18 | 0.36 | 0.44 | 1.57 | 0.17 | 0.05 | 0.23 | 0.27 | 0.36 |
| Total | 100.00 | 100.01 | 100.00 | 100.00 | 100.00 | 100.00 | 100.00 | 100.00 | 100.00 | 100.00 |

TABLE 43

Weight % of Oxides in Cs-montmorillonite Analyses 21-30

|  | 21 | 22 | 23 | 24 | 25 | 26 | 27 | 28 | 29 | 30 |
|---|---|---|---|---|---|---|---|---|---|---|
| $SiO_2$ | 59.51 | 60.33 | 60.92 | 60.45 | 61.89 | 61.72 | 58.83 | 59.59 | 57.72 | 59.53 |
| $Al_2O_3$ | 20.61 | 21.75 | 21.67 | 22.47 | 22.85 | 24.33 | 22.17 | 20.56 | 19.73 | 22.36 |
| $Fe_2O_3$ | 2.90 | 2.88 | 4.68 | 3.12 | 3.34 | 2.39 | 2.97 | 3.15 | 3.59 | 4.01 |
| MgO | 3.06 | 2.09 | 2.02 | 2.65 | 3.06 | 2.82 | 2.80 | 1.46 | 2.77 | 3.06 |
| CaO | 0.14 | 0.00 | 0.00 | 0.08 | 0.02 | 0.02 | 0.00 | 0.00 | 0.07 | 0.00 |
| $K_2O$ | 0.00 | 0.00 | 0.00 | 0.00 | 0.00 | 0.00 | 0.00 | 0.01 | 0.00 | 0.11 |
| $Cs_2O$ | 13.42 | 12.80 | 10.57 | 11.13 | 8.56 | 8.67 | 12.68 | 14.89 | 15.45 | 10.85 |
| Cl | 0.36 | 0.15 | 0.14 | 0.10 | 0.27 | 0.04 | 0.55 | 0.35 | 0.66 | 0.09 |
| Total | 100.00 | 100.00 | 100.00 | 100.00 | 99.99 | 100.00 | 100.00 | 100.00 | 100.00 | 100.00 |

TABLE 44

Weight % of Oxides in Cs-montmorillonitee Analyses 31-40

|  | 31 | 32 | 33 | 34 | 35 | 36 | 37 | 38 | 39 | 40 |
|---|---|---|---|---|---|---|---|---|---|---|
| $SiO_2$ | 58.29 | 60.78 | 57.78 | 60.48 | 64.88 | 74.60 | 61.87 | 60.18 | 61.01 | 58.54 |
| $Al_2O_3$ | 19.50 | 21.68 | 20.96 | 16.54 | 15.72 | 12.12 | 21.37 | 21.07 | 22.93 | 19.13 |
| $Fe_2O_3$ | 1.86 | 4.17 | 2.21 | 3.38 | 2.28 | 2.16 | 2.77 | 2.49 | 2.20 | 3.93 |
| MgO | 2.93 | 2.22 | 3.43 | 3.75 | 3.16 | 1.97 | 2.82 | 2.76 | 3.14 | 1.57 |
| CaO | 0.25 | 0.02 | 0.00 | 0.35 | 0.23 | 0.00 | 0.20 | 0.17 | 0.00 | 0.02 |
| $K_2O$ | 0.05 | 0.00 | 0.05 | 0.00 | 0.00 | 0.00 | 0.00 | 0.04 | 0.07 | 0.29 |
| $Cs_2O$ | 16.50 | 11.12 | 14.63 | 14.61 | 13.21 | 8.92 | 10.62 | 12.99 | 10.43 | 15.95 |
| Cl | 0.61 | 0.01 | 0.95 | 0.88 | 0.53 | 0.24 | 0.35 | 0.31 | 0.22 | 0.57 |
| Total | 100.00 | 100.00 | 100.00 | 99.99 | 100.00 | 100.00 | 100.00 | 100.00 | 100.00 | 100.00 |

Figure 61:
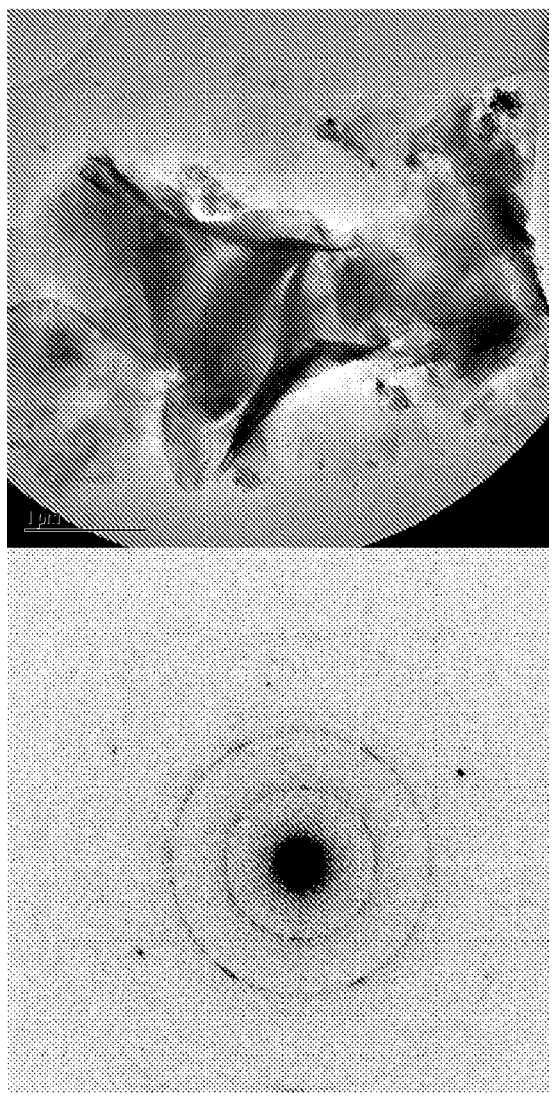
FIG. 61 shows a foliated lamellar aggregate with folded, curled, and straight edges of Cs-exchanged montmorillonite.

FIG. 61 shows foliated lamellar aggregate, center page, ~2.0 μm to ~2.5 μm, with folded, curled, and straight edges. Foliated lamellar aggregate, far right, are ~0.5 μm to ~2.0 μm. Subangular quartz fragments, ~0.05 μm to ~0.2 μm, are accumulated around particles. Aggregates are surrounded by subhedral platelets. Lower SAED pattern shows spots indicating increase in crystallinity.

Figure 62:
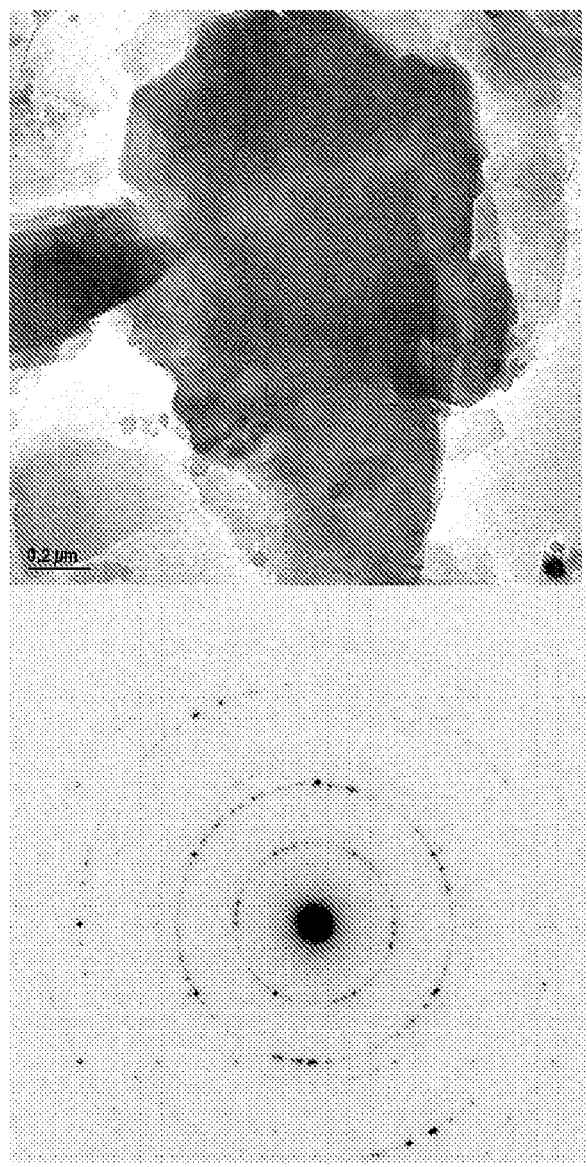
FIG. 62 shows two platy particles, where one is adjacent to a larger particle, of Cs-exchanged montmorillonite.

FIG. 62 shows platy particle, ~1.2 μm to ~2.0 μm, and a 0.4 μm to ~0.6 μm platy particle adjacent to a larger particle. Quartz grains surround the platy particle, ~0.1 μm. Particles are surrounded by subhedral platelets. Lower SAED pattern shows spots indicating increase in crystallinity.

Figure 63:
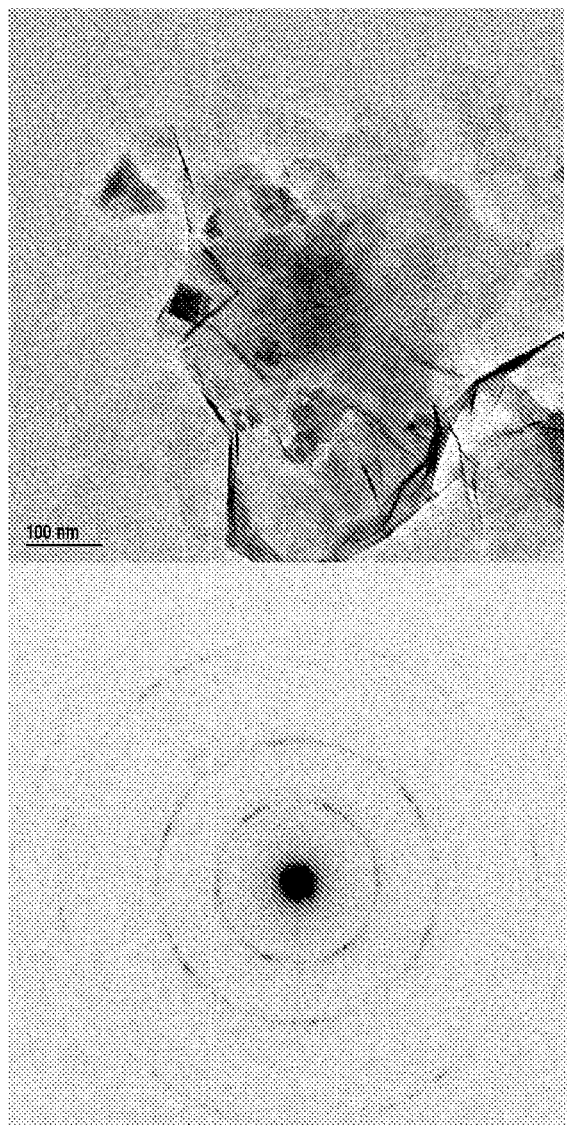
FIG. 63 shows foliated lamellar aggregates of Cs-exchanged montmorillonite.

FIG. 63 shows foliated lamellar aggregates, ~450 nm to ~600 nm. Particle edges are curled and folding occurs within main fragment. Quartz aggregates reside in particle, ~50 nm to ~100 nm. Rhombohedral grain, ~50 nm, at left edge of particle. Lower SAED pattern shows spots indicating increase in crystallinity.

Figure 64:
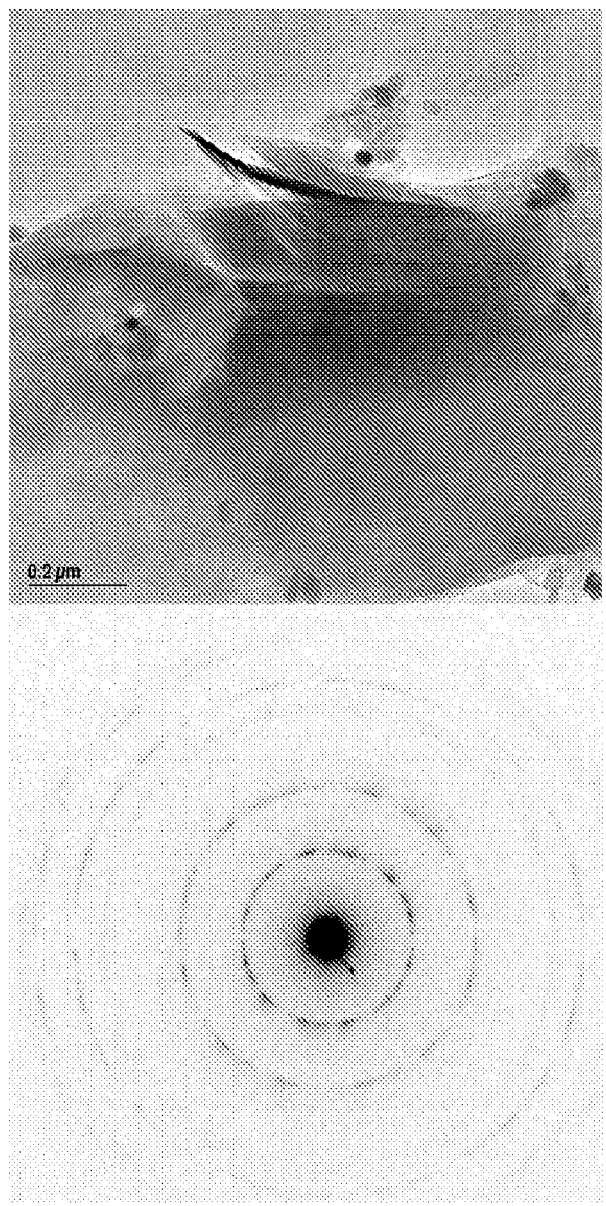
FIG. 64 shows a foliated lamellar aggregate with folding along the center edge of Cs-exchanged montmorillonite.

FIG. 64 shows foliated lamellar aggregate, ~1.0 μm to ~1.9+μm. Folding along the center edge of particle is ~0.6 μm. Quartz aggregates within particle are ~0.05 μm. Quartz aggregates outside of the particle are ~0.2 μm. Lower SAED pattern shows spots indicating increase in crystallinity.

Figure 65:
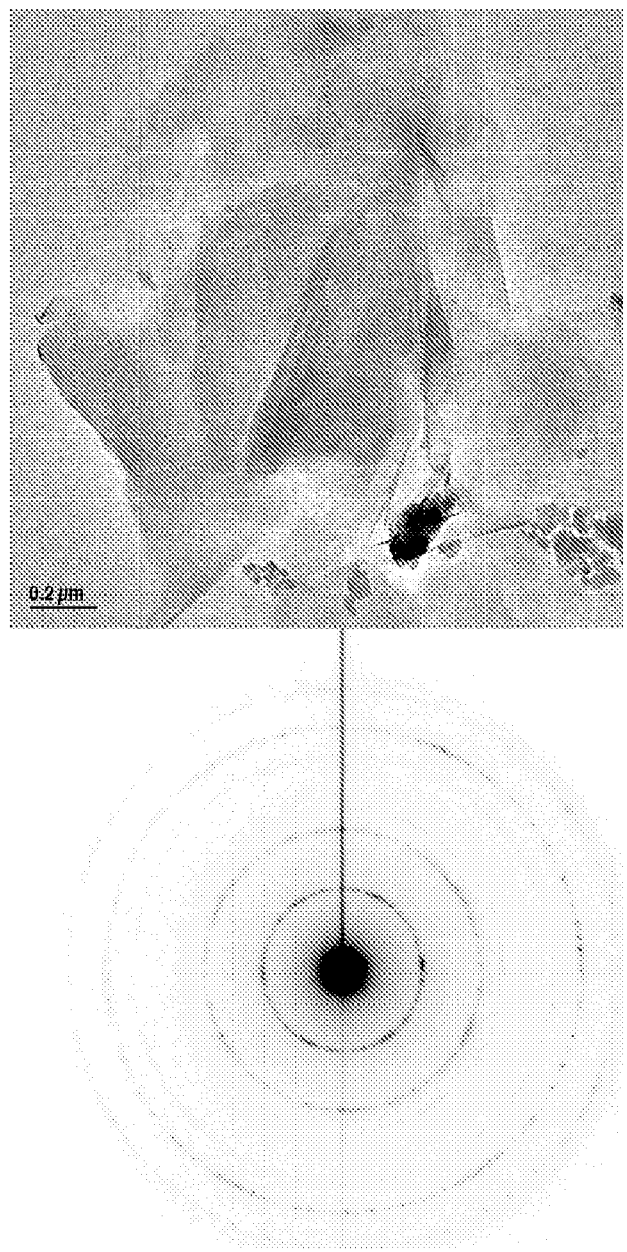
FIG. 65 shows a foliated lamellar aggregate with folding within the center and along the edges of Cs-exchanged montmorillonite.

FIG. 65 shows foliated lamellar aggregate, ~1.4 μm to ~2.0 μm. Folding within the center and along the edges of particle. Quartz aggregates gathered at lower portion of particle are ~0.1 μm to ~0.2 μm. Dark quartz aggregate is ~0.175 μm to ~0.3 μm. Lower SAED pattern shows spots indicating increase in crystallinity.

Figure 66:
FIG. 66 shows two foliated lamellar aggregates as another embodiment of Cs-exchanged montmorillonite.
Figure 66:
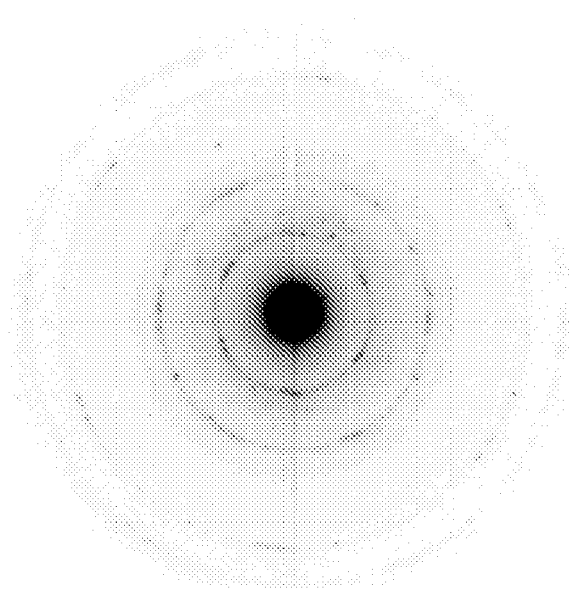

FIG. 66 shows two foliated lamellar aggregates, ~0.8 μm to ~1.2 μm, and ~1.6 μm to ~1.2 μm. Folding edges are illustrated between both particles. Quartz aggregates, ~0.1 μm. Lower SAED pattern shows spots indicating increase in crystallinity.

Figure 67:
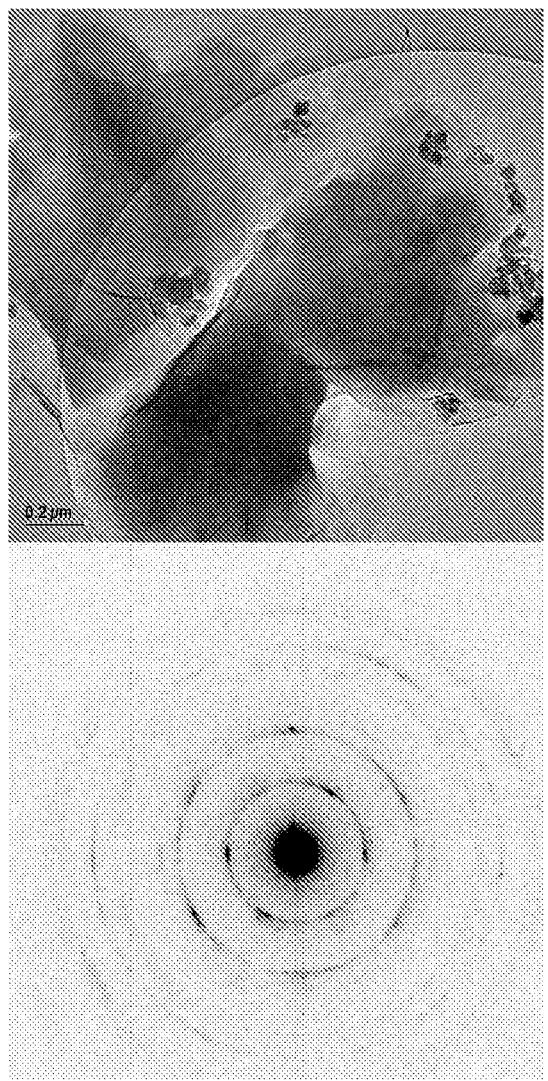
FIG. 67 shows two adjoining compact lamellar aggregates with curled edges of Cs-exchanged montmorillonite.

FIG. 67 shows two adjoining compact lamellar aggregates, ~0.7 μm to ~0.8 μm. Both particles have curled edges. Large compact lamellar aggregates are ~1.0 μm to ~1.4 μm. Quartz aggregates surround particles, ~0.1 μm to ~0.2 μm. Lower SAED pattern shows spots indicating increase in crystallinity.

FIG. 68 shows an SEM image of heated Cs-exchanged montmorrillonite in solidified state. The solid mass is composed of interlocking particles. Large grains are biotite impurities.

FIG. 69 shows a higher magnification SEM image of heated Cs-exchanged montmorillonite in solidified state. Three types of particles are present—Cs-montmorillonite, intermediate rounded grains of Cs-illite, and euhedral crystals of Cs-illite.

Figure 70:
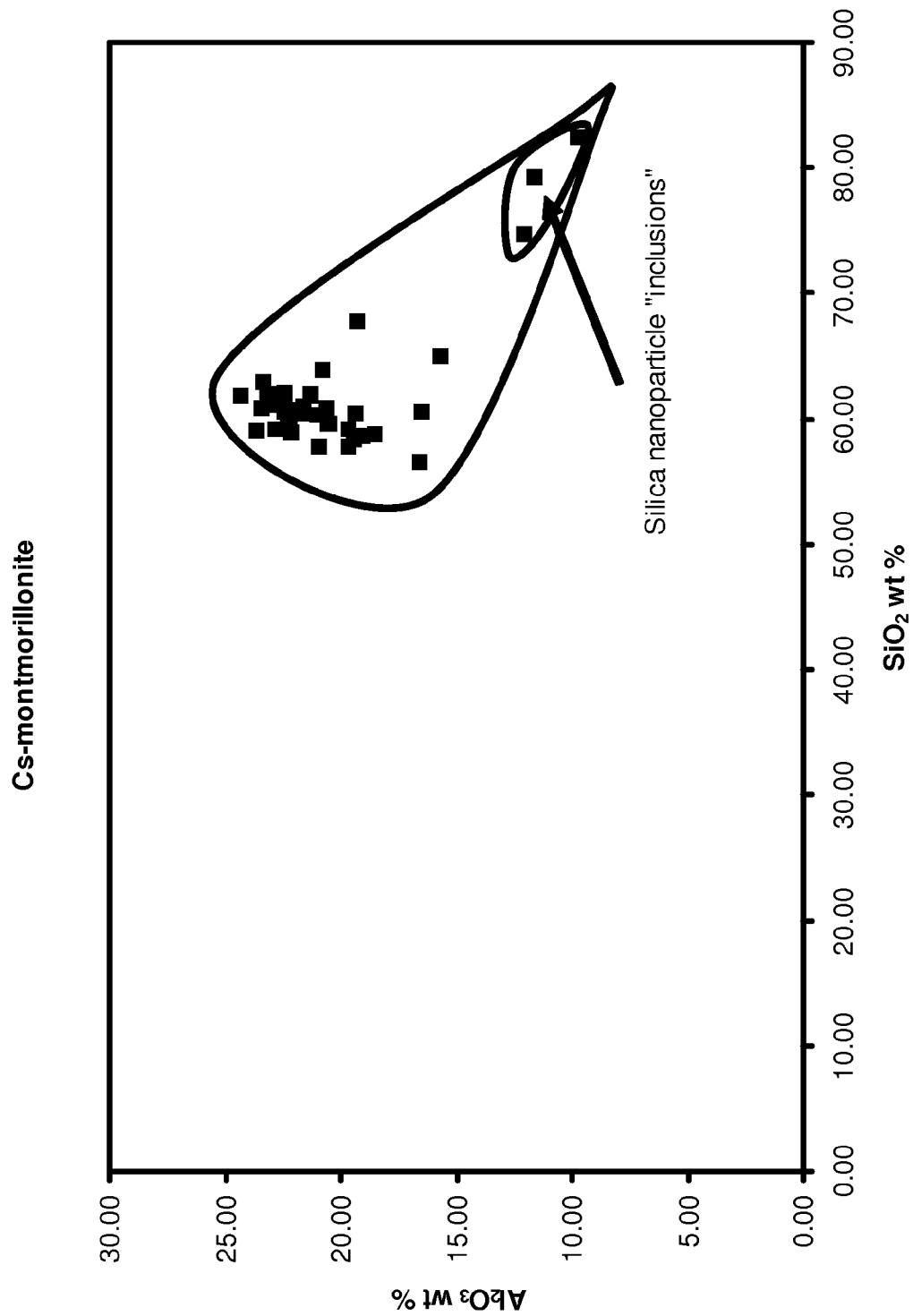
FIG. 70 shows a Cs-montmorillonite concentration plot between $Al_2O_3$ and $SiO_2$.
Figure 71:
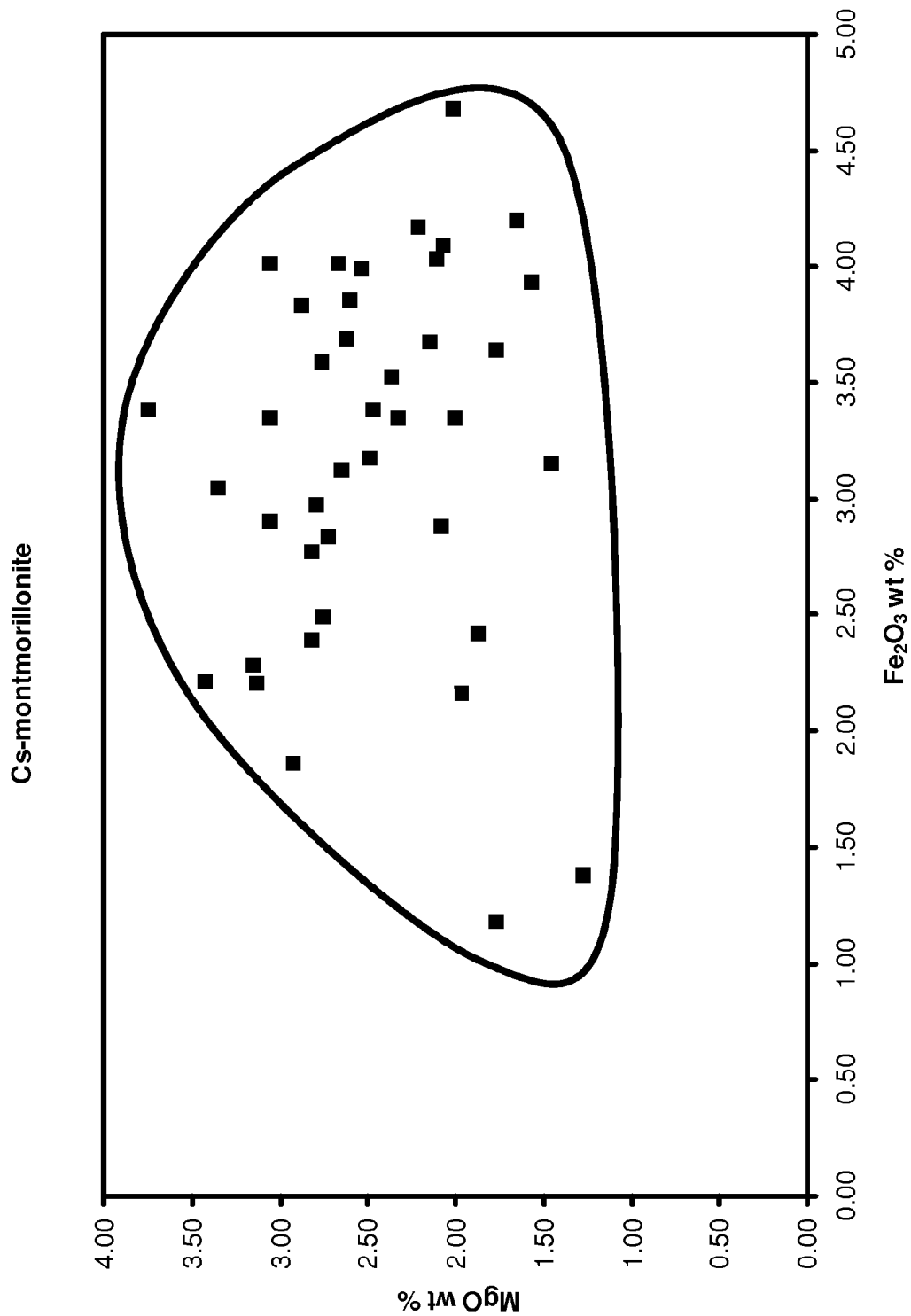
FIG. 71 shows a Cs-montmorillonite concentration plot between MgO and $Fe_2O_3$.
Figure 72:
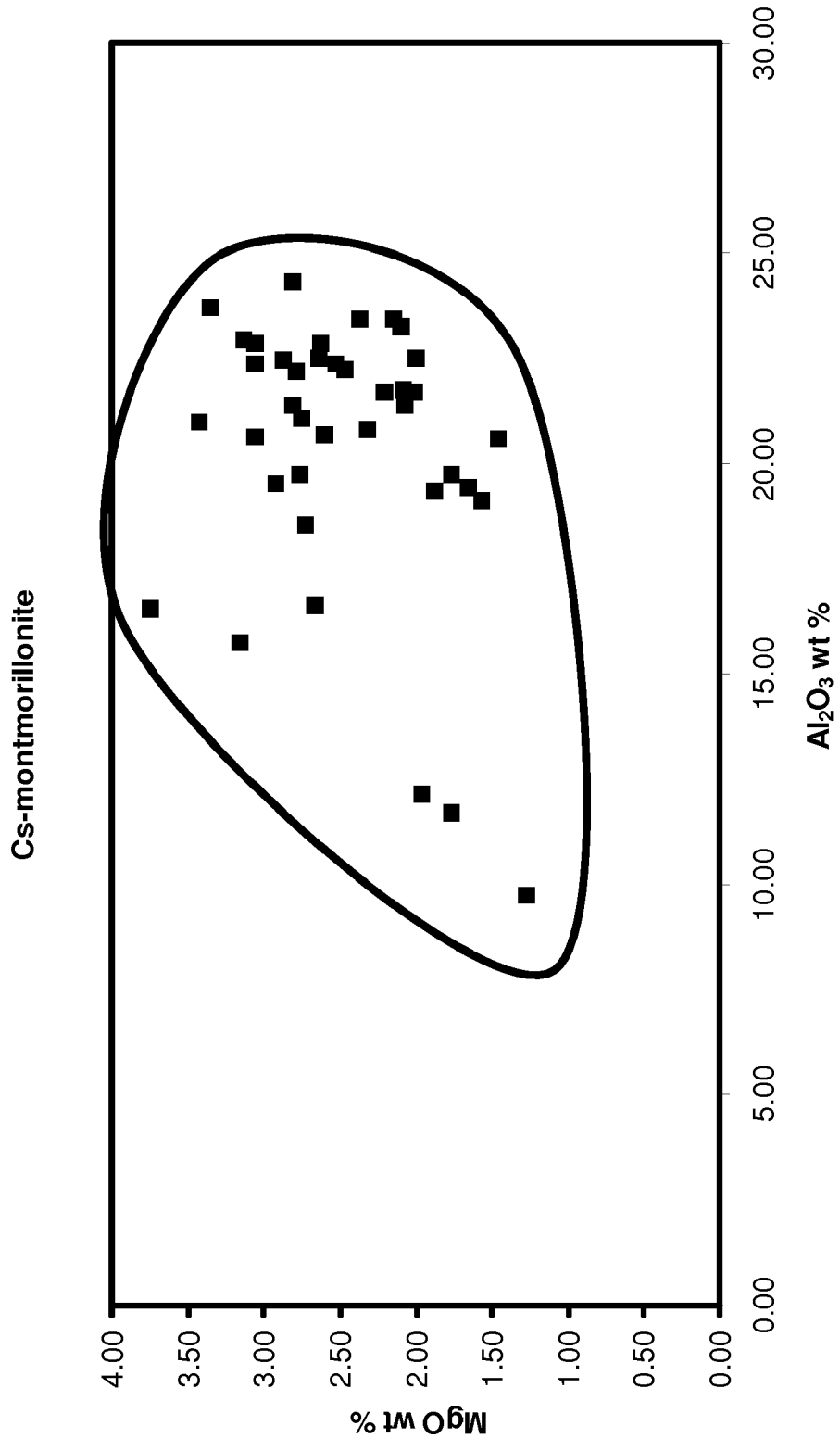
FIG. 72 shows a Cs-montmorillonite concentration plot between MgO and $Al_2O_3$.
Figure 73:
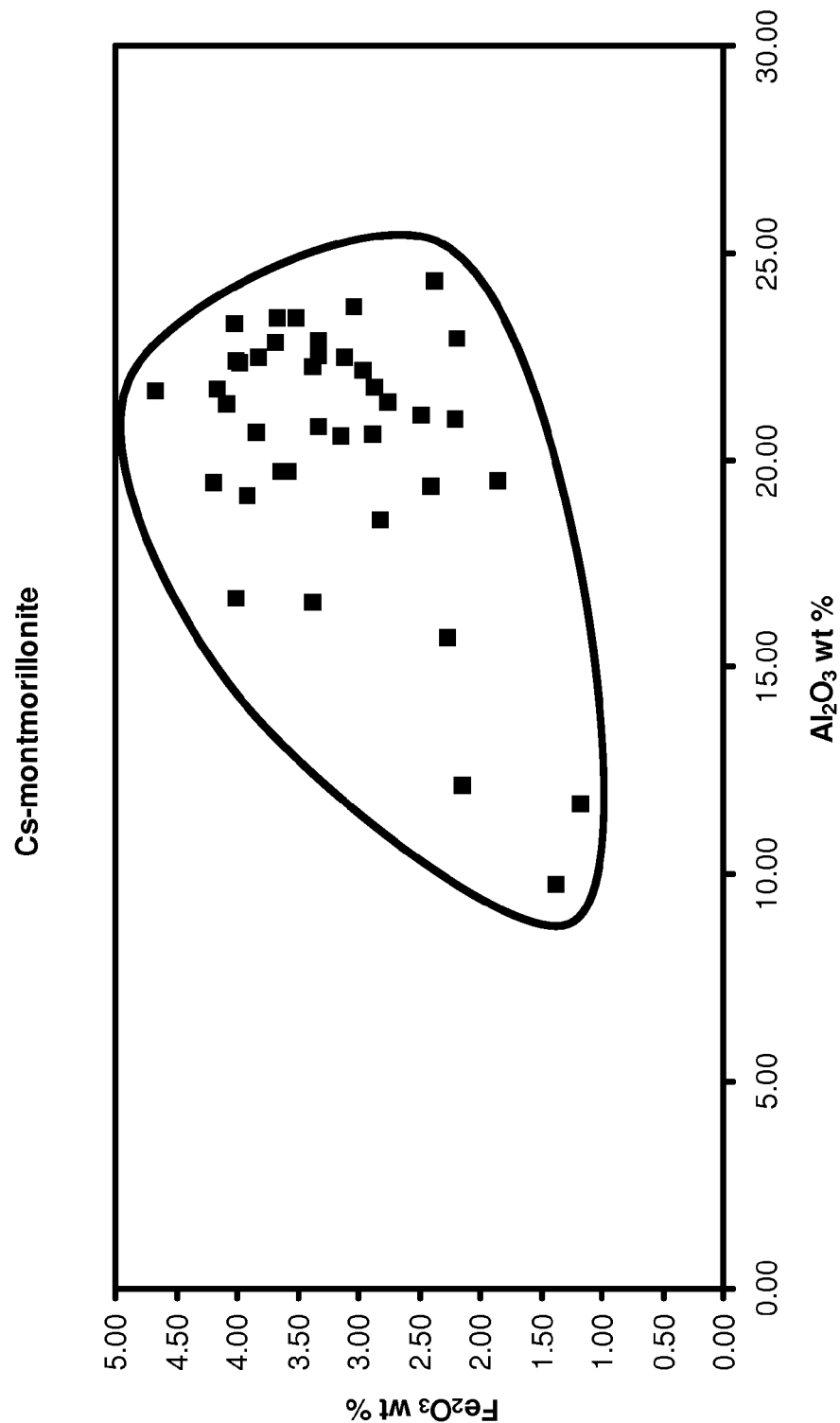
FIG. 73 shows a Cs-montmorillonite concentration plot between $Fe_2O_3$ and $Al_2O_3$.
Figure 74:
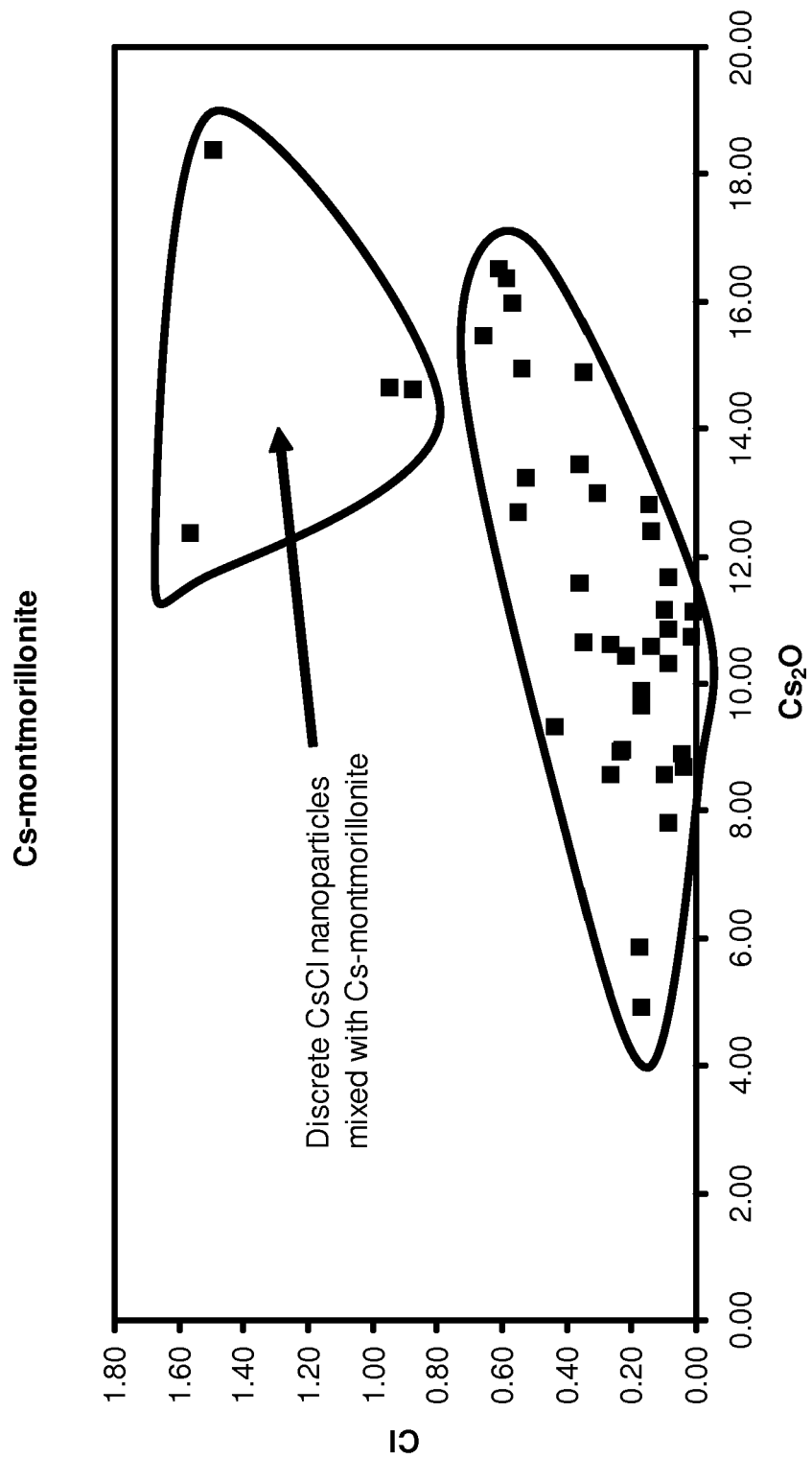
FIG. 74 shows a Cs-montmorillonite concentration plot between Cl and $Cs_2O$.

FIGS. 70-74 show various concentration plots of Cs-montmorillonite. FIG. 70 plots $Al_2O_3$ against $SiO_2$. FIG. 71 plots MgO against $Fe_2O_3$. FIG. 72 plots MgO and $Al_2O_3$. FIG. 73 plots $Fe_2O_3$ and $Al_2O_3$. FIG. 74 plots Cl against $Cs_2O$.

G. Proving the Exchange of $Cs^+$

Transmission electron microscopy investigation of the aqueous clay suspension 115 indicates that the material does indeed exchange with Cs and sequesters the cation. The crystallinity of the montmorillonite generally increases with the exchange of Cs into the structure. SAED data show that diffraction along [hk0] in Na-montmorillonite particles is heavily streaked as expected from the turbostratic stacking. However, the Cs-exchanged montmorillonite shows discrete spots along [hk0] in a pseudohexagonal net indicating a higher degree of crystallinity. The overall morphology of the particles does not appear to change significantly.

The foregoing descriptions of the embodiments of the claimed invention have been presented for purposes of illustration and description. They are not intended to be exhaustive or be limiting to the precise forms disclosed, and obviously many modifications and variations are possible in light of the above teaching. The illustrated embodiments were chosen and described in order to best explain the principles of the claimed invention and its practical application to thereby enable others skilled in the art to best utilize it in various embodiments and with various modifications as are suited to the particular use contemplated without departing from the spirit and scope of the claimed invention. In fact, after reading the above description, it will be apparent to one skilled in the relevant art(s) how to implement the claimed invention in alternative embodiments. Thus, the claimed invention should not be limited by any of the above described example embodiments. For example, the claimed invention may be practiced over water treatment plants, environmental and/or biohazardous spills, etc. Further, the claimed invention may be used for containing chemical and/or biological weapons (e.g., anthrax, small pox, etc.).

In addition, it should be understood that any figures, graphs, tables, examples, etc., which highlight the functionality and advantages of the claimed invention, are presented for example purposes only. The architecture of the disclosed is sufficiently flexible and configurable, such that it may be utilized in ways other than that shown. For example, the steps listed in any flowchart may be reordered or only optionally used in some embodiments.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the claimed invention of the application. The Abstract is not intended to be limiting as to the scope of the claimed invention in any way.

Furthermore, it is the applicants' intent that only claims that include the express language "means for" or "step for" be interpreted under 35 U.S.C. §112, paragraph 6. Claims that do not expressly include the phrase "means for" or "step for" are not to be interpreted under 35 U.S.C. §112, paragraph 6.

A portion of the claimed invention of this patent document contains material which is subject to copyright protection. The copyright owner has no objection to the facsimile reproduction by anyone of the patent document or the patent invention, as it appears in the Patent and Trademark Office patent file or records, but otherwise reserves all copyright rights whatsoever.

What is claimed is:

1. A method for containing radionuclides from a radioactive chloride substance comprising the steps of:
  a. uniformly mixing a clay mineral with water to create an aqueous clay suspension;
  b. after the mixing, refining the aqueous clay suspension, resulting in a radionuclide containment composition;
  c. combining the radionuclide containment composition with the radioactive chloride substance to create an aqueous slurry and allow radionuclide exchange with the radionuclide containment composition; and
  d. adding a silver-based solution to the aqueous slurry, producing a suspension; and
  wherein the clay mineral consists of at least about 95% montmorillonite particles, with the remaining percentage consisting silica particles; and
  wherein the montmorillonite particles comprise:
  a. about 40% to about 75% foliated lamellar aggregates;
  b. about 10% to about 40% subhedral platelets and compact subhedral lamellar aggregates; and
  c. about 5% to about 10% subhedral lamellar aggregates.

* * * * *